OXYGENATION OF STEROIDS BY MUCORALES FUNGI

Filed Feb. 23, 1952 20 Sheets-Sheet 1

HERBERT C. MURRAY
DUREY H. PETERSON
INVENTORS

BY Gordon W. Hueschen
ATTORNEY

July 8, 1952 H. C. MURRAY ET AL 2,602,769

OXYGENATION OF STEROIDS BY MUCORALES FUNGI

Filed Feb. 23, 1952 20 Sheets-Sheet 2

HERBERT C. MURRAY
DUREY H. PETERSON
INVENTORS

BY Gordon W. Hueschen
ATTORNEY

CMPD S BIOCONVERSION BY RH176
S16HRS. CONTROLS S48HRS
S28 HRS. S40 HRS.

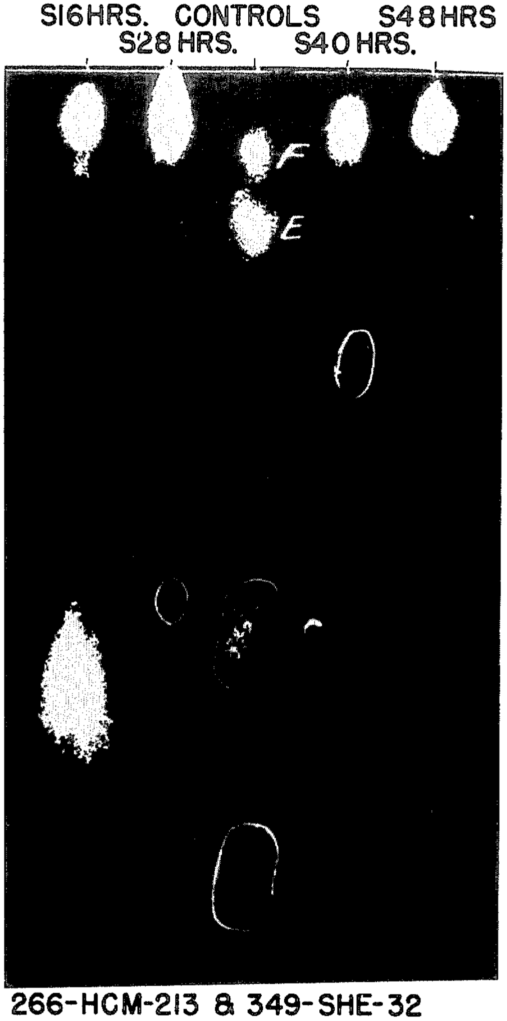

266-HCM-213 & 349-SHE-32
PROPYLENEGLYCOL- TOLUENE
S=COMPOUND S FERMENTATION (320γ); SUBSCRIPT = HOURS OF FERMENTATION
CONTROLS:
COMPOUND F (16γ)
COMPOUND E (16γ)
COMPOUND S (32γ)
CORTICOSTERONE (32γ)

FIG. 6

17-α-HYDROXYPROGESTERONE CONVERSION
HOP-16 CONTROLS+
HOP-24 HOP-24
HOP-16

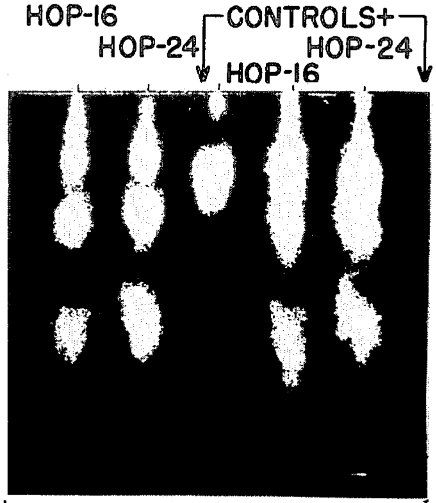

166HCM-214 & 349-SHE-36 ET SEQ.
PROPYLENEGLYCOL-TOLUENE
HOP-16=17-α-HYDROXYPROGESTERONE (300γ), 16 HRS FERMENTATION
HOP-24=DITTO, 24 HRS. FERMENTATION
CONTROLS:
11-α-HYDROXYPROGESTERONE (CA. 240γ) DIHYDROXYPROGESTERONE, DHP-95.4 (60γ)

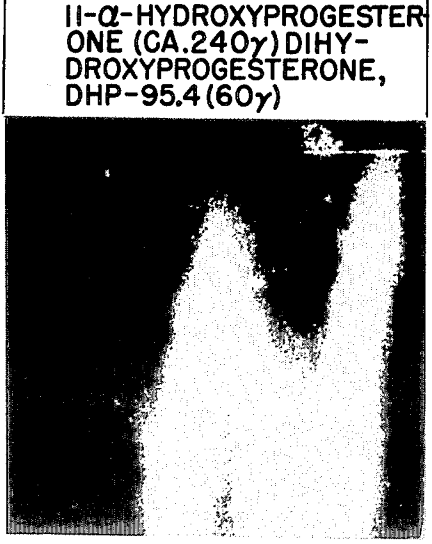

FIG. 7

HERBERT C. MURRAY
DUREY H. PETERSON
INVENTORS

BY Gordon W. Hueschen
ATTORNEY

II KETOPROGESTERONE-IDENTITY

CONTROL | DHP-108.3 | CONTROL +DHP-108.3

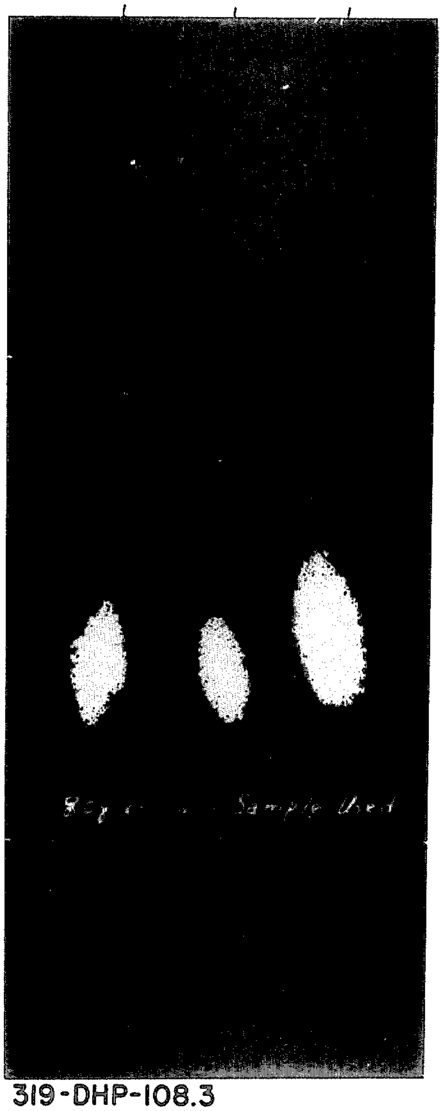

319-DHP-108.3
326-MIU-126
DHP-108.3 = $Cr_2O_3$ OXIDATION OF CMPD U=III (80γ)
CONTROL = AUTHENTIC SAMPLE 11-KETOPROGESTERONE (80γ)

FIG. 4

CMPD S BIOCONVERSION BY RH176

S48 | CONTROLS + S48

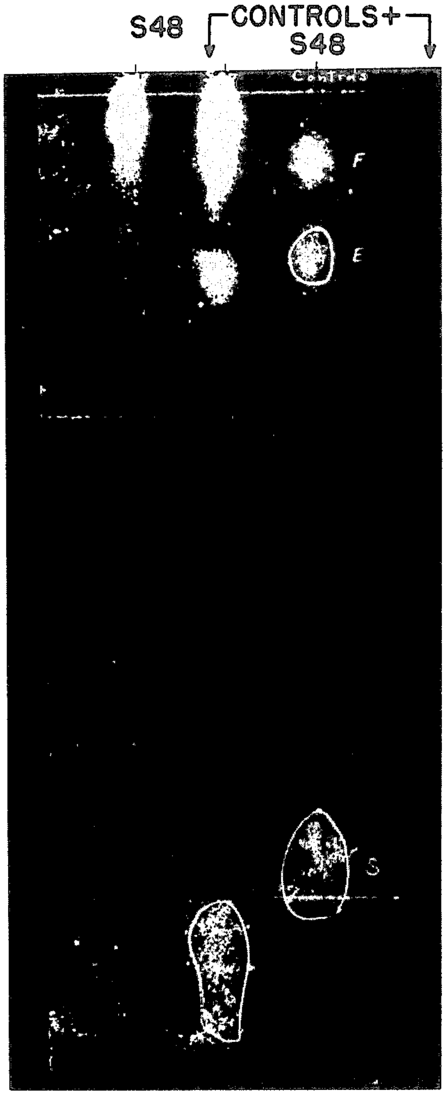

266-HCM-213 & 349-SHE-32
PROPYLENEGLYCOL-TOLUENE
S48 = 48 HR. FERMENTATION OF COMPOUND S(300γ)
S48 + CONTROLS:
CONTROLS: COMPOUND F(16γ)
COMPOUND E(16γ)
COMPOUND S(32γ)

FIG. 5

HERBERT C. MURRAY
DUREY H. PETERSON
INVENTORS

BY Gordon W. Hueschen
ATTORNEY

A = 319-DHP-108.2
B = 11-KETO-PROGESTERONE

HERBERT C. MURRAY
DUREY H. PETERSON INVENTORS

BY

ATTORNEY

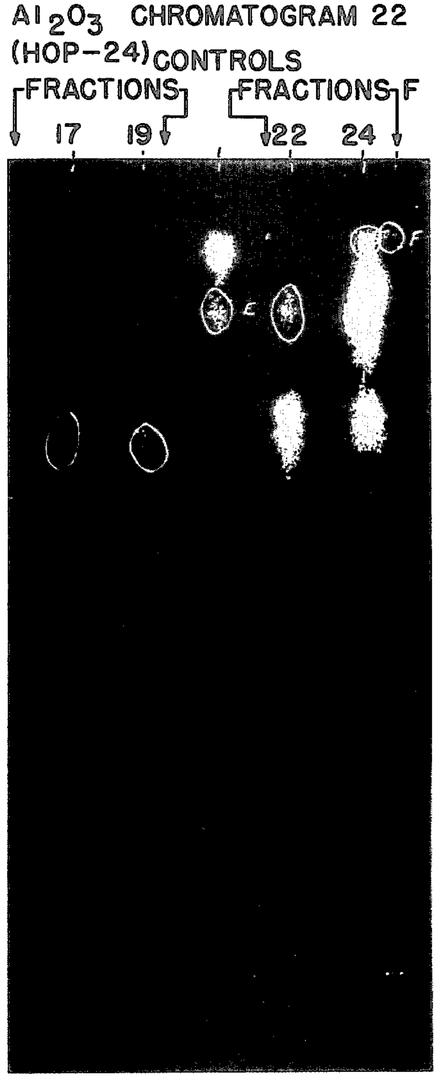

319-DHP-III
349-SHE-37, 38
ALL FRACTIONS APPLIED AT 160γ LEVEL
MIXED CONTROL:
COMPOUND E (16γ)
DIHYDROXYPROGESTERONE (DHP 95.4) (30γ)
F=COMPOUND F CONTROL (16γ)
THE $Al_2O_3$ CHROMATOGRAM OF 266-HCM-214 (17αHO, PROGESTERONE)

FIG. 8

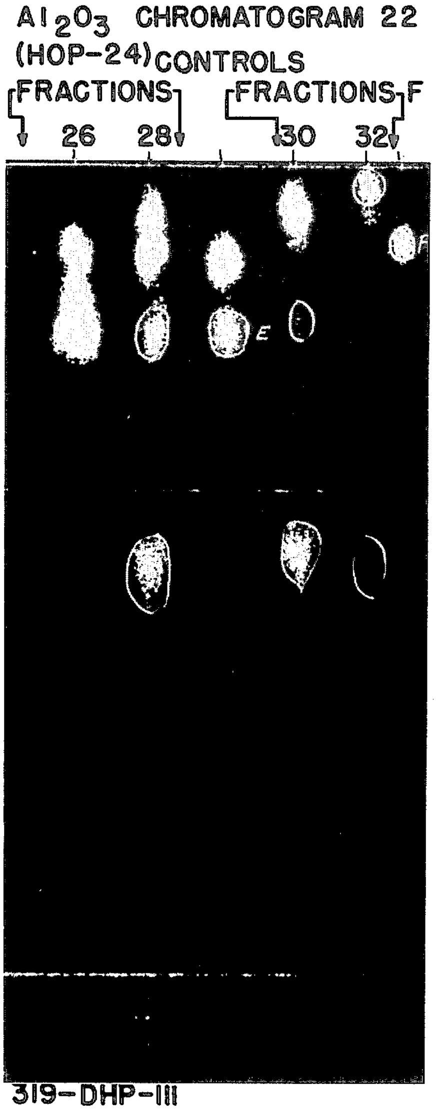

319-DHP-III
349-SHE-37, 38
ALL FRACTIONS APPLIED AT 160γ LEVEL
MIXED CONTROL:
COMPOUND E (16γ)
DIHYDROXYPROGESTERONE (DHP 95.4) (30γ)
F=COMPOUND F CONTROL (16γ)
THE $Al_2O_3$ CHROMATOGRAM OF 266-HCM-214 (17αHO, PROGESTERONE)

FIG. 9

*INVENTORS*
HERBERT C. MURRAY
DUREY H. PETERSON
BY
Gordon W Hueschen
*ATTORNEY*

HERBERT C. MURRAY
DUREY H. PETERSON
INVENTORS

BY [signature]
ATTORNEY

PROGESTERONE BIOCONVERSION

CONTROL α P1 P2 CONTROL δ

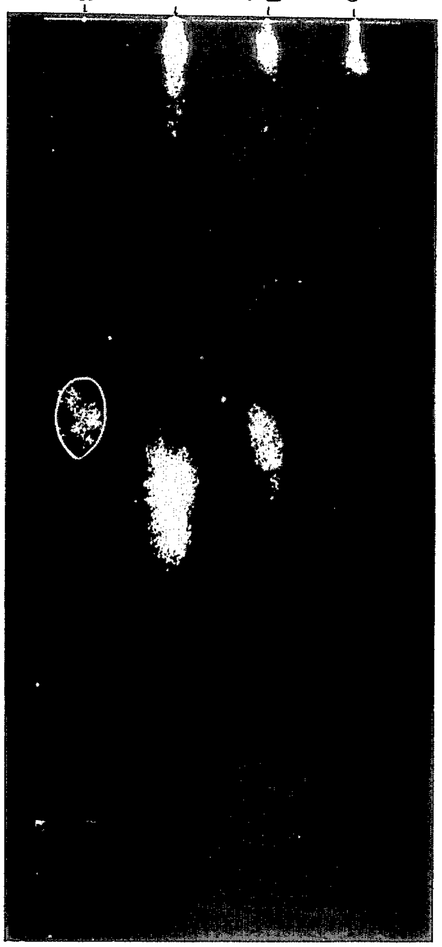

266-HCM-212/300B AND 199/300T
349-SHE-44P1 AND 44P2
PROPYLENEGLYCOL-TOLUENE
P1=PROGESTERONE FERMENTATION (HCM-212/300B) (300γ)
P2=PROGESTERONE FERMENTATION (HCM-199/300T) (300γ)
CONTROLS:
α=11-α-HO,PROGESTERONE (30γ)
δ =DIHYDROXYPROGESTERONE (DHP 95.4) (30γ)

FIG. 12

DOC, PROGESTERONE CONVERSION

204DR DOC CORT 205PP PROG

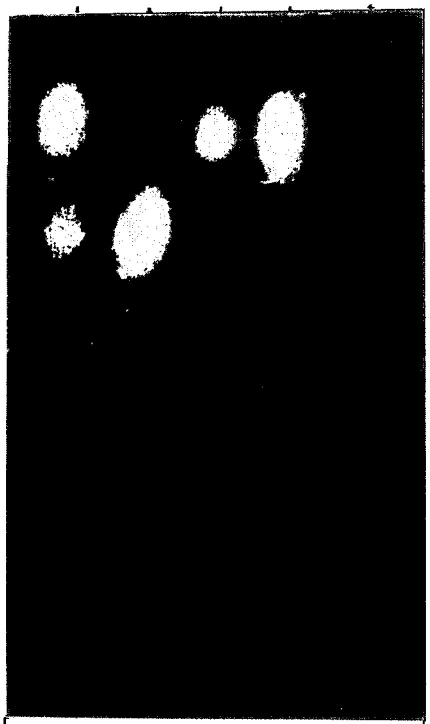

266-HCM-204DR AND 205PP
363-MIU-22
CARBITAL-METHYLCYCLOHEXANE
204DR=11-DESOXYCORTICOSTERONE FERMENTATION (320γ)
DOC=11-DESOXYCORTICOSTERONE CONTROL (64γ)
CORT= CORTICOSTERONE CONTROL (64γ)
PROG.= PROGESTERONE CONTROL (80γ)
205PP=PROGESTERONE FERMENTATION (320γ)

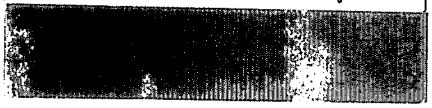

FIG. 13

HERBERT C. MURRAY
DUREY H. PETERSON INVENTORS

BY Gordon W. Hueschen
ATTORNEY

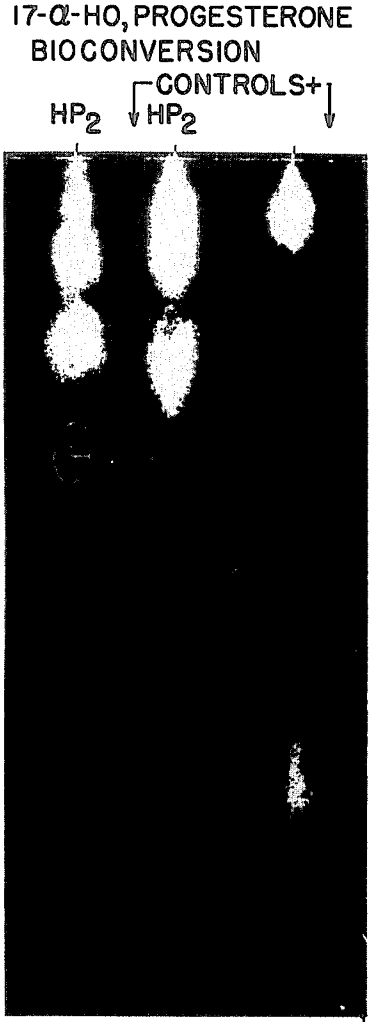
266-HCM-198 HP2
349-SHE-22
PROPYLENE GLYCOL-TOLUENE
HP2 = 17-α-HO, PROGESTERONE FERMENTATION (320γ)
CONTROLS:
DIHYDROXYPROGESTERONE (DHP 95.4)(60γ)
CORTICOSTERONE (64γ)
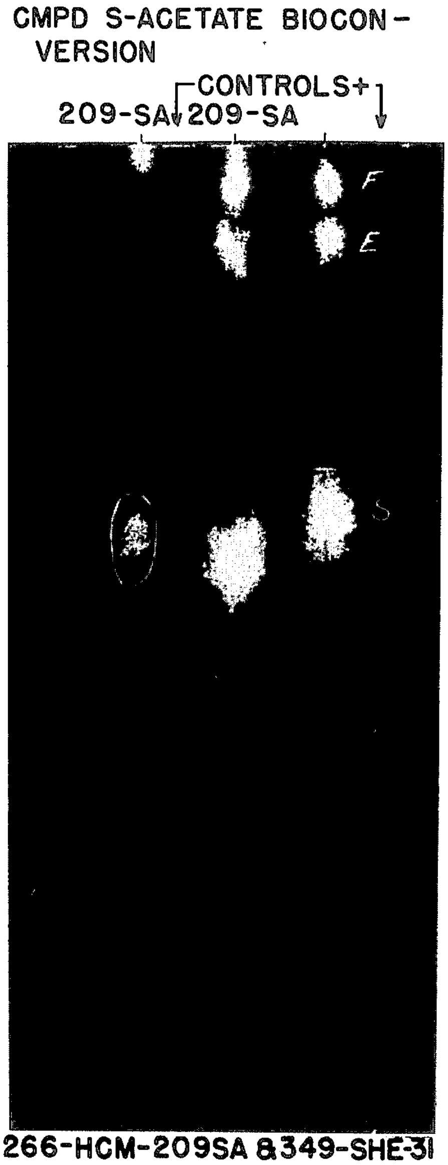
266-HCM-209SA & 349-SHE-31
PROPYLENE GLYCOL-TOLUENE
209-SA = COMPOUND S-ACETATE FERMENTATION (320γ)
CONTROLS: COMPOUND F(16γ)
" E(16γ)
" S(64γ)
FIG. 15
HERBERT C. MURRAY
DUREY H. PETERSON
INVENTORS
BY Gordon W. Hueschen
ATTORNEY

DOC, DOCA BIOCONVERSION

CONTROLS +
D2 DA2 D2 DA2

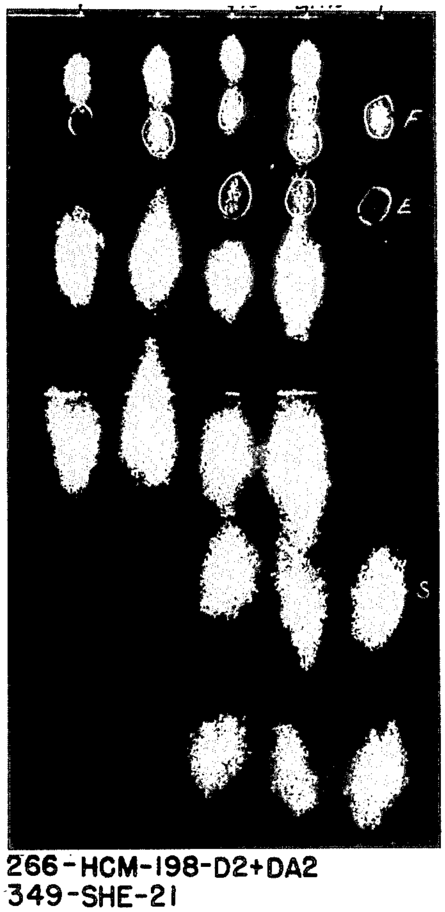

266-HCM-198-D2+DA2
349-SHE-21
PROPYLENEGLYCOL-TOLUENE
D2 = 11-DESOXYCORTICOSTERONE (320γ)
DA2 = 11-DESOXYCORTICOSTERONE ACETATE (320γ)
CONTROLS + D2
CONTROLS + DA2
CONTROLS: COMPOUND F (16γ)
" E (16γ)
" S (64γ)
CORTICOSTERONE (64γ)

FIG. 16

COMPOUND S BIOCONVERSION
BY RH 176

CONTROLS +
SA2 S2 SA2 S2

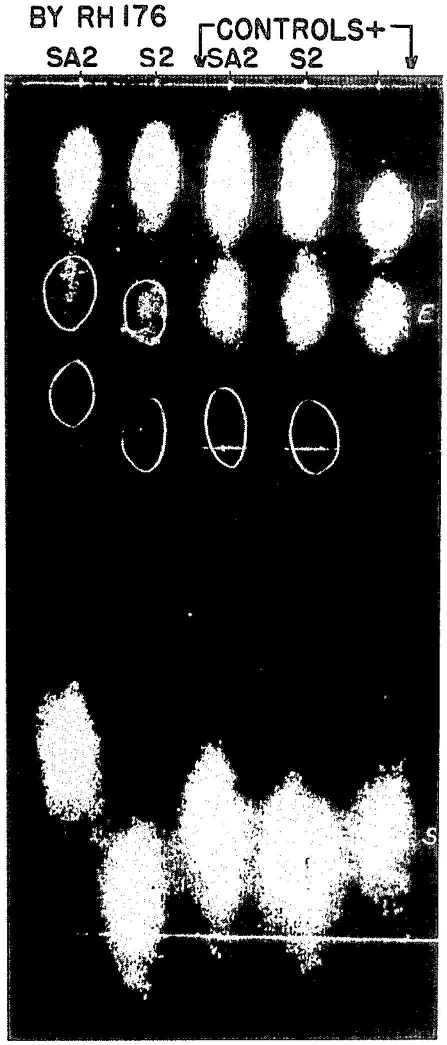

266-HCM-198 S2 AND SA2
349-SHE-25
PROPYLENEGLYCOL-TOLUENE
S2 = COMPOUND S FERMENTATION (320γ)
SA2 = COMPOUND S-ACETATE FERMENTATION (320γ)
CONTROLS: COMPOUND F (16γ)
" E (16γ)
" S (64γ)

FIG. 17

HERBERT C. MURRAY
DUREY H. PETERSON
INVENTORS

BY Gordon W. Hueschen
ATTORNEY

OXYGENATION OF STEROIDS BY MUCORALES FUNGI

Filed Feb. 23, 1952 20 Sheets-Sheet 11

S & S-ACETATE BIOCONVERSION

CONTROLS+

$SA_4$ $S_4$ $S_4$ $SA_4$

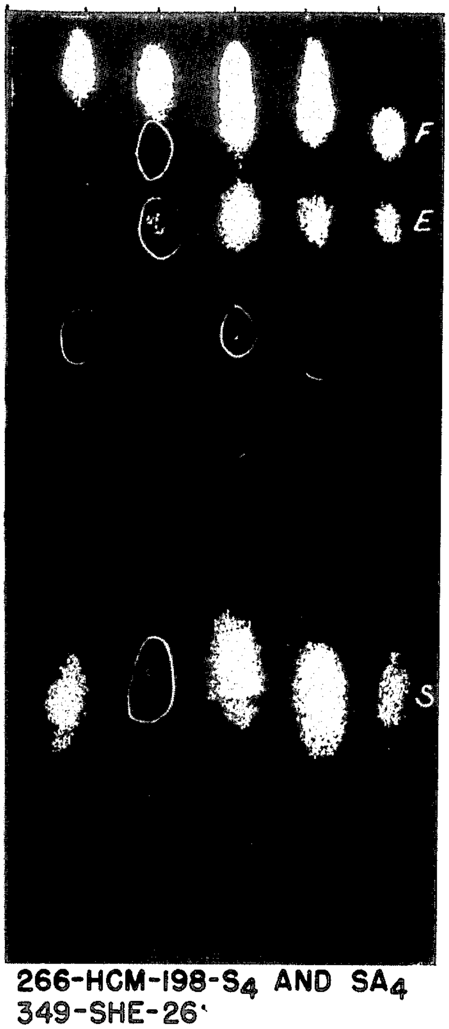

266-HCM-198-$S_4$ AND $SA_4$
349-SHE-26
PROPYLENEGLYCOL-TOLUENE
$S_4$=COMPOUND S FERMENTATION ($320\gamma$)
$SA_4$=COMPOUND S-ACETATE FERMENTATION ($320\gamma$)
CONTROLS: COMPOUND F($16\gamma$)
COMPOUND E($16\gamma$)
COMPOUND S($64\gamma$)

FIG. 18

CMPD S BIOCONVERSION BY $M_6$

I CONTROLS

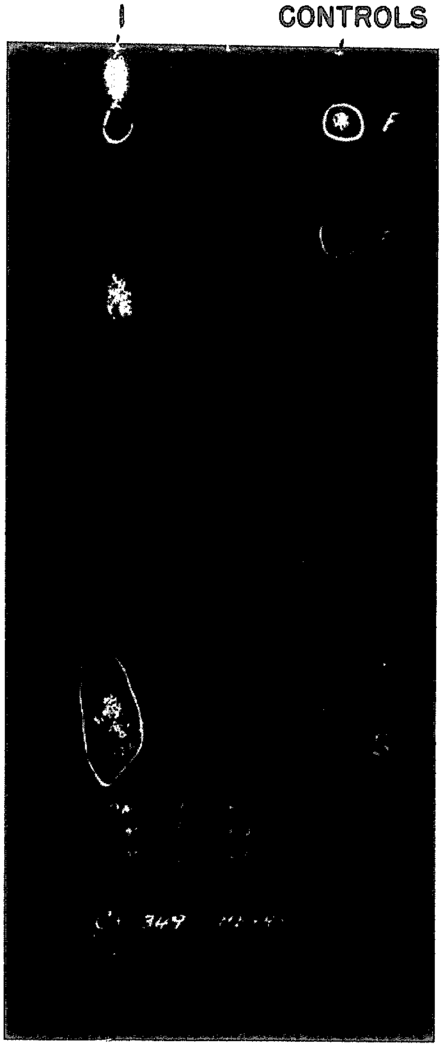

266-HCM-217MUS &
349-SHE-48
PROPYLENEGLYCOL TOLUENE
I=COMPOUND S FERMENTATION ($320\gamma$)
CONTROLS: COMPOUND F($16\gamma$)
COMPOUND E($16\gamma$)
COMPOUND S($32\gamma$)

FIG. 19

HERBERT C. MURRAY
DUREY H. PETERSON
INVENTORS

BY Gordon W. Hueschen
ATTORNEY

OXYGENATION OF STEROIDS BY MUCORALES FUNGI

Filed Feb. 23, 1952 20 Sheets-Sheet 12

ANDROSTENEDIONE BIOCONVERSION

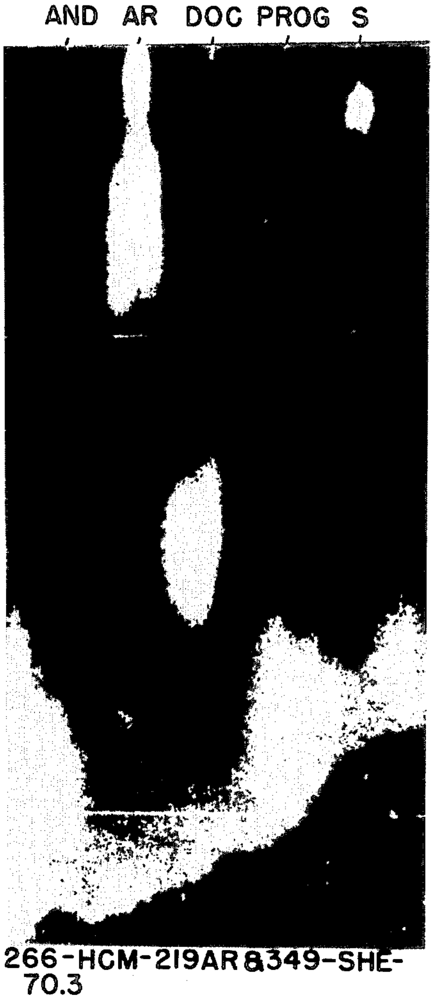

266-HCM-219AR&349-SHE-70.3
PROPYLENEGLYCOL-TOLUENE
AND=ANDROSTENEDIONE CONTROL (80$\gamma$)
AR= ANDROSTENEDIONE FERMENTATION (500$\gamma$)
DOC = 11-DESOXYCORTICOSTERONE CONTROL (64$\gamma$)
PROG=PROGESTERONE CONTROL (80$\gamma$)
S = COMPOUND S CONTROL (32$\gamma$)

FIG. 20

ANDROSTENEDIONE BIOCONVERSION

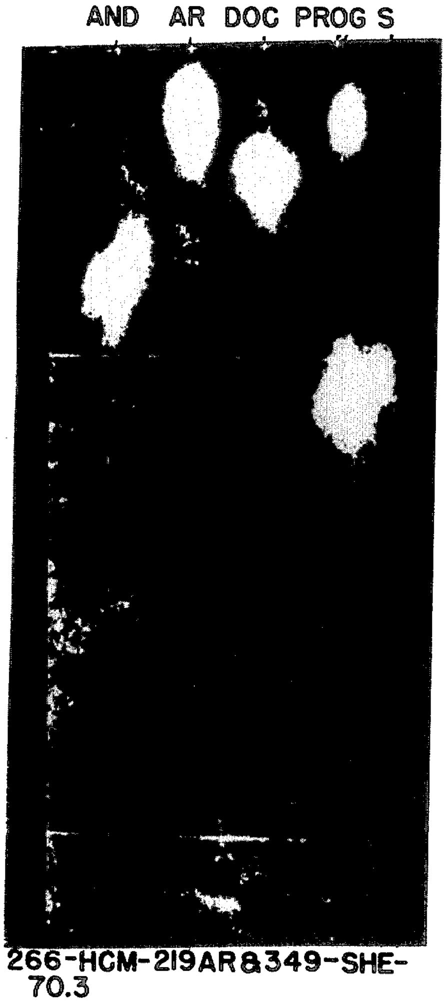

266-HCM-219AR&349-SHE-70.3
CARBITOL-METHYLCYCLOHEXANE
AND=ANDROSTENEDIONE CONTROL (80$\gamma$)
AR=ANDROSTENEDIONE FERMENTATION (500$\gamma$)
DOC = 11-DESOXYCORTICOSTERONE CONTROL (64$\gamma$)
PROG=PROGESTERONE CONTROL (80$\gamma$)
S=COMPOUND S CONTROL (32$\gamma$)

FIG. 21

HERBERT C. MURRAY
DUREY H. PETERSON
INVENTORS

BY Gordon W. Hueschen
ATTORNEY

266-HCM-219-OR AND 349-SHE-70.1
CARBITOL-METHYLCYCLOHEXANE
OR=ERGOSTERONE FERMENTATION (500γ)
ERG=ERGOSTERONE CONTROL (80γ)
DOC=11-DESOXYCORTICOSTERONE CONTROL (64γ)
PROG=PROGESTERONE CONTROL (64γ)

HERBERT C. MURRAY
DUREY H. PETERSON
INVENTORS

BY Gordon H. Hueschen
ATTORNEY

ERGOSTEROL BIOCONVERSION

CONTROLS + ER

ER CONTROLS

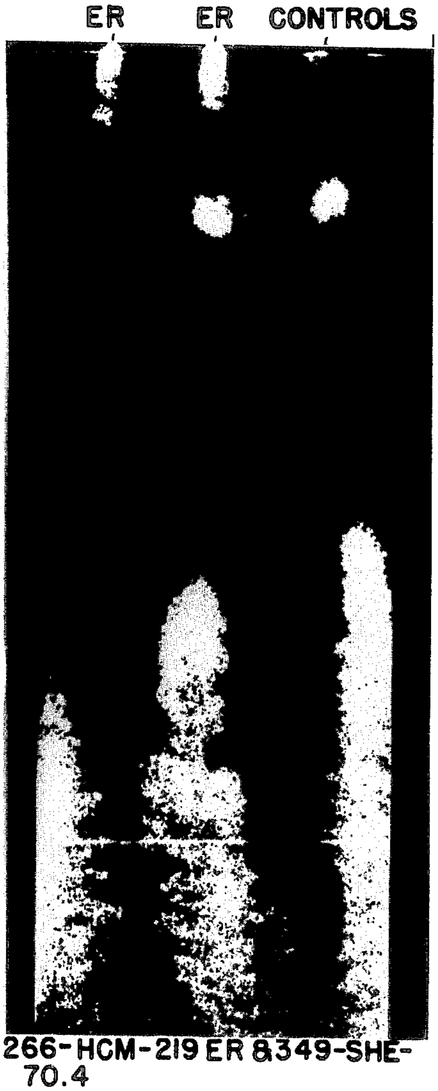

266-HCM-219 ER & 349-SHE-70.4
PROPYLENEGLYCOL-TOLUENE
ER=ERGOSTEROL FERMENTATION (500γ)
CONTROLS:
11-DESOXYCORTICOSTERONE (64γ)
ERGOSTEROL (96γ)
COMPOUND S (32γ)

FIG. 24

PROGESTERONE CONVERSION, VEGETATIVE INOCULATION, SIMPLE MEDIUM

CONTROLS +VEG.

VEG. CONTROLS

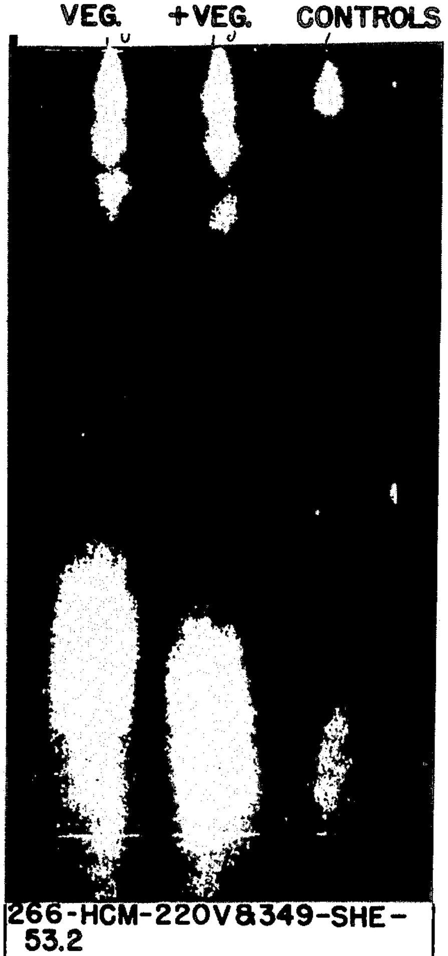

266-HCM-220V & 349-SHE-53.2
PROPYLENEGLYCOL-TOLUENE
VEG=PROGESTERONE FERMENTATION
CONTROLS:
11-α-HO, PROGESTERONE (60γ)
DIHYDROXYPROGESTERONE (30γ)

FIG. 25

HERBERT C. MURRAY
DUREY H. PETERSON
INVENTORS

BY [signature]
ATTORNEY

PROGESTERONE BIOCONVERSION BY MUCORALES

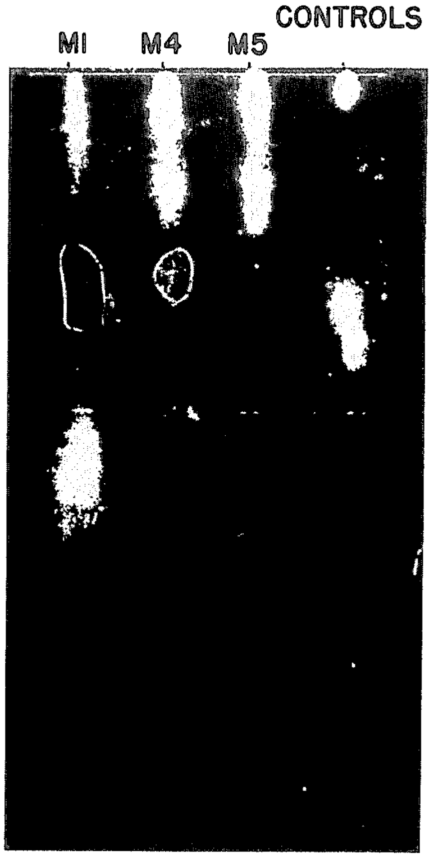

314AW-64-71 & 349-SHE-47
PROPYLENEGLYCOL-TOLUENE
M1=M1/P6 PROGESTERONE FERMENTATION (320γ)
M4=M4/P6 PROGESTERONE FERMENTATION (320γ)
M5=M5/P6 PROGESTERONE FERMENTATION (320γ)
CONTROLS:
11α-HO, PROGESTERONE (30γ) DIHYDROXYPROGESTERONE (DHP 95.4)(30γ)

FIG. 26

PROGESTERONE BIOCONVERSION BY MUCORALES

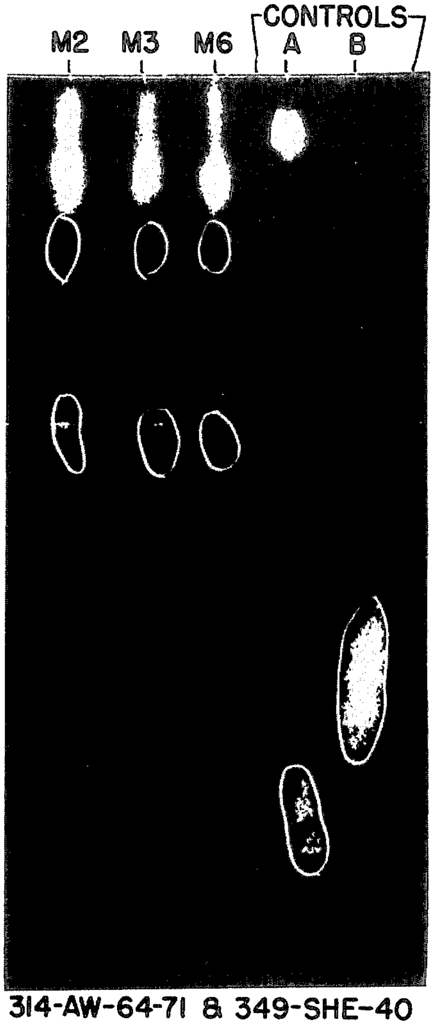

314-AW-64-71 & 349-SHE-40
PROPYLENEGLYCOL-TOLUENE
M2=M2/P6 FERMENTATION (240γ)
M3=M3/P6 FERMENTATION (240γ)
M6=M6/P6 FERMENTATION (240γ)
CONTROLS:
A { 11α-HO, PROGESTERONE (30γ) DIHYDROXYPROGESTERONE (DHP 95.4)(30γ)
B-11α-HO, PROGESTERONE (60γ)

FIG. 27

HERBERT C. MURRAY
DUREY H. PETERSON
INVENTORS

BY Gordon W. Hueschen
ATTORNEY

HERBERT C. MURRAY
DUREY H. PETERSON
*INVENTORS*

*BY* Gordon W. Hueschen
*ATTORNEY*

PROGESTERONE BIOCONVERSION BY MUCORALES

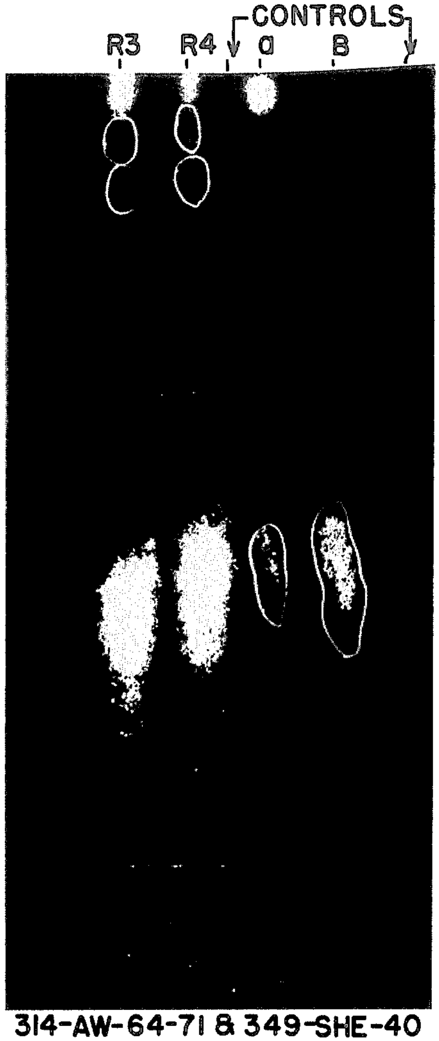

314-AW-64-71 & 349-SHE-40
PROPYLENEGLYCOL-TOLUENE
R3= R3/P6 FERMENTATION (240γ)
R4=R4/P6 FERMENTATION (240γ)
CONTROLS:
a =11-α-HO, PROGESTERONE (30γ) DIHYDROXYPROGESTERONE (DHP 95.4) (30γ)
B =11-α-HO, PROGESTERONE (60γ)

FIG. 30

PROGESTERONE BIOCONVERSION BY MUCORALES

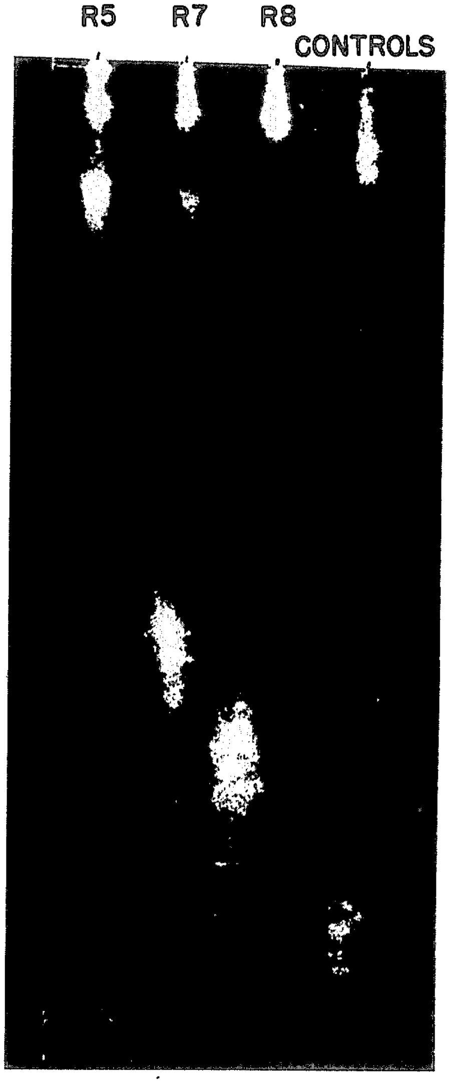

314-AW-64-71 & 349-SHE-50
PROPYLENEGLYCOL-TOLUENE
R5=R5/P6 FERMENTATION (320γ)
R7=R7/P6 FERMENTATION (320γ)
R8=R8/P6 FERMENTATION (320γ)
CONTROLS: 11-α-HO, PROGESTERONE (64γ), (30γ) DIHYDROXYPROGESTERONE (DHP 95.4)

FIG. 31

INVENTORS
HERBERT C. MURRAY
DUREY H. PETERSON
BY
Gordon W. Hueschen
ATTORNEY

DOC BIOCONVERSION BY MUCORALES

CONTROLS

M1 M2 M3

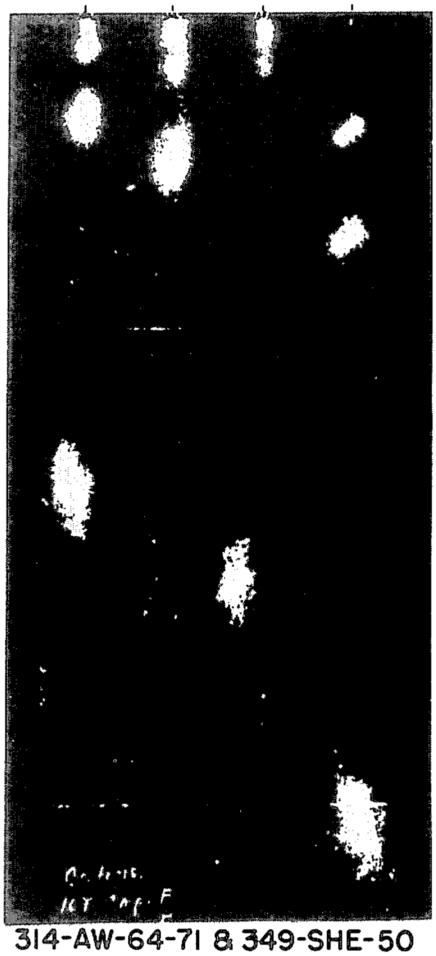

314-AW-64-71 & 349-SHE-50
PROPYLENEGLYCOL-TOLUENE
M1=M1/DOC6 FERMENTATION (320γ)
M2=M2/DOC6 FERMENTATION (320γ)
M3=M3/DOC6 FERMENTATION (320γ)
CONTROLS: MIXTURE OF
COMPOUND F (16γ)
COMPOUND E (16γ)
CORTICOSTERONE (64γ)

FIG.32

DOC BIOCONVERSION BY MUCORALES M2(ATCC 1207A)

CONTROLS

M2 +M2 CONTROLS

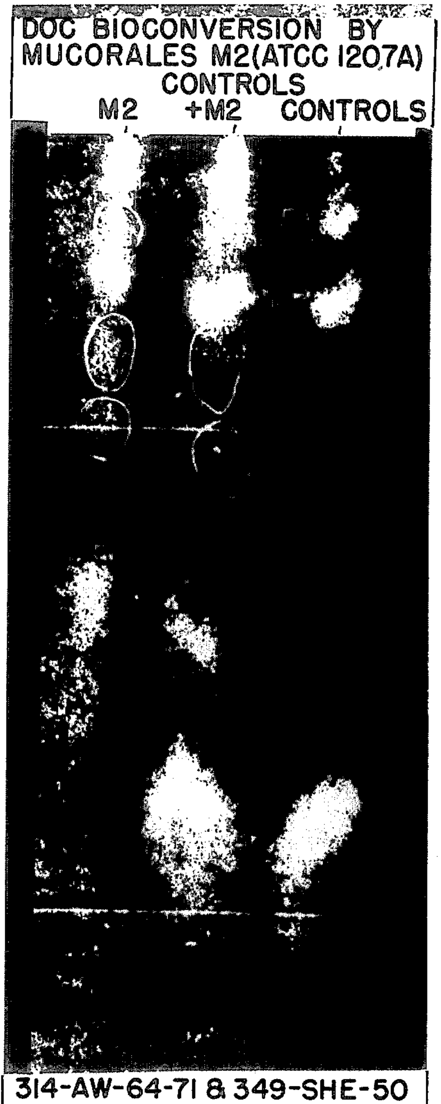

314-AW-64-71 & 349-SHE-50
PROPYLENEGLYCOL-TOLUENE
M2=M2/DOC 6 FERMENTATION (320γ)
CONTROLS: MIXTURE OF
COMPOUND F (16γ)
COMPOUND E (16γ)
CORTICOSTERONE (64γ)

FIG.33

HERBERT C. MURRAY
DUREY H. PESTERSON INVENTORS

BY Gordon W. Hueschen

ATTORNEY

July 8, 1952 H. C. MURRAY ET AL 2,602,769

OXYGENATION OF STEROIDS BY MUCORALES FUNGI

Filed Feb. 23, 1952 20 Sheets-Sheet 19

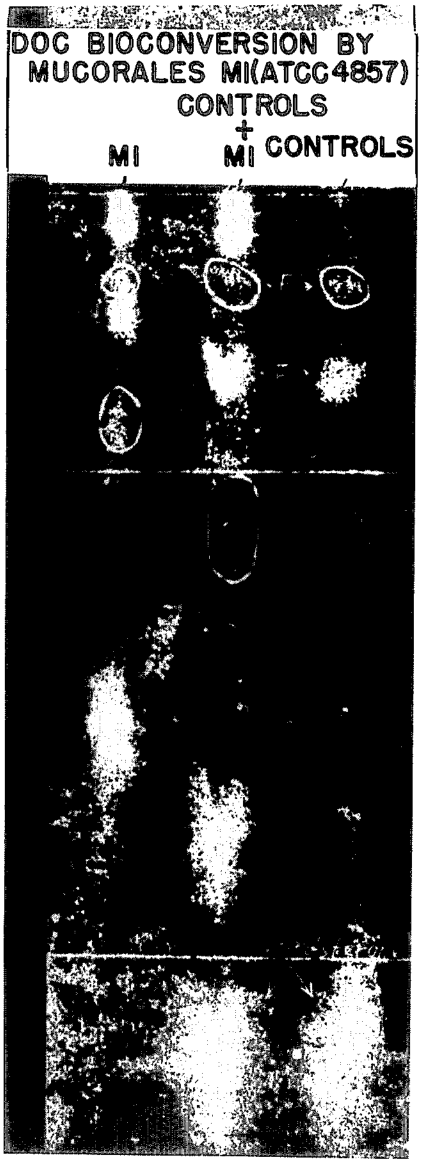

314-AW-64-71&349-SHE-50
PROPYLENEGLYCOL-TOLUENE
MI=MI/DOC 6 FERMENTATION (320γ)
CONTROLS: MIXTURE OF
COMPOUND F (16γ)
COMPOUND E (16γ)
CORTICOSTERONE (64γ)

FIG. 34

PROGESTERONE CONVERSION BY BEER FILTRATE CONTROL

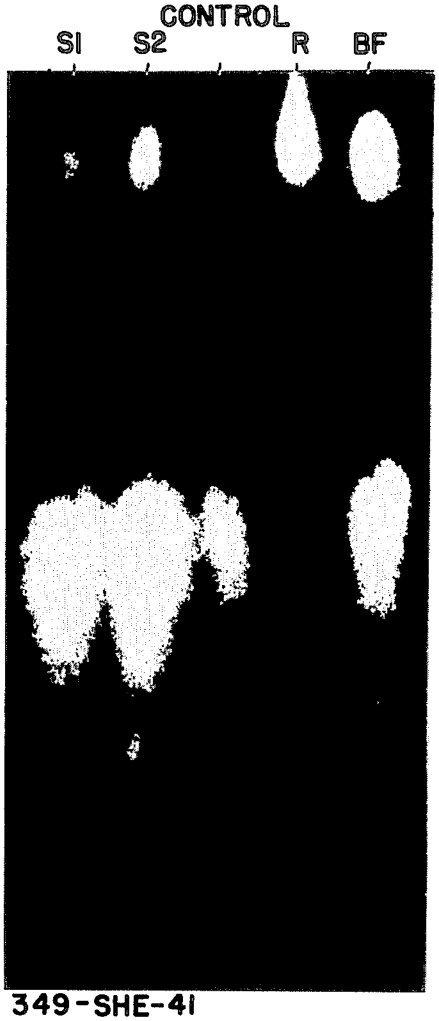

349-SHE-41
CONTROL=PROGESTERONE (64γ)
SI=FERMENTATION BY DILUTED BEER FILTRATE PH 6.76
S2= LIKE SI BUT PH 4.65
R =FERMENTATION BY MYCELIUM
BF=FERMENTATION BY UNDILUTED BEER FILTRATE PH 4.1
CARBITOL-METHYLCYCLOHEXANE

FIG. 35

HERBERT C. MURRAY
DUREY H. PETERSON
INVENTORS
BY
ATTORNEY

11-α-HO, PROGESTERONE CONVERSION BY RH 176

CONTROLS
72 +72 CONTROLS

266-HCM-229 & 349-SHE-72
PROPYLENEGLYCOL-TOLUENE
72 = 11α-HO, PROGESTERONE FERMENTATION (320γ)
CONTROLS:
11α-HO, PROGESTERONE (60γ)
DIHYDROXYPROGESTERONE (DHP 95.4)(30γ)

HERBERT C. MURRAY
DUREY H. PETERSON INVENTORS
BY Gordon W. Hueschen
ATTORNEY

Patented July 8, 1952 2,602,769

UNITED STATES PATENT OFFICE 2,602,769

OXYGENATION OF STEROIDS BY MUCORALES FUNGI

Herbert C. Murray, Hickory Corners, and Durey H. Peterson, Kalamazoo, Mich., assignors to The Upjohn Company, Kalamazoo, Mich., a corporation of Michigan Application February 23, 1952, Serial No. 272,944

92 Claims. (Cl. 195—51)

The present invention relates to a novel method for the introduction of oxygen into a steroid molecule, and to certain novel products produced by the method of the invention. This application is a continuation-in-part of our prior-filed copending application, Serial Number 180,496, filed August 19, 1950, now abandoned.

It is already known to introduce oxygen into the eleven position of a steroid molecule, but such result has been accomplished only through highly involved organic syntheses involving a considerable number of steps. Consequently, the overall yield of eleven oxygenated steroid has been much less than desired, and the cost of such production extremely high, if not prohibitive. This has been an insuperable handicap in the attempt of pharmaceutical chemists to make certain eleven oxygenated steroids available. The high production cost and inadequate supply of these important drugs has restricted their dissemination and availability and their utilization in treatment of various maladies which are presently known to be beneficially affected only by certain eleven oxygenated steroids. Among these drugs, which have an eleven oxygenated steroid structure, may, for example, be mentioned corticosterone, 11-dehydrocorticosterone, 11 - dehydro-17-hydroxycorticosterone (compound E, cortisone), and 17-hydroxycorticosterone (compound F). It is therefore, of considerable importance to find a more satisfactory method of producing oxygenated steroid compounds, especially eleven oxygenated steroid compounds, containing in the eleven position either the keto (oxo) group (=O), as the eleven oxygen appears in various of the desirable drugs, or the hydroxy (oxy) group (—OH), which is itself present in many valuable steroid compounds and which in addition is convertible to the keto group.

It is an object of the present invention to provide a novel method for the introduction of oxygen into a steroid molecule. Another object of the invention is the provision of such method whereby an eleven desoxy steroid (the term "eleven desoxy steroid" is employed throughout to indicate a steroid which contains no oxygen in the eleven position) is converted in high yields to an eleven oxygenated steroid by the action of a fungus of the order Mucorales, or oxidizing fungal enzymes obtainable therefrom. An additional object of the invention is the provision of a process for the production of eleven oxygenated steroids from eleven desoxy steroids wherein the conversion is effected by the action of a fungus of the order Mucorales, or oxidizing enzymes thereof. Another object of the invention is the provision of a process for the introduction of oxygen into at least the eleven position of an eleven desoxy steroid through the action of a fungus of the order Mucorales, especially of the family Mucoraceae, and more especially of the genus Rhizopus, or oxidizing enzymes produced thereby. Still another object of the invention is the provision of novel products, produced only through the method of the present invention, and of unique utility as and in the preparation of valuable eleven oxygenated steroid drugs. Other and more particular objects of the invention will become apparent hereinafter.

It has now been found that eleven desoxy steroids, which contain the cyclopentanopolyhydrophenanthrene nucleus, especially the 10,13-dimethylcyclopentanopolyhydrophenanthrenes, can be readily converted in high yields to corresponding oxygenated steroids by subjecting the steroid compound to the action of a fungus of the order Mucorales, or the oxidizing fungal enzymes, endocellular or exocellular, produced thereby. By the method of the present invention, an efficient, economical, and commercially satisfactory method of introducing oxygen into the eleven position of an eleven desoxy steroid molecule is provided. Accordingly, a novel, and simple approach to the production of eleven oxygenated steroid drugs is afforded, which is, as previously stated, of great importance to the chemical, pharmaceutical, and medical professions, and of especial value in the treatment of physiological abnormalities known to be beneficially affected only by such eleven oxygenated steroid drugs.

The method of the present invention, in its broader aspects, consists in subjecting a steroid or an eleven desoxy steroid to the action of an oxidizing fungus of the order Mucorales, or oxidizing enzymes of the fungi, which are capable of introducing an oxygen atom into the steroid nucleus. Another way of expressing the result of the process of the present invention is to say that the steroid is "oxygenated" since an oxygen atom is introduced thereinto. Other positions as well as the eleven position of the steroid molecule may undergo transformation due to the action of the fungus, or enzymes thereof, but such transformations are not to be regarded as undesirable, since the introduction of oxygen into other portions of the steroid molecule may result in valuable therapeutic products or intermediates, for example, those containing a hydroxy group at the 17 position. In case such additional groups are not considered desirable, methods are available for the removal of such groups with facility. An important advantage of the present invention is the oxygenation of eleven desoxy steroids in the eleven position. Hydroxy groups, which are themselves capable of oxidation to keto groups, when present in the molecule of a steroid to be oxygenated, may, if considered necessary, as where exceedingly high yields of eleven oxygenated hydroxysteroid product are sought to be produced, be protected from attack of various types, including attack by the oxidizing fungi or oxidizing fungal enzymes, by conversion, as for example by esterification, etherification, halogenation, or the like, to a group which is reconvertible to a hydroxy group. However, such procedure is not a prerequisite to the introduction of oxygen, especially eleven oxygen, into a hydroxysteroid by the method of the present invention.

The steroids operative in the method of the present invention are not limited as to type or number of substituents, and for operativeness in the process need only contain a nuclear unoxygenated or oxygenatable position, such as, for example, an unoxygenated eleven position; illustratively, a methylene group, as in an eleven desoxy steroid. Such compounds contain the nucleus:

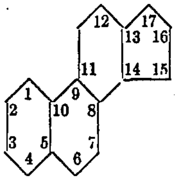

which may in addition contain substituents or combinations of substituents about the nucleus, as in the 1, 2, 3, 4, 5, 6, 7, 8, 9, 10, 12, 13, 14, 15, 16, and 17 positions, especially 10,13-dimethyl groups, 3,7, or 12 keto, hydroxy, or acyloxy groups; 17-side chains of which the progesterone and corticosterone (Ketol) side chains deserve special mention; a 17 keto group; a 17 hydroxy group, and the like; as well as double bonds in the 4, 5, 6, 7, 8, 9(11), 11(12), 16(17) and other positions, or combinations of positions, about the nucleus; or double bonds saturated by addition thereto of halogen or hydrogen halide; adducts of dienophiles such as maleic acid, maleic anhydride, or maleic acid esters with steroids having a conjugated double bond system, as at 5, 7; and other substituents and combinations of substituents, double bonds and so forth too numerous for special mention, a great many of which are known in the steroid art. The presence or absence of unsaturation at the 9(11) or 11(12) positions of the nucleus is not a critical factor in the method of the present invention, for, while it is preferred to apply the process to a steroid having an eleven methylene group, i. e., a steroid having two hydrogen atoms at carbon atom eleven or no unsaturation in the 9(11) or 11(12) positions, for reasons of economy and to obviate unnecessary transformations of saturated to unsaturated compounds, the bio-oxidation may be applied with equal facility to either the saturated or unsaturated compounds.

Representative steroids which may be oxygenated by the method of the invention include, for example, progesterone, 9(11) or 11(12)-dehydroprogesterone, 7,9(11)-bisdehydroprogesterone, 17-hydroxyprogesterone, pregnenolones, 3-hydroxy-5-pregnene-20-one, pregnenolone, 3β-hydroxy-5,16-pregnadiene-20-one, acyloxy-pregnenolones such as pregnenolone acetate, 3-hydroxy-5,6-oxidopregnane-20-one (α- or β-oxido), 3-hydroxy-5-chloropregnane-20-one, 5,6-oxidopregnane-3,20-dione (α- or β-oxido), 4-bromo and 4-chloropregnane-3,20-dione, 5-chloropregnane-3,20-dione, 3-keto-pregnane-20-ol, 3-keto-allo-pregnane-20-ol, 3β-hydroxy-16,17-oxido-21-acetoxy-5-pregnene-20-one, 3β-hydroxy-16,17-oxido-5-pregnene-20-one, 3β-hydroxy-5,6,21-tribromo-16,17-oxidopregnane-20-one, 3β-hydroxy-16-bromo-17-hydroxy-5-pregnene-20-one, 3β-hydroxy-16-chloro-17-hydroxy-5-pregnene-20-one, 3β-hydroxy-5(6),16(17)-dioxidopregnane-20-one, 3β-hydroxy-5(6),16(17)-dioxido-21-bromopregnane-20-one, 3β-hydroxy-5(6),16(17)-dioxido-21-acetoxypregnane-20-one, 3β-hydroxy-5(6),16(17)-dioxide-21-hydroxypregnane-20-one, 11-desoxycorticosterone, delta-9(11) or 11(12)-desoxycorticosterone, 11-desoxy-17-hydroxycorticosterone and acyloxy derivatives, such as the acetoxy derivative, thereof, 21-hydroxypregnenolone and 21-acyl, e. g. acetyl, esters thereof, 17,21-dihydroxypregnenolone and 17,21-diacyloxy derivatives thereof, e. g. the diacetoxy derivative, androstenedione, androstan-17-ol, 9(11) or 11(12)-dehydroandrostenedione, 3-hydroxy-9(11) or 11(12)pregnen-20-ones, 3,21-dihydroxy-9(11) or 11(12)-pregnen-20-ones, 3,17,21-trihydroxy-9(11) or 11(12)-pregnen-20-ones, 4-androsten-3-ol-17-one and 3-acyl, e. g. acetyl, esters thereof, 5-androsten-3-ol-17-one and 3-acyl, e. g. acetyl, esters thereof; ergosterol, stigmasterol, stigmastanol, and 3-acyl, e. g. acetyl, esters of the foregoing; ergostenone, stigmastenone, stigmastanone, cholestenone, cholic acid, desoxycholic acid, lithocholic acid, cholanic acid, norcholanic acid, bisnorcholanic acid, cholenic acid, norcholenic acid, bisnorcholenic acid, and 3-hydroxy-, 3-keto-, 3,7-dihydroxy-, 3,7-diketo-, 3,7,12-trihydroxy-, 3,7,12-triketo-, 9(11) or 11(12)-unsaturated, ester, thiolester, and further derivatives of the foregoing acids, and the like. Suitably a steroid having up to and including 22 carbon atoms in the carbon to carbon skeleton or a steroid having a two carbon atom side chain at the 17 position and an eleven methylene group may be used. The 10-nor-methyl, the 13-nor-methyl, and the 10,13-bisnor-methyl forms of each of the above steroids, in which either one or both of the 18 and 19 position angular methyl groups are replaced by hydrogen, are included within the purview of those steroids which may be oxygenated by the method of this invention. In the event that the 11-position is already oxygenated or substituted, the dominant product may be oxygenated additionally in another position. The 16-dehydro form of each of the above steroids is likewise included. All of these are amenable to oxygenation with Mucorales fungi, especially Rhizopus and Cunninghamella, more particularly *Rhizopus nigricans*, *Rhizopus arrhizus*, and *Cunninghamella blakesleeana* in accordance with Examples 1 and 20.

The micro-organic biochemical oxygenation is carried out with the employment of an oxygenating fungus which is a species of a genus of a family of the order Mucorales or the oxygenating enzymes obtainable therefrom. Among the several families of this order, the genera of the families Mucoraceae and Choanephoraceae are of greatest utility, and, among the genera of these families of fungi, the Rhizopus, Cunninghamella, and Mucor have been found of greatest value in the method of the present invention. Species of these genera which are operative in the method of the invention include, for example, the Rhizopus species *microsporus*, *circinans*,

*oligosporus, arrhizus, cohnii, oryzae, nigricans, chinensis, japonicus, tritici, kazensis, delemar, shanghaiensis, reflexus*, and synonymous species, which are in fact identical with those named although differently named, and the representative Mucor species *mucedo, griseo cyanus, hiemalis, hiemalis* var. *albus, rouxii, adventitius, christianiensis, circinelloides, dubius, genevensis, javanicus, microsporus, parasticus, gravensis, plumbeus, plumbeus* var. *spinesens, microsporus, ramannianus, racemosus*, and the like. While species of genera of families of the order of micro-organism generally referred to as the Mucorales, and especially those of the family Mucoraceae, are broadly operative in the method of the present invention as the oxidizing fungi, for reasons of economy and productivity, species of the genera Rhizopus and Cunninghamella are preferred, and of these genera the species *Rhizopus arrhizus*, ATCC 11145, often referred to herein as RH 176, and *Rhizopus nigricans*, ATCC 6227*b*, denoted herein as R-4, are preferably utilized for production of optimum yields of desired oxygenated steroids, although in certain cases under particular circumstances the other genera and other species may be most advantageously employed. Species of these mentioned genera, however, in particular demonstrate pronounced steroid oxygenating activity, and are thereby able, according to the method of the invention, when suitably grown and contacted with an eleven desoxysteroid, to accomplish oxygenation of the eleven position of the steroid on an industrially important scale.

Though species of certain genera of the fungi, of the genus Rhizopus in particular, the genus Cunninghamella, and the genus Mucor, all of which are of the families Mucoraceae and Choanephoraceae are practical for most abundant production of oxygenated steroids, and while economic considerations may confine preferred operation to certain species and strains possessing a distinctive physiological specificity, species of other families and genera of the order Mucorales are also operative for the production of oxygenated steroids or the conversion of 11-desoxysteroids to 11-oxygenated steroids in industrially significant quantities.

For example, other useful representative genera of the Mucoraceae family, and representative species thereof. as identified in H. Zycha, "Kryptogamenflora der Mark Brandenburg," Band VI*a*, 1-264 (1934), include Parasitella (*P. simplex*), Zygorhynchus (*Z. heterogamus, Z. moelleri*), Circinella (*C. spinosa*). Actinomucor (*A. repens*), Pirella (*P. circinans*), Absidia (*A. reflexa, A. glauca*), Spinellus (*S. sphaerosporus*), Phycomyces (*Ph. blakesleeanus, Ph. theobromatus*), Sporodinia (*Sp. grandis*), Pilaira (*P. anomala*), Pilobolus (*P. crystallinus*), Dicoccum (*D. asperum*), Tieghemella (*T. orchiditis, T. italica*). Other Mucorales families with their genera and representative species include Thamnidiaceae: Thamnidium (*Th. elegans*), Dicranophora (*D. fulva*), Chaetostylum (*C. fresenii*), Helicostylum (*H. piriforme*), Chaetocladium (*Ch. brefeldii*); Choanephoraceae: Blakeslea (*B. trispora*), Choanephora (*Ch. cucurbitarum*), Rhopalomyces (*Rh. elegans*), Cunninghamella (*C. elegans, C. verticullata*), Thamnocophalis (*Th. quadrupedata*), Mycotypha (*M. microspora*); Cepalidaceae: Piptocephalis (*P. preseniana*), Syncephalis (*S. reflexa, S. nodosa*), Spinalia (*Sp. radians*), Syncephalastrum (*S. racemosum, S. fulvium*), Dispira (*D. cornuta*), Coomensia (*C. pectinata*), Kickxella (*K. alabastrina*); Mortierellaceae: Mortierella (*M. pusilla, M. alpina*), Haplosporangium (*H. bisporale*), Dissophora (*D. decumbens*); Endogenaceae: Endogone (*E. reniformis*), Sclerocystis (*S. coromiodes*), Glaziella (*G. vesiculosa*).

Of the Rhizopus genus, species of which, as stated previously, are preferred in the method of the invention, according to H. Zycha, "Krypt. der Mark Brandenburg," Band VI*a*, 110-120 (1935), many commonly known species are synonymous. Thus *Rhizopus microsporus* may be known as *Rh. minimus, Mucor speciosus, Rh. speciosus*, and *Rh. equinus; Rhizopus circinas* may be known as *Rh. reflexus; Rhizopus oligosporus* may be known as *Rh. Delmar* or *Rh. tamari; Rhizopus arrhizus* may be known as *Rh. nodosus, Rh. ramozus, Rh. maydis, Mucor arrhizus, Mucor norvegicus, Rh. pusillus, Rh. bovinus, Rh. cambodja, Rh. chinensis*, and *Rh. tritici; Rhizopus cohnii* may be known as *Rh. suinus; Rhizopus oryzae* may be known as *Rh. japonicus* or *Rh. tonkinensis; Rhizopus nigricans* may be known as *Mucor stolonifer, Rh. niger, Rh. artocarpi, Mucor niger, Rh. nigricans* var. *minor*, or *Rh. nigricans* var. *luxurians;* and *Rhizopus echinatus* is itself a doubtful species which may be synonymous with *Rhizopus nigricans*.

Of the Cunninghamella genus, the species, *C. echinulata, C. bainieri, C. blakesleeana* (ATCC 9245), *C. elegans, C. verticulata*, and *C. berthollitiae*, among others, have been used. These Cunninghamella species and the *Mucor javanicus, Mucor advantitious auranticus, Mucor microsporus* (ATCC 8541) also demonstate, in accordance with our processes, the oxygenation and particularly the 11-oxygenation of 11-desoxysteroids, the Cunninghamella species producing especially 11$\beta$-hydroxy-steroids.

These fungal organisms including their mutants can be obtained from known sources, such as the Northern Regional Research Laboratories, Peoria, Illinois, or American Type Culture Collection, Washington, D. C., or Centraalbureau voor Schimmelcultur Baarn, Holland. Alternatively, the Mucorales fungi may be obtained from natural sources using techniques known to microbiologists.

The culture of the organism is. for the purpose and practice of the present invention, plated out from either its natural or commercial source on to bacteriological media which are favorable to the development of fungi. While fungi will grow on plate media, for example agar solidified nutrient media, the preferred media are those which permit quantitative growth under aerobic conditions. Moist solid particulate media such as bran, cereal grains, cereal grits, wood chips, shavings, sawdust, cornhusks, fibrous material such as copra, chestnuts, or lupine seeds may be used. These can be extracted with alcohol, ether or other organic solvents, to remove objectionable contaminants and growth inhibitors prior to fermentation. The carriers may optionally contain added growth factors and nutrients and may be used in layers or trays with or without auxiliary aeration, in towers as in the vinegar process or under conditions of agitation as for example by tumbling in a rotating drum. Liquid media are well adapted to use under aerobic layer or more especially aerobic submerged fermentation conditions. Suitably the media should contain sources of available carbon, nitrogen and minerals although of course there can be significant growth and development under less than optimum conditions.

Available carbon may be from carbohydrates, starches, gelatinized starches, dextrin, sugars, molasses as of cane, beet and sorghum, glucose, fructose, mannose, galactose, maltose, sucrose, lactose, pentoses, amino acids, peptones or proteins. Carbon dioxide, glycerol, alcohols, acetic acid, sodium acetate, citric acid, sodium citrate, lower fatty acids, higher fatty acids, or fats are illustrative of other materials which provide assimilable carbon for the energy requirements of the fungi. Crude sources, for example, mashed rhizomes of Mexican dioscorea, may provide a fermentation base.

Nitrogen in assimilable form may be provided by soluble or insoluble vegetable or animal proteins, soybean meal, lactalbumin, casein, egg albumin, peptones, polypeptides or amino acids, urea, ammonium salts, or ammonia trapped on base exchange resins or zeolites. Whey, distillers' solubles, corn steep liquor, or yeast extract have been useful.

As mineral constituents the media or menstruum may contain, naturally present or added, available calcium, cobalt, copper, gallium, iron, magnesium, manganese, molybdenum, potassium, scandium and vanadium. Sulfur may be provided by sulfates, alkyl sulfonates, sulfoxylates, sulfinates, sulfides, free sulfur, thiosulfate, methionine, cystine, cystein, thiamin or biotin. Phosphorus, particularly in a concentration at or about 0.001 to 0.07 and preferably 0.015 to 0.02 molar, may be present as ortho-, meta-, or pyrophosphates, salts or esters, phytin, phytate, glycerophosphate, sodium nucleinate, casein, or ovovitellin. Boron and iodine in traces may be desirable.

Other accessory growth factors, vitamins, auxins and stimulants may be provided as needed or desired. For example, while *Rhizopus nigricans* is autotrophic with respect to vitamins, the organism *Phycomyces blakesleeanus* requires thiamin or a mixture of the thiamin pyrimidine and thiamin thiazole moieties for growth, and the organism *Mucor rammanianus* requires the thiamin thiazole moiety or 4-methyl-5β-hydroxyethylthiazone as an accessory growth factor.

Suspending or mycelial carriers such as filter earths, filter aids, finely divided cellulose, wood chips, bentonite, calcium carbonate, magnesium carbonate, charcoal, activated carbon or other suspendable solid matter, methyl cellulose, carboxymethyl cellulose or alginates may be added to facilitate fermentation, aeration and filtration.

During the aerobic growth of various Mucorales, especially Rhizopus, Mucor and Mortierella, fat is synthesized. This fat synthesis may be controlled by reducing the carbohydrate available to the fungi and providing a medium in which the energy source is provided primarily by protein or protein hydrolyzate.

The nutrient medium of Peterson and Murray can be used with satisfactory results, and hereafter in the specification and the examples, unless otherwise specified, the nutrient medium is to be understood to be that of Peterson and Murray, containing, per liter of tap water, used to supply traces of elements and inorganic salts, the following: five milliliters of corn steep liquor, twenty grams of Edamine commercial lactalbumin digest, and fifty milligrams of Cerelose commercial dextrose. The pH reaction of this medium, or others which may be employed, is ordinarily adjusted to between about 4.5 and 5.9 before inoculation with the fungal organism although a higher or lower pH may be used. Autoclaving, as at ten pounds pressure for thirty minutes, to obtain aseptic conditions, effects a lowering of the pH from about 6.5 to about 5.5 to 5.9, and this reduction in pH should be taken into consideration in adjusting the medium prior to autoclaving so as to obtain optimum growth conditions upon completion of this step. Alternatively sterilization may be effected by ethylene oxide, propylene oxide, or other means. Antibiotics or antiseptics such as, for example, penicillin or sulfites may be added to inhibit or retard growth of extraneous organisms.

Inoculation of the fungal growth-supporting medium with the selected fungus of the Mucorales order may be accomplished in any suitable manner. For example the inoculation is conveniently accomplished with spores of the organism, but inoculation using vegetative mycelium is effective. The inoculum may be blended as in a Waring Blendor, homogenized or otherwise well dispersed before, during or after dilution. Growth of the fungus is readily promoted by maintaining incubation temperatures of about room temperature, e. g. twenty to twenty-eight degrees centigrade, but a relatively wide range of temperatures is suitable, e. g. from about 15 to about 45 degrees centigrade has been found satisfactory for growth of the fungal organisms although lower temperatures for longer periods of time are feasible.

The period of fungal growth required before the steroid desired to be oxygenated may be exposed to the oxygenating activity of the fungal action, or to the action of the fungal enzymes, does not appear to be critical. For example, the steroids desired to be oxygenated can be added either before sterilization, at the time of inoculating the medium with the selected Mucorales species, or at some time, e. g., 24 to 48 hours, later. In practice, it has been found that the steroid to be oxygenated can be added to the fungal culture medium as late as five days after inoculation of the medium with the selected Mucorales species, with no objectionable effect on the result.

After 24 hours of fungal growth on the medium, the pH of the medium is found to have dropped considerably, usually to about 3.5 to 5.2, depending upon the buffering content of the medium. It is at about this time period in the fungal growth that the steroid to be oxidized is preferably added, or the fungal fermentation liquor to be used in fermentive oxygenation of steroids is separated from the culture. Addition of steroid to the fermentation beer after a period of fungal growth of from zero to 16, 24 or 48 hours is the preferred manner of operation, since during this stage of fungal growth the oxygenating activity or oxygenating or oxidizing enzyme mechanism appears to be fully developed. Likewise, if the oxygenation is desired to be effected using the fermentation liquor, containing the oxygenating enzyme, alone, it is at least after this stage of growth that the fermentation liquor is usually and preferably separated.

The steroid may be added at any desired concentration although for practical reasons steroid substrate at a concentration of about or up to about 0.6 gram per liter or even 0.8 gram per liter of medium is satisfactory and two grams per liter is operative although higher concentrations may be used with some inhibition of oxygenating activity. Either a purified steroid, a crude material containing steroid, or a steroid material comprised of or consisting predominantly or essentially of steroid, for example, a mixture of steroid and fat or solvent may be used as substrate. The manner of addition of the steroid desired to be oxygenated to the oxidizing fungus, fungal medium, or fermentation beer, does not appear to be critical. The addition may be accomplished in any suitable manner so as to promote intimate contact of the steroid with the oxygenating activity of the fungus and/or fungal enzymes, such as by growing the fungal organism in the presence of finely comminuted crystals of the steroid, dispersing the steroid throughout the fungal medium, or in like manner. To this end, surface-active agents, dispersing agents, or suspending agents, such as commercially available Spans (hexitol anhydride esters of long-chain fatty acids, illustratively sorbitan monolaurate), Tweens (polyoxyalkylene ethers of hexitol anhydride long-chain fatty acid esters), Aerosols (dioctyl-sodium-sulfosuccinate), Nacconols (alkyl aryl sulfonates), and the like may be employed if desired. When the fermentation medium contains solid particles, these particles may be coated, mixed or impregnated with steroid. However, it is preferred to add the steroid to the fungus, medium or fermentation beer in the form of a coupling agent, suitably a water-miscible organic solvent, solution, such as a solution in ketones, acetone, alcohols, methanol, ethanol, isopropanol, benzyl alcohol, or even ether, which is only sparingly water-miscible, and thereafter to admix the medium and steroid thoroughly so as to form a suspension or dispersion of fine steroid particles and promote a maximum contact of medium with the steroid to be oxygenated. The steroid or steroid solution may be homogenized with water, media or other aqueous material to ensure fine dispersion. Either submerged or surface culture procedures may be employed with facility, although submerged culture is preferred. Alternatively, the fermentation liquor, oxygenating activity, or oxygenating enzymes of a growth of the fungus may be separated, admixed with the steroid or a solution thereof, and the mixture subjected to aerobic conditions to accomplish oxygenation of the steroid.

The temperature employed during the period of oxygenation of the steroid need be no different than in the absence of steroid, viz., it should only be maintained within such ranges as support life, active growth or the oxygenating activity of the fungal organism. Incubation temperature during fungal oxygenation of the steroid may thus be, for example, between about fifteen and about forty-five degrees centigrade, with room temperature, e. g., twenty to twenty-eight degrees centigrade, being preferred for optimum action of the fungal organism, oxygenating activity or enzymes although higher or lower temperatures are also utilizable.

The conditions under which the fungal organism is grown are aerobic, and the efficiency of oxygenation is related to aeration. Therefore, while any form of aerobic incubation is satisfactory, controlled aeration, as by agitation and/or blowing air through the culture medium, is usually employed. The rate of oxygenation of steroid is related to the rate of aeration, and to the extent of fungal growth at the time of addition of the steroid, it having been found that conversions using either the fungus, the fermenting broth, or the fermentation medium alone, are more rapid when the extent of aeration is controlled and also when the fungus is allowed to grow for from 16 to 24 hours prior to addition of steroid to be oxygenated. Aeration may be effected by surface culture with or without auxiliary aeration as by agitation. Under submerged fermentation conditions, aeration may be by the passage through the media of air bubbles in either fine, coarse, or both fine and coarse form. Aerobic conditions include not only the use of air to introduce oxygen, but also other oxygen sources, such as mixed oxygen and nitrogen, or hydrogen peroxide. When hydrogen peroxide is used, or the aeration is vigorous, catalase, although not necessary, may be added to inhibit destruction of the oxygenating activity of the fungus. The hydrogen peroxide may be formed in situ by ultraviolet irradiation. In using air as the aerating medium, a particularly desirable rate of aeration is about or within the range of six to eight millimoles of oxygen per hour per liter of sulfite as determined by the method of Cooper, Fernstrom and Miller, Ind. Eng. Chem., 36, 504 (1944). Optimum results are obtained using an oxygen uptake of about seven millimoles of oxygen per liter per hour as thus determined. Under some conditions it is desirable to utilize different rates of aeration during the fungus growing or developing stage as contrasted with the steroid oxygenation stage. Aeration is suitably modified by using superatmospheric pressures, illustratively thirty pounds per square inch or higher, or subatmospheric pressures, illustratively ten pounds per square inch absolute. Oxygen uptake is facilitated by the addition of various catalysts such as ascorbic acid, glutamic acid, citric acid, lactic acid, tyrosine and tryptophane. Either excessive or insufficient aeration decreases the yield of oxygenated steroid.

Anti-foaming agents, while not essential, may be added; among these being glyceride oils and waxes, soybean oil, castor oil, lard oil, olein, sulfonated oils, sulfonated castor oil, sulfonated olive oil, brominated castor oil, mineral oil, oleic acid, lard oil plus three percent octadecanol, or dioctyl phenyl phosphonid. Amounts of about 0.1 to 0.5 percent may be added during the fermentation as needed. With suitable equipment, the foam may be recirculated along with entrained air to facilitate aeration.

Fermentative oxygenation of steroids by Mucorales may take place either in the presence or absence of actinic light, visible or ultraviolet light in sublethal intensities and controlled dosage or under alternate light and darkness conditions. In some instances, as with *Phycomyces blakesleeanus*, strong light has an inhibitory effect.

The time required for the bio-oxygenation of the steroid varies according to the results desired. From about one to seventy-two hours have been found satisfactory for conversions of desoxysteroid to oxygenated steroid by the action of the oxidizing fungi, oxygenating activity, or oxidizing enzymes thereof. However, the oxygenation of the steroid begins substantially immediately upon exposure to the fermentation beer of a fully grown oxidizing fungus or oxidizing enzymes thereof, a growth of the fungus being considered fully grown in from four to twenty-four hours, depending to some extent on the extent of aeration employed. When the steroid is added to the fermentation medium at the same time as the medium is inoculated with the fungal organism, longer periods of time including the growth period are indicated for high conversions of desoxysteroid, and, as indicated previously, this is believed due to the fact that the oxygenating activity or oxidizing enzyme mechanism of the fungus is not fully developed until after some period of fungal growth. Accordingly, when the steroid is added at the time of inoculation of the medium, periods of from eight to 72 hours may be employed. On the other hand, when the steroid is added to the fungus, fungal medium, fungal enzymes, or the fermentation liquor after substantial aerobic growth of the fungal organism, e. g., after 16 to 24 hours, the conversion of the desoxysteroid to oxygenated steroid begins immediately and high yields are obtained in from one to seventy-two hours, 24 hours being satisfactory, or even shorter or longer periods, again depending upon the results desired. It may be mentioned that with the longer periods of exposure of desoxysteroid to the oxygenating action of the fungus or fungal enzymes a somewhat higher conversion to polyoxygenated derivatives occurs, but in any event oxygenation of the steroid occurs, commonly at the eleven position.

In lieu of direct contact of the steroid to be oxygenated with the fermenting media containing viable Mucorales fungi, the steroid may be oxygenated by contact with the fermented liquor, free of fungi, or with the fungi or enzymes of Mucorales preferably in the presence of an aqueous menstruum, or with the enzymes obtained from the fungi. The enzymes may be extracted by grinding the aerobically grown fungi with sand or other abrasive in the optional presence of diatomaceous earth, or the fungi may be frozen to a friable mass and ground in this condition. The fungus cells may be disrupted directly to liberate the enzymes or they may be dried and the mycelium defatted and vacuum dried to provide a suitable source of oxygenating activity. The enzymes are also recoverable from or usable as the lyophilized Mucorales fungi.

After completion of the oxyenating fermentation reaction, the oxygenated steroids or 11-oxygenated steroids are recovered from the fermentation reaction mixture in any suitable manner. In most instances the oxygenated steroid has the same number of carbon atoms in the carbon to carbon skeleton as in the carbon to carbon skeleton of the starting steroid. An especially advantageous manner of recovering the oxygenated steroids involves extracting the oxygenation reaction mixture, including especially the fermentation liquor and mycelia in cases where the steroid is added directly to the culture, with a water-immiscible organic solvent, such as a halogenated hydrocarbon, e. g., methylene chloride, ethylene chloride, chloroform, ethers, esters, amyl acetate, and the like. Another mode of extraction found suitable is to separate the mycelia from the fermentation liquor and separately extract the mycelia with solvents which may be either water-misible or water-immiscible, acetone being effective, and extract the fermentation liquor, freed of mycelia, with water-immiscible solvents. The mycelia may be lysed as by heat or chemicals before or during extraction whether or not the entire beer or the separated mycelia and liquor are to be extracted. Where heat is used to disrupt the mycelia, solvent for example, methylene chloride, may be introduced either as vapors or as liquid into the beer to obtain high efficiency of extraction. Isolation and removal, extraction or separation of the oxygenated steroids may also be in the form of their derivatives retaining the oxygenated steroid structure, as for example their esters, or urea adducts. The extracts can then be combined suitably after washing successively with an alkaline or sodium bicarbonate solution and water, the combined extracts taken to dryness by a stream of air, nitrogen, under vacuum, or in like manner, and the solids taken up in fresh organic solvent, e. g., methylene chloride or others mentioned previously, for purposes of recrystallization or purification. Fat and steroids may be conveniently separated by means of urea-adducts formed from contacting the crude solids with urea solutions. Additional recrystallization may be effected from organic solvents, e. g., methanol, if desired. The crystalline material may be characterized by known procedure therefor, such as by element analyses, melting point, infrared, X-ray diffraction, ultraviolet, microcombustion, and other determinations. Alternatively, the crystalline material or extracts of non-crystalline material, produced by the bio-oxidation, may be identified, characterized, separated and isolated according to the Zaffaroni paper chromatogram system, described in detail hereinafter.

Besides oxygenated steroids, other fermentation products such as citric acid, fumaric acid, gluconic acid, itaconic acid, kojic acid, lactic acid, enzymes, and various antibiotics may also be desirably recovered from the beer. The addition of steroid in the concentration and at the times as mentioned above, to the media and under the conditions utilized for the production of fumaric acid, as in for example the United States patents to Waksman 2,326,986 and Kane et al. 2,327,191, or lactic acid, as in for example Ward et al. 2,132,712, achieves the production of oxygenated steroids as well as useful acid by-products. The oxygenated steroids, in a heterofermentative procedure wherein other useful products are also produced, may be separated from the resultant fermentation beer before or at the time the fermentation is complete with respect to the production of fermenation products other than oxygenated steroids. After removal of the oxygenated steroid by, for example, methylene chloride or triglyceride oil, the fermentation may be permitted to proceed to completion.

An especially useful procedure in the separation of oxidation products produced according to the method of the present invention is the chromatography of extracts or solid materials, which solid materials are obtained by evaporation of extraction solvent and subsequent crystallization if desired, on an alumina ($Al_2O_3$) or other adsorbent column, using, for example, benzene as solvent, and various solvents and mixtures of solvents to develop the column, as indicated in the chromatography tables of the examples. This is especially useful in identifying the compounds produced by the oxygenation, since each fraction from the column may be tested, if desired, by the Zaffaroni procedure. As little as two to forty micrograms of material may be tested by the Zaffaroni paper chromatogram system, chemical individuals identified and isolated, as by identifiable spots, fractions containing the same chemical individuals combined, and the compound crystallized from the combined fractions.

The Zaffaroni technique, mentioned throughout the specification and examples, is a relatively new but already well-established procedure for the identification of certain organic compounds, viz., the adrenal cortical hormones and related compounds, which analytical method is based in part on the polarity of the compound tested. Literature references to this method of analysis are as follows: Burton, Zaffaroni, and Keutmann, "A new analytical method for adrenal cortical hormones," Science 110, 442 (1949) and Zaffaroni, Burton, and Keutmann, Science 111, 6 (1950). Since the polarity of organic compounds varies with variations in the molecule, including the presence or absence of certain groups (each of which groups itself introduces a certain definite effect on the polarity of the molecule as a whole), and including variations of the position of a given group in a given molecule, it is possible, by the Zaffaroni technique, to positively identify minute quantities of an organic compound of the adrenal cortex steroid series, or related steroid compounds, by their polarity. That different compounds exhibit different polarities has been known, but the Zaffaroni technique is, at present, the only practical procedure for utilizing polarity differences for the identification and isolation of minute quantities of steroid compounds.

The procedure of Zaffaroni et al. is a form of known "paper strip chromatography," and employs essentially the same principles as does ordinary chromatography as practiced using an alumina or other type column.

The method of Zaffaroni et al. is essentially as follows: First, a suitable grade of filter paper, three to four inches wide and approximately 22 inches long, is folded at a point about three inches from one end. At a point one and one-half inches below this fold, a line is drawn across the paper, marking the point for application to the paper of the steroid to be tested. The paper is then cut along its length into strips approximately three-eighths inch in width, beginning at the end opposite the end at which the steroid to be tested is to be applied. This leaves several ribbons of the paper, all of which are attached to a common tail. Each of these ribbons provides a separate "track" for each "spot" of compound tested, as will be more readily apparent from the following. Alternatively, the paper is not cut into separate tracks, and a single strip is used. In such case, however, care must be taken not to place the several compounds being tested too close together, e. g., closer than about an inch on the single paper strip. Next, a solvent system, consisting of a nonpolar solvent for the mobile phase, and a polar solvent for the stationary phase, is selected, The non-polar solvent benzene and the polar solvent formamide constitute one solvent system, and the nonpolar solvent toluene and the polar solvent propylene glycol constitute another solvent system, both of which have been successfully employed, but for some purposes the system including diethylene-glycol monoethyl ether ("Carbitol") as the stationary polar phase and methylcyclohexane as the mobile nonpolar phase have proved most satisfactory.

The filter paper is then saturated with the polar solvent, e. g., propylene glycol, and any excess removed from the paper with additional quantities of filter paper, a squeegee, an ordinary clothes wringer, or in any other suitable manner. The mobile phase (also called "the developing phase") nonpolar solvent, in this case toluene, is then saturated with the polar solvent, and the various elements are ready for assembly.

A battery jar of suitable dimension, e. g., twelve by eighteen inches, containing 100 milliliters of the nonpolar phase solvent, is lined with a large sheet of filter paper soaked in the stationary phase solvent to be employed, e. g., propylene glycol. A ring stand inside the chamber supports an instrument tray containing 350 milliliters of the mobile phase or developing solvent, e. g. toluene, which is, as previously stated, saturated with the stationary phase solvent, e. g. propylene glycol. The short fold or common tail of the paper is inserted into the reservoir of the developing solvent, e. g., the mobile phase nonpolar solvent toluene, which has been saturated with propylene glycol.

The steroid to be tested, in methanol or chloroform, is applied to the point of the application approximately one and one-half inches below the fold with a micropipette in an amount of approximately ten to 300 micrograms after the strip has been cut and saturated with the stationary phase, e. g. propylene glycol, but before inserting the tail into the reservoir. The chamber is then tightly closed with the glass cover and sealed with a silicone grease.

The mobile phase liquid then flows by adsorption over the downwardly suspended filter paper, thus "developing" the strips. These strips are developed for from four to seventy-two hours or longer, depending upon the solvent system and the particular steroid involved. After proper development, as determined by the mobilities of the compounds, the paper strips are dried at room temperature with a fan and then treated with a solution of ten milliliters of one-tenth normal silver nitrate ($AgNO_3$) to which ten drops of concentrated ammonium hydroxide and five milliliters of five percent sodium hydroxide have been added. The area on the paper strip which contains the steroid thereupon develops a brown to black color. Washing the paper with a ten percent sodium thiosulfate ($Na_2S_2O_3$) developing hypo prevents further action of the silver nitrate, and dissolves the silver oxide ($Ag_2O$), resulting in a sharp color contrast between the steroid spot and the paper background. The silver nitrate development is applicable for identification of steroids containing reducing groups, such as the ketol side chain, as is present in the adrenal cortical hormones. Alternatively, certain of the spots of steroid can be made visible by spraying with 2,4-dinitrophenylhydrazine or by utilizing their ability to absorb ultraviolet light, according to Haines and Drake, Fed. Proc. Soc. Biol. Chem. 9, 180 (March 1950). This latter development is applicable in the case of steroids having a conjugated double bond system, e. g., progesterone.

The steroid spot, originally present at the point of application, is found to have moved, with the mobile phase, a distance proportional inversely to its attraction to the stationary phase and also dependent upon its distribution coefficient between the two solvents and the adsorption-elution coefficient existing between the filter paper and the solvent system. Affinity toward the stationary phase, e. g., propylene glycol, is greatest for the steroid compounds with the greatest number of hydroxy groups, and therefore these compounds move away from the point of application more slowly than do the steroids containing a lesser number of hydroxy groups. Desoxycorticosterone, with three oxygen atoms, moves the fastest of the known corticosteroids, while the corticosteroids containing four oxygen atoms move more slowly and the corticosteroids containing five oxygen atoms move the slowest of the known corticosteroid compounds. Table I shows the arrangement of some of the known steroids according to the number of oxygens and Table II according to their mobilities:

TABLE I

| Oxygen atoms | Steroid |
|---|---|
| 2 | Progesterone. |
| 3 | 11-Desoxycorticosterone.<br>17-Hydroxyprogesterone. |
| 4 | 11-Dehydrocorticosterone.<br>17-Hydroxy-11-desoxycorticosterone (S).<br>Corticosterone. |
| 5 | 17-Hydroxy-11-dehydrocorticosterone (E).<br>17-Hydroxycorticosterone (F). |

A comparison of some of the solvent systems in relation to identification of some of the type steroid compounds containing varying numbers of oxygen atoms is shown in the following Table II, which illustrates that the system employing diethyleneglycolmonoethyl ether as the stationory phase and methylcyclohexane as the mobile phase is capable of differentiating and identifying those steroids which are less polar, and therefore faster moving, than corticosterone, while the propylene glycol-toluene solvent system is less efficient in this respect.

TABLE II

RELATIVE MOBILITIES OF SEVERAL STEROIDS IN PAPER CHROMATOGRAM STUDIES (DESCENDING ORDER OF MOBILITY)[1]

| Propylene Glyco-Toluene System | Carbitol-Methylcyclobexane System |
|---|---|
| | Progesterone |
| | Androstendione |
| | Testosterone |
| 11-Desoxycorticosterone | 11-Desoxycorticosterone |
| 17-Hydroxyprogesterone | 17-Hydroxyprogesterone |
| 11α-Hydroxyprogesterone (U-III) | 20α, 21-Dihydroxy-4-pregnene-3-one[3] |
| Corticosterone | 20β, 21-Dihydroxy-4-pregnene-3-one |
| 17-Hydroxy-11-desoxycorticosterone (S)[2] | 11α-Hydroxyprogesterone (U-III) |
| 20α, 21-Dihydroxy-4-pregnene-3-one[2] | 17-Hydroxy-11-desoxycorticosterone (S)[3] |
| 20β, 21-Dihydroxy-4-pregnene-3-one | |
| 17-Hydroxy-11-dehydrocorticosterone (E) | |
| Dihydroxyprogesterone (U-I) | |
| 17-Hydroxycorticosterone (F) | |

1 Order of mobility HO>Esters>Ketones in any given position in any given compounds.
2 Not differentiated on this system.
3 Differentiated on this system.

Reference is made to the accompanying drawings which are photographic reproductions of certain analytical results obtained according to the method of the present invention or which are pertinent to the present invention.

In the drawings:

Figure 4 is a photograph of a paper strip chromatogram of 11-keto-progesterone and the oxidation product of U-III, designated U-VI, showing them to be the same.

Figures 5 and 6 are photographs of paper strip chromatograms of bio-oxidation products of 11-desoxy-17-hydroxycorticosterone (compound S), which chromatograms are referred to as 349 SHE 32 in Examples 4 and 14(2).

Figures 7, 8, and 9 are photographs of paper strip chromatograms of bio-oxidation products of 17α-hydroxyprogesterone, referred to in Examples 5 and 14(1) as 349 SHE 36, 37, and 38.

Figure 10:
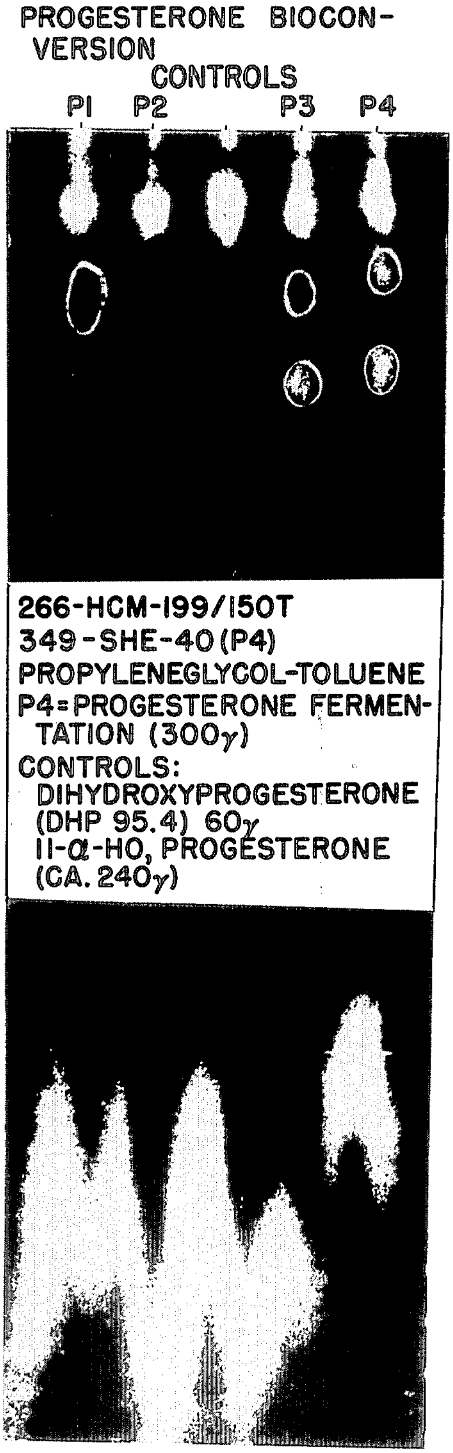

Figure 10 is a photograph of a paper strip chromatogram of bio-oxidation products of progesterone, referred to in Example 7 as 349 SHE 40$P_4$.

Figure 11:
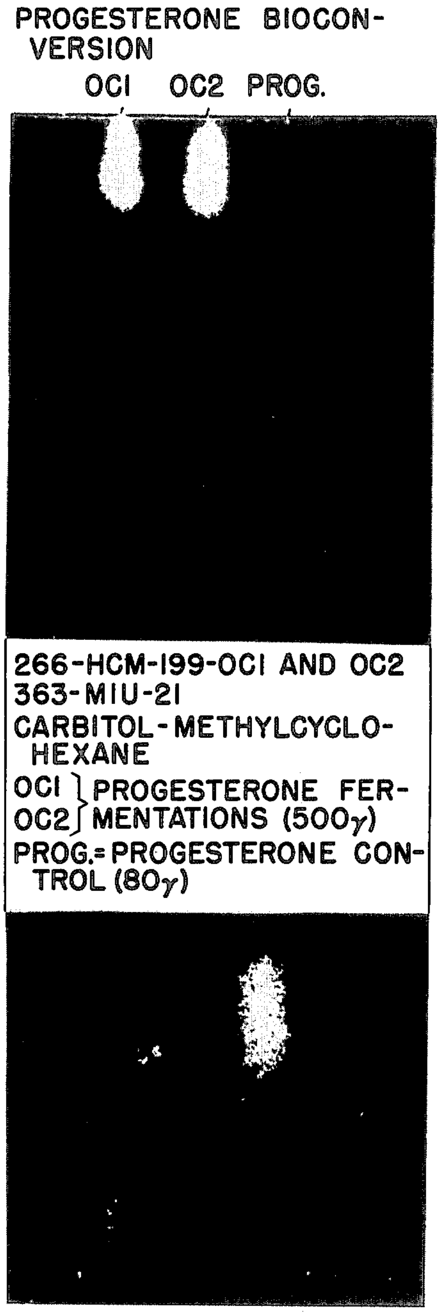

Figure 11 is a photograph of a paper strip chromatogram of bio-oxidation products of progesterone, referred to in Example 8 as 363 MIU 21.

Figure 12 is a photograph of a paper strip chromatogram of bio-oxidation product of progesterone, referred to in Example 10 as 349 SHE 44P.

Figure 12 is also a photograph of a paper strip chromatogram of bio-oxidation products of progesterone, referred to in Example 11 as 349 SHE 44$P_2$.

Figure 13 is a photograph of a paper strip chromatogram of bio-oxidation products of 11-desoxycorticosterone, referred to in Example 12 as 363 MIU 22.

Figure 14 is a photograph of a paper strip chromatogram of bio-oxidation products of 17α-hydroxyprogesterone, referred to in Example 14(3) as 349 SHE 22.

Figure 15 is a photograph of a paper strip chromatogram of bio-oxidation products of 11-desoxy-17-hydroxycorticosterone acetate (compound S acetate) referred to in Example 14(5) as 349 SHE 31.

Figure 16 is a photograph of a paper strip chromatogram of bio-oxidation products of 11-desoxycorticosterone acetate and 11-desoxycorticosterone, referred to in Examples 14(7) and 14(8) as 349 SHE 21.

Figure 17 is a photograph of a paper strip chromatogram of bio-oxidation products of 11-desoxy-17-hydroxycorticosterone (compound S), referred to in Example 14(9) as 349 SHE 25.

Figure 18 is a photograph of a paper strip chromatogram of bio-oxidation products of 11-desoxy-17-hydroxycorticosterone (compound S) and 11-desoxy-17-hydroxycorticosterone acetate (S acetate), referred to in Examples 14(10) and 14(11) as 349 SHE 26.

Figure 19 is a photograph of a paper strip chromatogram of bio-oxidation products of 11-desoxy-17-hydroxycorticosterone (compound S), referred to in Example 14(12) as 349 SHE 48.

Figures 20 and 21 are photographs of paper strip chromatograms of bio-oxidation products of androstendione, referred to in Example 15(1) as 349 SHE 70–3.

Figure 22:
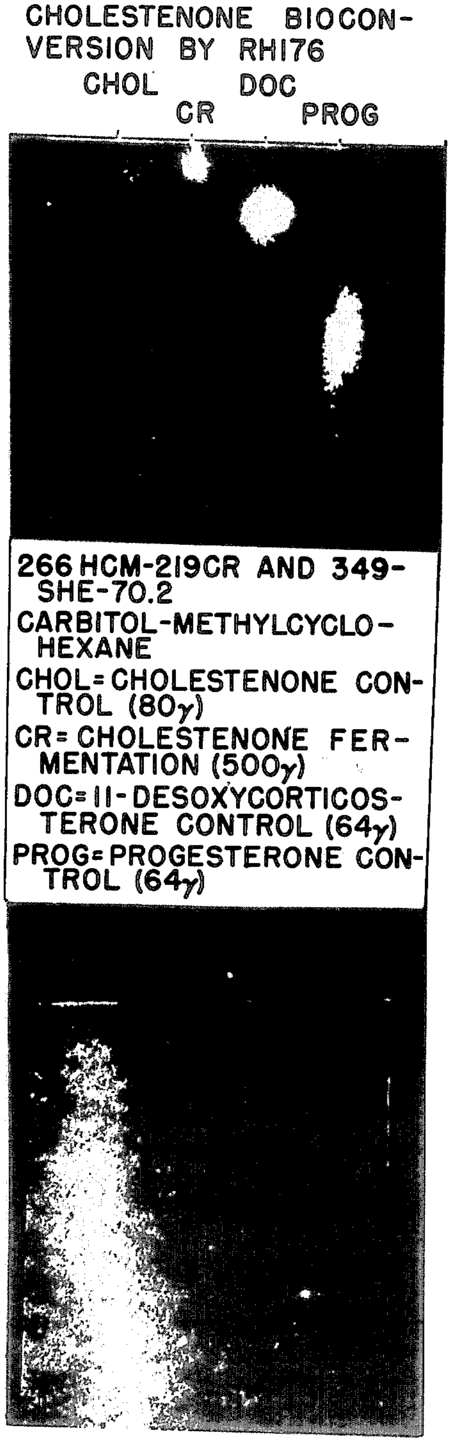

Figure 22 is a photograph of paper strip chromatogram of bio-oxidation products of cholestenone, referred to in Example 15(2) as 349 SHE 70–2.

Figure 23:
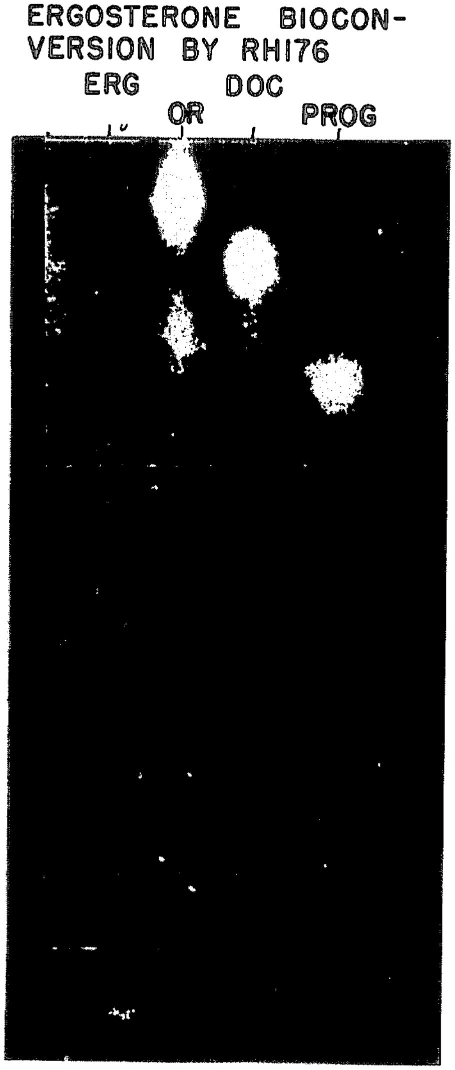

Figure 23 is a photograph of a paper strip chromatogram of bio-oxidation products of ergosterone, referred to in Example 15(3) as 349 SHE 70–1.

Figure 24 is a photograph of a paper strip chromatogram of bio-oxidation products of ergosterol, referred to in Example 15(4) as 349 SHE 70–4.

Figure 25 is a photograph of a paper strip chromatogram of bio-oxidation products of progesterone, referred to in Example 16 as 349 SHE 53.

Figure 26 is a photograph of a paper strip chromatogram of bio-oxidation products of progesterone, referred to in Examples 17(1), 17(4), and 17(5) as 349 SHE 47.

Figure 27 is a photograph of a paper strip chromatogram of bio-oxidation products of progesterone, referred to in Examples 17(2), 17(3), and 17(6) as 349 SHE 40.

Figure 28:
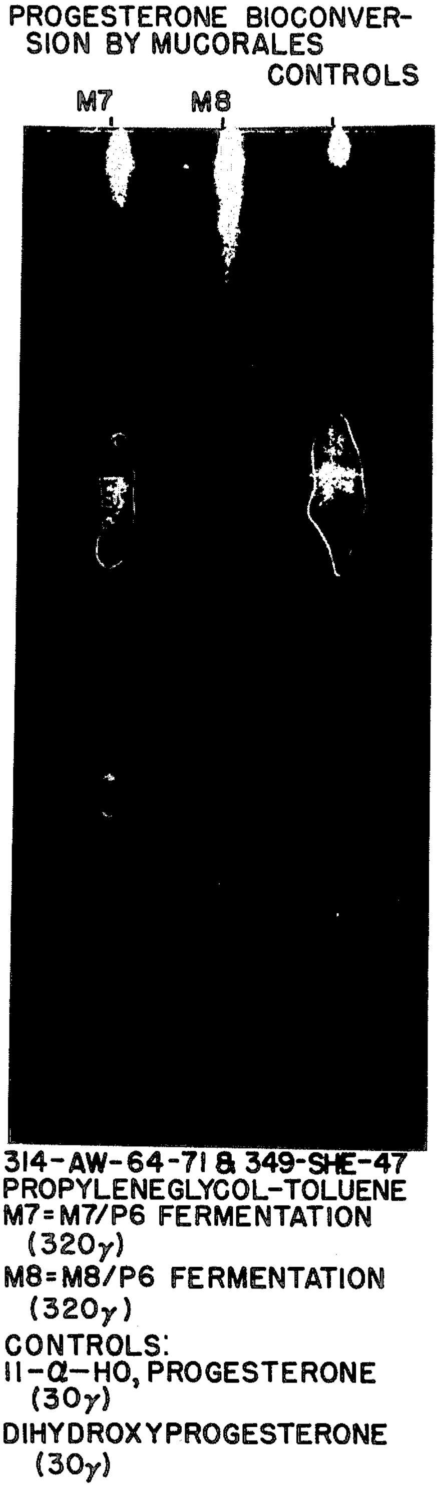

Figure 28 is a photograph of a paper strip chromatogram of bio-oxidation products of progesterone, referred to in Examples 17(7) and 17(8) as 349 SHE 47.

Figure 29:
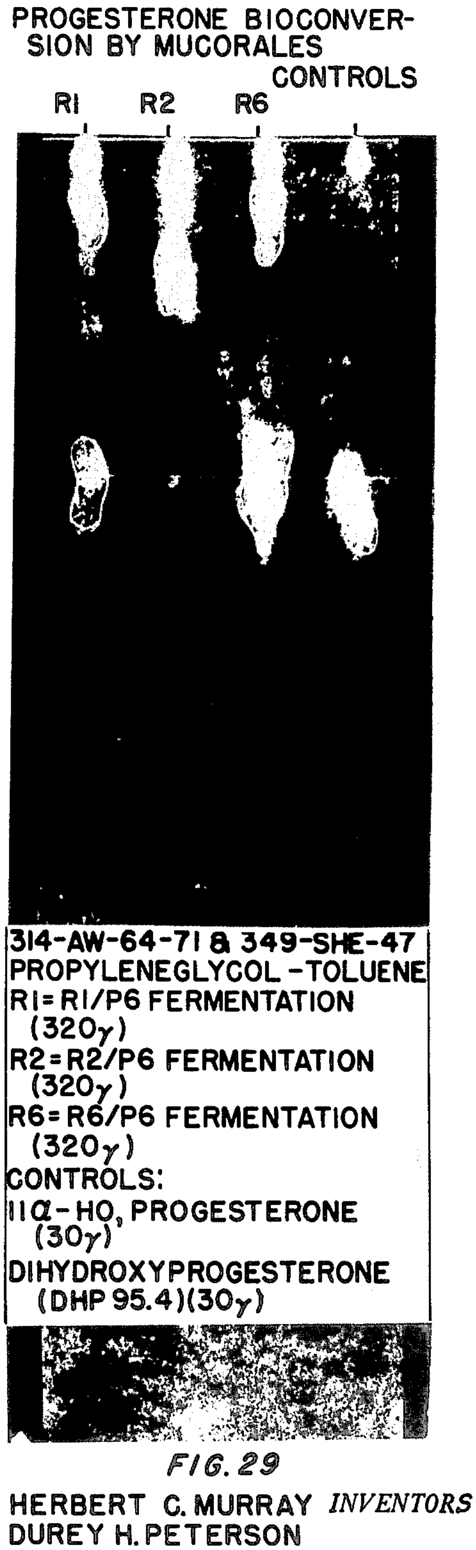

Figure 29 is a photograph of a paper strip chromatogram of bio-oxidation products of progesterone, referred to in Examples 17(9), 17(10), and 17(14) as 349 SHE 47.

Figure 30 is a photograph of a paper strip chromatogram of bio-oxidation products of progesterone, referred to in Examples 17(11) and 17(12) as 349 SHE 40.

Figure 31 is a photograph of a paper strip chromatogram of bio-oxidation products of progesterone, referred to in Examples 17(13), 17(15), and 17(16) as 349 SHE 50.

Figures 32, 33, and 34 are photographs of paper strip chromatograms of bio-oxidation products of 11-desoxycorticosterone, referred to in Examples 17(17), 17(18) and 17(19) as 349 SHE 50.

Figure 35 is a photograph of a paper strip chromatogram of bio-oxidation products of progesterone by beer filtrate, referred to in Example 18 as 349 SHE 41.

Figure 36:
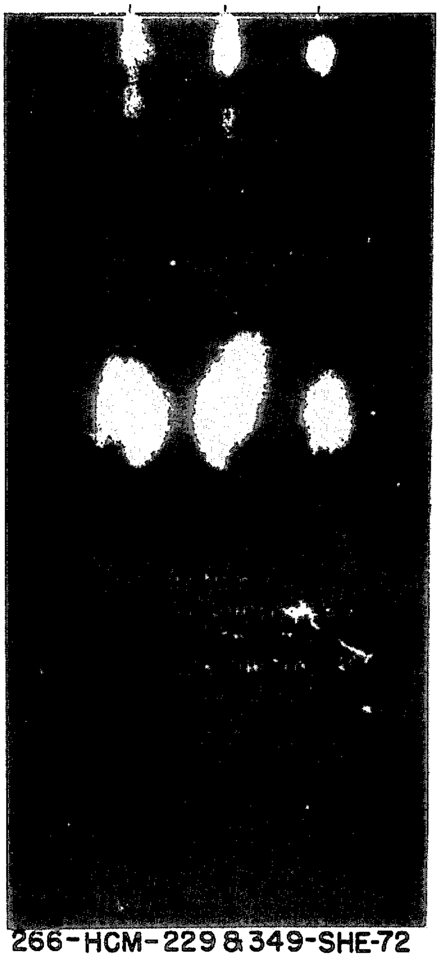

Figure 36 is a photograph of a paper strip chromatogram of bio-oxidation products of 11α-hydroxyprogesterone (U–III), referred to in Example 19 as 349 SHE 72.

The factors involved in the Zaffaroni et al. procedure are essentially as follows: (a) Affinity of steroid compounds of differing polarities for the more polar of two solvents. Thus, the more polar steroid compounds, such as those containing a hydroxy group or groups, will have greater attraction to the polar solvent than the less polar compounds, such as those containing no hydroxy groups, which in part determines in which phase the steroid will exist, and how fast the spot will move; (b) the distribution coefficient of the steroid compound being tested between two immiscible solvents, which will determine to some extent the phase in which the steroid will exist, as between the two phases produced by mixture of two immiscible solvents, and how fast the steroid will move; (c) the adsorption-elution coefficient of the steroid tested, placed in a pretreated strip of filter paper and exposed to a mixture of two immiscible solvents, which again determines to some extent in which phase the steroid will exist, and how fast the steroid will move.

The combination of these three factors determines to which point on the paper chromatogram strip the spot of steroid will move, relative to a spot of a known compound. The time allowed for development of the strip by means of the mobile phase is thus immaterial, since it is the relative location of the spot with respect to a known control which identifies the compound tested by this method. This will be readily apparent from a careful observation of the paper chromatogram photographs which accompany the following examples and are identified therewith. Each spot on the paper chromatogram should be understood to identify an individual, isolated, steroid compound, the less polar compounds, being faster moving, traveling to a position further from the point of origination than the more polar, more highly oxygenated steroid compounds which are tested in the same run. Not only is it possible thus to identify and isolate the steriod compounds tested, but it is also possible, by comparison with an appropriate control of known quantity, to determine the approximate amount of each particular steroid. It is therefore possible to determine the approximate bio-oxidative conversion of a particular starting steroid to various more highly oxygenated derivatives, since, the amount of steroid employed in the original application to the strip being known, it involves but a simple observation of the number of spots of different more highly oxygenated steroid compounds and a comparison of the relative brightness or density to arrive at an approximation of the conversion to and yield of a particular steroid bio-oxidation or other steroid transformation products.

The following examples are to be understood as illustrative only and are in no way to be construed as limiting the invention.

*Example 1.—Oxygenation of progesterone (266 HCM 179, 319 DHP 95–108)*

To four liters of a 32 to 48 hour growth of culture RH 176 (*Rhizopus arrhizus* strain) was added one gram of progesterone in fifty milliliters of acetone, providing a suspension of the steroid in the water of the culture. The culture was then incubated at room temperture for 48 hours. At the end of this time, the pH of the medium was 3.5 and the fermentation liquor and mycelium were extracted successively with three one-liter portions, one two-liter portion, and one one-liter portion of methylene chloride. The methylene chloride extracts were combined and washed with two 400-milliliter portions of two percent aqueous sodium bicarbonate solution and three 500-milliliter portions of distilled water. The methylene chloride extract was evaporated to dryness in vacuum and the solids taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly to room temperature. Seventy-five milligrams of crystals, melting at 245 to 249 degrees centigrade, separated out. These crystals are designated U–I. The crystals were dissolved in five milliliters of methanol and filtered into a centrifuge tube, the solution yielding, upon cooling, 23 milligrams of U–I crystals, 7,11-dihydroxyprogesterone, melting at 246 to 248 degrees centigrade. By the paper chromatogram method of Zaffaroni, supra, using diethylene glycol monoethyl ether as the stationary phase and methylcyclohexane as the mobile phase, these crystals produced a single more polar spot than progesterone. Microcombustions indicated the addition of two oxygen atoms to the progesterone molecule as shown below:

*Analysis.*—Calculated for progesterone: C, 80.23; H, 9.55. Calculated for dihydroxyprogesterone: C, 72.8; H, 8.7. U–I found: C, 72.8, H, 8.6.

The compound U–I showed more than one hydroxy group by infrared analysis, but otherwise retained the basic 3-keto, delta-4, and 20-keto structure of progesterone, as indicated by the infrared analysis.

Acetylation of 7,11 - dihydroxyprogesterone, compound U-I, using 0.3 milliliter of pyridine and 0.3 milliliter of acetic anhydride for 9.0 milligrams of U-I, allowing the mixture to stand at room temperature for sixteen hours, adding 12.5 milliliters of water and, after one hour at room temperature, refrigerating to obtain crystals, produced 6.7 milligrams of crystalline diacetate designated U-II, 7,11 - diacetoxyprogesterone, melting at 145 to 148 and 154 to 155 degrees centigrade. Infrared studies of this compound revealed the absence of the hydroxy group and the presence of new acetoxy groups.

The combined mother liquors, bearing solids weighing 1.5 grams, from the first crystalline compound U-I, were freed of solvent by aeration, dissolved in fifty milliliters of benzene, and chromatographed over alumina ($Al_2O_3$) as shown in Table III. Fifty grams of acid-washed alumina, dried at 45 degrees centigrade, was used as adsorbent and 100-milliliter portions of solvents were used to develop the column (see Table III). Solvent composition as reported is based upon total volume of mixed solvent in each portion or fraction. Paper chromatogram studies showed that fraction A (19 and 20 from Table III) contained only one spot which was more polar than progesterone but less polar than the compound U-I described above and which occurred in fractions 21-33.

in chloroform). Microcombustions indicated the addition of one oxygen atom to progesterone.

*Analysis.*—Calculated for $C_{21}H_{30}O_3$: C, 76.40; H, 9.10. U-III, found: C, 76.66; H, 8.92.

Infrared studies on U-III indicated the presence of one hydroxy group and the basic progesterone molecule.

The position of the hydroxy group in U-III was established as being in the eleven position by oxidation of thirty milligrams of U-III in 0.5 milliliter of glacial acetic acid using one milliliter of glacial acetic acid containing five milligrams of $CrO_3$ and five microliters of water and allowing the mixture to stand at room temperature for one hour. A few drops of methanol were then added, and, after ten minutes, the methanol was diluted to 45 milliliters with water, the solution extracted with three fifteen-milliliter portions of methylene chloride, and the methylene chloride then evaporated. The residue was crystallized from 0.5 milliliter of methanol to yield nineteen milligrams of a triketone U-VI, having a melting point of 172 to 175 degrees centigrade and an $[\alpha]_D^{24}$ of plus 158 degrees in chloroform and plus 143 degrees in acetone, the triketone structure being indicated by infrared studies. Additional infrared studies showed the new ketone group to be possibly present only in positions 1, 7, 11 or 12. No natural or synthetic 1-keto steroid is known. The physical constants of the hydroxyprogesterone U-II do not agree with those for 12α-hydroxyprogesterone [M. P. 200 to 203

TABLE III $Al_2O_3$ CHROMATOGRAPHY OF BIOLOGICALLY CONVERTED PROGESTERONE USING ORGANISM RH 176 (*Rhizopus arrhizus*)

| Fraction | Solvent | Eluate Solids, Milligrams | Paper Chromatogram |
|---|---|---|---|
| 1 | benzene | 0 | No spots. |
| 2 | do | 182.2 | |
| 3 | benzene plus 5 percent ether | 123,0 | |
| 4 | benzene plus 5 percent ether | 246.6 | No spots. |
| 5 | benzene plus 10 percent ether | 162.9 | |
| 6 | do | 18.0 | |
| 7 | benzene plus 10 percent ether | 11.2 | No spots. |
| 8 | benzene plus 50 percent ether | 128.2 | |
| 9 | do | 33.6 | |
| 10 | ether | 16.1 | |
| 11 | do | 15.4 | |
| 12 | ether plus 5 percent $CHCl_3$ | 3.8 | |
| 13 | do | 2.0 | |
| 14 | ether plus 10 percent $CHCl_3$ | 3.4 | |
| 15 | do | 3.6 | |
| 16 | ether plus 50 percent $CHCl_3$ | 3.5 | |
| 17 | do | 2.1 | |
| 18 | $CHCl_3$ | 2.5 | |
| 19 | $CHCl_3$ | 222.6 | Fraction A[1]. |
| 20 | $CHCl_3$ plus 5 percent acetone | 167.9 | |
| 21 | $CHCl_3$ plus 5 percent acetone | 23.5 | |
| 22 | $CHCl_3$ plus 10 percent acetone | 17.3 | Slowest moving spot only. |
| 23 | do | 8.7 | |
| 24 | $CHCl_3$ plus 50 percent acetone | 30.9 | |
| 25 | $CHCl_3$ plus 50 percent acetone | 6.1 | Slowest moving spot only. |
| 26 | acetone | 13.0 | |
| 27 | do | 8.4 | |
| 28 | acetone plus 5 percent methanol | 25.0 | |
| 29 | do | 4.6 | |
| 30 | acetone plus 10 percent methanol | 7.4 | |
| 31 | do | 1.4 | |
| 32 | acetone plus 50 percent methanol | 8.1 | |
| 33 | do | 5.3 | |

[1] Only one spot more polar than progesterone. Mixture of 2 spots, 1 similar fraction 20, the other more polar than fraction 20.

Fraction A was dissolved in two milliliters of hot methanol and filtered. After overnight refrigeration, 171 milligrams of crystals of a compound designated U-III, melting at 166 to 167 degrees centigrade, were obtained. Recrystallization from three milliliters of methanol produced 98.7 milligrams of U-III, 11α-hydroxyprogesterone, melting at 166 to 167 degrees centigrade and having an $[\alpha]_D^{20}$ of plus 175.9 degrees (C, 1.0127 degrees centigrade; $[\alpha]_D^{17}$ of plus 205 degrees (C, 1.0 in acetone) (Wettstein, Helv. Chim. Acta, 31, 1963 (1945)] or with 12β-hydroxyprogesterone [M. P. 164 to 167 degrees centigrade, remelts after cooling at 195 to 198 degrees centigrade; $[\alpha]_D^{15}$ of plus 205 (C, 0.502 in acetone) (Reichstein, C. A. 36, 2261 (1942)]. This leaves only the 7 and 11 positions for the new keto group of compound U-VI.

Figure 1:
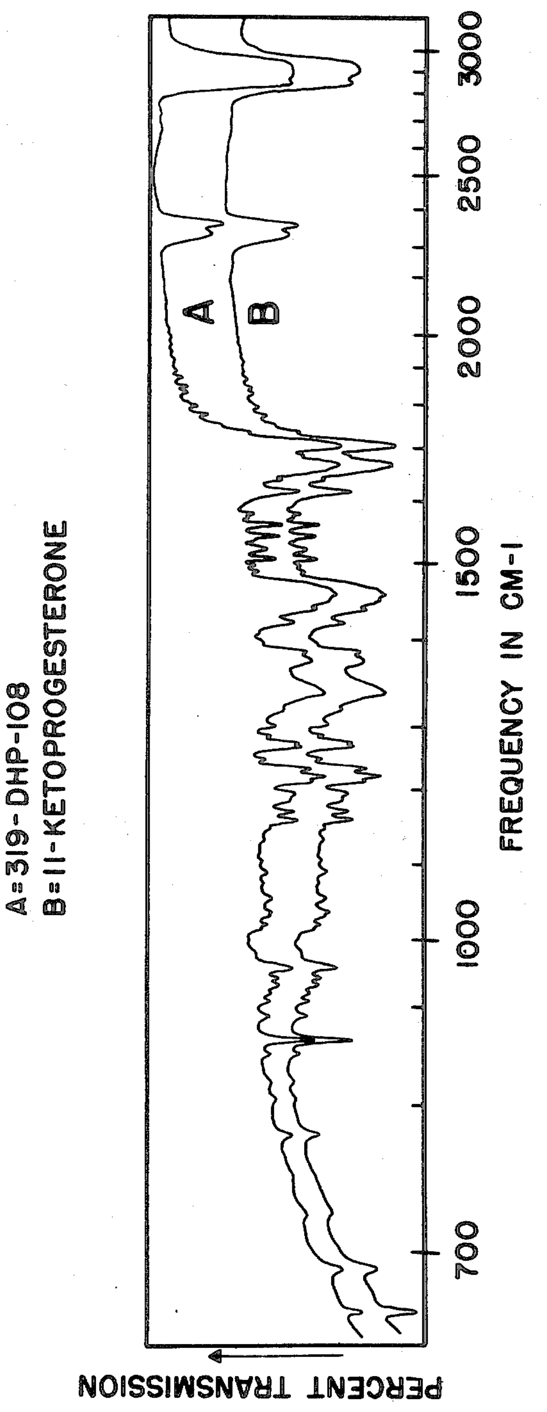
Figure 1 is a photograph comparing the infrared analysis patterns of authentic 11-ketoprogesterone and the compound U-VI, identified as 319 DHP 108. Reference is made to this figure in Example 1.
Figure 2:
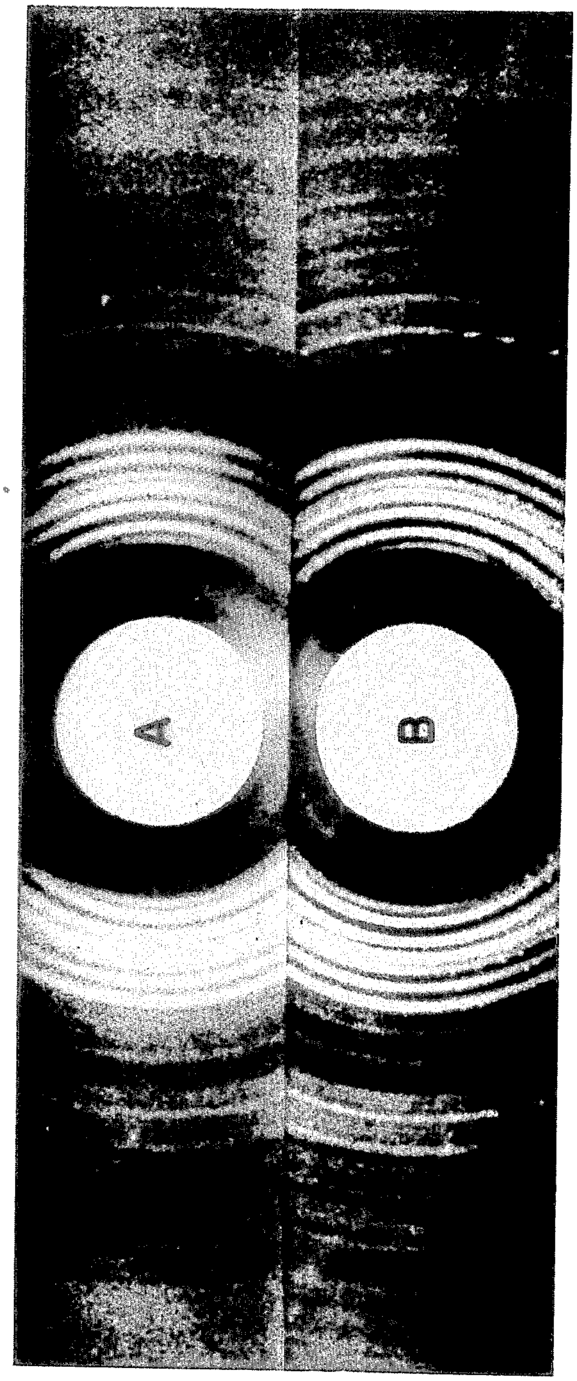
Figure 2 is a photograph comparing the X-ray diffraction patterns of authentic 11-ketoprogesterone and the compound U-VI, identified as 319 DHP 108.2. Reference is made to this figure in Example 1.

A comparison of the physical constants indicates that the triketone (compound U–VI) is 11-ketoprogesterone [M. P. 172 to 175 degrees centigrade; $[\alpha]_D^{25}$ of plus 238 degrees ±8 degrees (C, 0.9 in acetone) (Reichstein, Helv. Chim. Acta, 23, 684 (1940); ibid. 26, 721 (1942)]. When compared to authentic 11-ketoprogesterone by infrared analysis (Figure 1), X-ray diffraction (Figure 2), paper chromatography (Zaffaroni technique), and melting point studies, compound U–VI was identical with authentic 11-ketoprogesterone (see Figure 4).

The physical constants and infrared spectra of compound U–III do not agree with those for 11β-hydroxyprogesterone [M. P. 187 to 188 degrees centigrade; $[\alpha]_D^{17}$ of plus 222 to 225 degrees (C, 1.75 in acetone) Shoppee and Reichstein, Helv. Chim. Acta, 24, 351–60 (1941)]. Therefore, since U–VI shows that the oxygen introduced is in the 11 position, U–III must be 11α-hydroxyprogesterone.

Twenty milligrams of compound U–III was acetylated using 0.6 milliliter of pyridine and 0.6 milliliter of acetic anhydride. After sixteen hours at room temperature, 25 milliliters of water was added. After one hour, the preparation was refrigerated to cause crystallization. The crystals which formed were washed with water and dried to yield 16.1 milligrams of a monoacetate, 11α-acetoxyprogesterone, U–V, having a melting point of 175 to 177 degrees centigrade. Infrared analysis indicated the absence of the hydroxyl group and the presence of a new acetoxy group. Elementary micro-analysis:

*Analysis.*—Calculated for $C_{23}H_{32}O_4$: C, 74.00; H, 8.85. Found: C, 74.33; H, 8.78.

Figure 3:
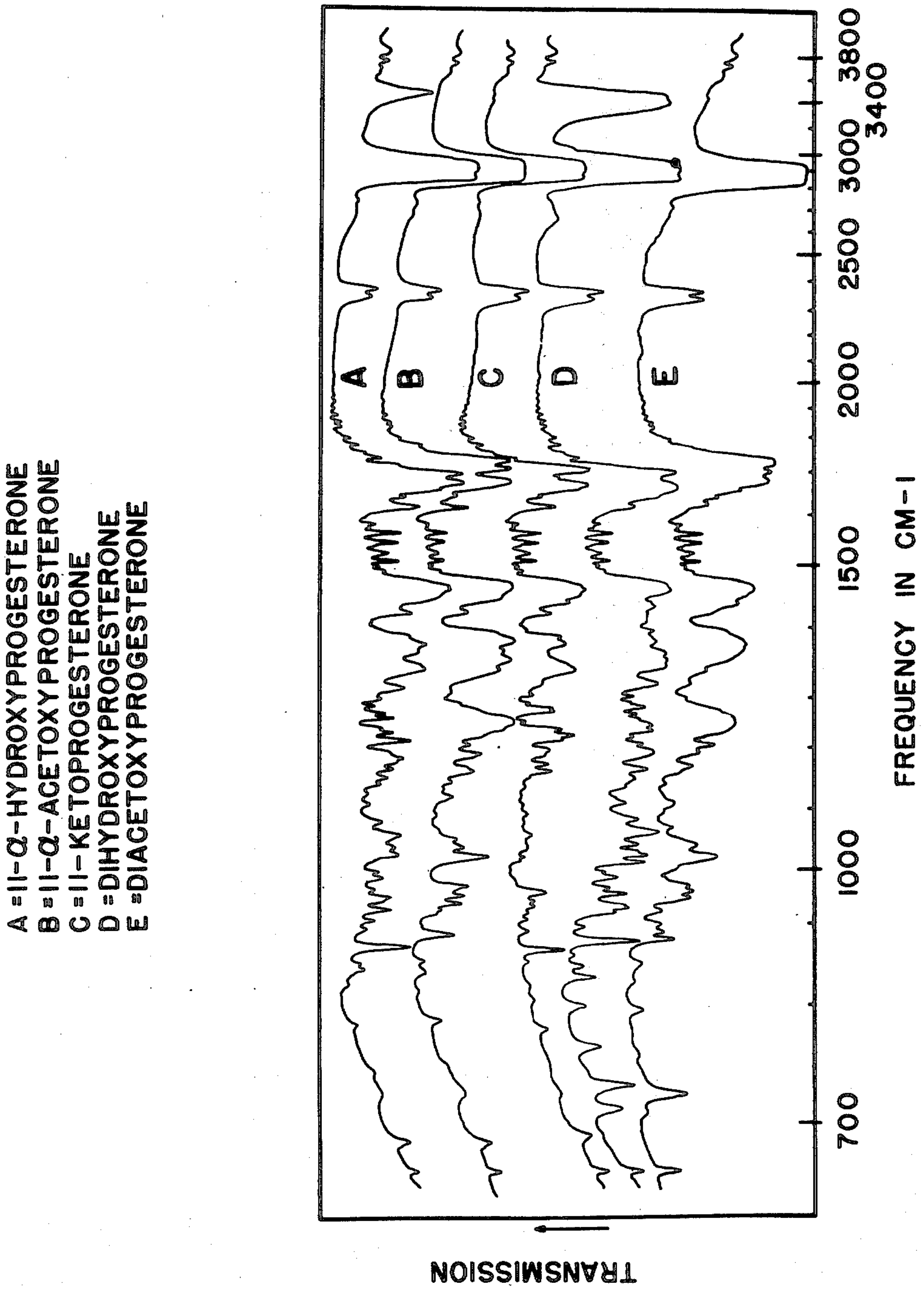
Figure 3 is a photograph comparing the infrared analysis patterns of various steriod compounds referred to in Example 1.

Figure 3 is a photograph comparing the infrared curves of some of the compounds mentioned above.

*Example 2.—Oxygenation of progesterone (226 HCM 206 PB, 190 GBS 244)*

To a 24-hour growth of organism RH 176 (*Rhizopus arrhizus* strain) in 4.0 liters of media was added one gram of progesterone in fifty milliliters of acetone. After incubation and shaking in the presence of air for 24 hours, the fermentation beer was extracted as described in Example 1. The methylene chloride extracts were washed twice with 300 milliliters of two percent sodium bicarbonate and twice with 500 milliliters of distilled water, the combined extracts dried with a minimum of anhydrous sodium sulfate and six milliliters of this solution, representing two milligrams of the original progesterone, was used for Zaffaroni paper chromatogram studies, using the solvents employed in Example 1. These studies indicated a high conversion to the 11α-hydroxyprogesterone. The remaining methylene chloride extract was evaporated to dryness with an air stream. The solids (1.584 grams) were dissolved in 100 milliliters of benzene, and an insoluble fraction (190 GBS 244–2) of 145 milligrams filtered off. The melting point of this compound was 190 to 230 degrees centigrade. A total of ninety milligrams of compound U–I, M. P. 230 to 240 degrees centigrade, was recovered as crystals by dissolving the insoluble fraction (145

TABLE IV $Al_2O_3$ CHROMATOGRAPHY OF BIOLOGICALLY CONVERTED PROGESTERONE USING ORGANISM RH 176 (*Rhizopus arrhizus*)

| Fraction | Solvent | Eluate Solids Milligrams | Paper Chromatogram |
|---|---|---|---|
| 1 | benzene | 208 | |
| 2 | do | 12 | |
| 3 | benzene plus 5 percent ether | 4 | |
| 4 | do | 14 | |
| 5 | benzene plus 10 percent ether | 37 | |
| 6 | do | 19 | |
| 7 | benzene plus 50 percent ether | 7 | |
| 8 | do | 19 | |
| 9 | ether | 4 | |
| 10 | do | 16 | |
| 11 | ether plus 5 percent $CHCl_3$ | 8 | |
| 12 | do | 4 | |
| 13 | ether plus 10 percent $CHCl_3$ | 0 | |
| 14 | do | 0 | |
| 15 | ether plus 50 percent $CHCl_3$ | 4 | |
| 16 | do | 2 | |
| 17 | $CHCl_3$ | 11 | Fraction B. Single spot of 11α-hydroxyprogesterone U–III, plus traces of three other more slowly moving compounds. (fractions 17–21) |
| 18 | do | 265 | |
| 19 | $CHCl_3$ plus 5 percent acetone | 235 | |
| 20 | do | 60 | |
| 21 | $CHCl_3$ plus 10 percent acetone | 16 | |
| 22 | $CHCl_3$ plus 10 percent acetone | 22 | Mixture of dihydroxyprogesterone U–I and two more polar compounds. |
| 23 | $CHCl_3$ plus 50 percent acetone | 27 | |
| 24 | do | 37 | Same as fraction 22, but less of two spots in 22 and more of a third and fourth. |
| 25 | acetone | 29 | |
| 26 | do | 43 | Compound less polar than the two spots in fraction 22, but more polar than 11α-hydroxyprogesterone U–III. |
| 27 | acetone plus 5 percent methanol | 16 | |
| 28 | do | 24 | |
| 29 | acetone plus 10 percent methanol | 4 | |
| 30 | do | 0 | |
| 31 | acetone plus 50 percent methanol | 1 | |
| 32 | do | 23 | |
| 33 | methanol | 9 | |

milligrams) in twenty milliliters of acetone with heat, concentrating the solution to ten milliliters, and refrigerating. The crystals which formed were shown by Zaffaroni paper chromatogram and melting point to be the dihydroxy compound, 7,11-dihydroxyprogesterone, compound U-I. The filtrate containing 1.439 grams of solids was chromatographed over an alumina ($Al_2O_3$) column (Table IV) by the technique described in Example 1, using 100-milliliter portions of solvents to develop the column. Fraction B from the chromatograph separation (Table IV) containing 571 milligrams of the 11α-hydroxyprogesterone (compound U-III) was dissolved in twenty milliliters of methanol, twenty milliliters of water added to the solution, and the solution heated and then cooled in a refrigerator. An additional twenty milliliters of water was added, and refrigeration continued. Crystallization occurred and 300 milligrams of dried crystals of 11α-hydroxyprogesterone (compound U-III) melting at 165 to 166 degrees centigrade, were recovered.

A summary of a number of bio-oxidations is presented in Table V.

the solution filtered. After refrigerating overnight, there was recovered 1.15 grams of crystalline product, melting point 163 to 166 degrees centigrade. The yield of crystalline (U-III) 11α-hydroxyprogesterone was 29 per cent (279 BJM 205). A small second crop of crystals was also obtained.

*Example 4.—Oxygenation of 11-desoxy-17-hydroxycorticosterone (S)*

Using a sixteen-hour growth of culture RH 176 (*Rhizopus arrhizus* strain), one gram of compound S in fifty milliliters of methanol was incubated for four hours at room temperature (266 HCM 213), in the presence of air.

The fermentation media, now at pH 3.8, was extracted with one two-liter portion of methylene chloride and then successively with three one-liter portions of methylene chloride. The extracts were pooled and washed twice each time with 500 milliliters of two percent sodium bicarbonate solution. The methylene chloride extracts were then combined and washed twice, each time with 500-milliliter portions of distilled water.

TABLE V

| Fermentation | | | | Fractions Recovered on $Al_2O_3$ Column | | | | Reference |
|---|---|---|---|---|---|---|---|---|
| Run | Progesterone added, Milligrams | Volume of Medium, Liters | Incubation Period, Hours | Progesterone, Milligrams | 11α-Hydroxyprogesterone U-III, Milligrams | Dihydroxyprogesterone U-1, Milligrams | Other Transformation Products | |
| 266 HCM 179 | 1,000 | 4 | 48 | 0 | 391 | 142 | 18 | 319 DHP 95 |
| 266 HCM 195 | 1,200 | 4 | 67 | 0 | 507 | 222 | 95 | 299 BJM 195 |
| 266 HCM 206PA | 1,000 | 4 | 24 | 0 | 571 | 225 | 94 | 329 RBO 60 |
| 266 HCM 206PB | 1,000 | 4 | 30 | 0 | 471 | 265 | 120 | 190 GBS 244 |
| 266 HCM 212 | 3,000 | 10 | 24 | ---------- | 1,520 | 1,260 | 76 | 329 RBO 63 |

*Example 3.—Oxygenation of progesterone (266 HCM 218, 358 VRS 5)*

One milliliter of a sterile physiological saline suspension of the spores (conidia) from a ten-milliliter malt agar-Edamine solid medium slant (five days old) were used to inoculate a sterile 150-milliliter medium of 2 percent Edamine, 5 per cent dextrose, 0.5 percent corn steep liquor, and tap water. This 150-milliliter culture was agitated and aerated by shaking for 24 hours to promote heavy vegetative growth. One hundred milliliters of this vegetative growth was transferred to four liters of sterile medium which was aerated and agitated for 24 hours by shaking, four grams of progesterone in forty milliliters of methanol was then added, and aeration continued. After an additional 24 hours and 45 minutes, the medium was removed for extraction with methylene chloride as described in Example 1, a total of four liters of methylene chloride being used. The methylene chloride solution was worked up and concentrated to give 4.38 grams of residue. This material was chromatographed as previously described in Example 1 to give the following fractions (358 VRS 5):

| Fractions | Composition | Grams |
|---|---|---|
| Benzene insol | 7,11-Dihydroxyprogesterone (U-I) | 0.635 |
| 14-16 | Progesterone | 0.694 |
| 20-22 | 11α-Hydroxyprogesterone (U-III) | 1.994 |
| 23-25 | Tails (Mono and dihydroxy cpds.) | 0.437 |

The 11α-hydroxyprogesterone (U-III) fraction was dissolved in fifteen milliliters of warm methanol, two milliliters of water added, and The combined and washed methylene chloride extracts were then freed of water with a minimum of anhydrous sodium sulfate, and then freed of methylene chloride by a stream of air. A small aliquot of the sample was subjected to paper chromatogram studies with the result that a new slow moving spot appeared along with another (349 SHE 32). The total solids, amounting to 1.5286 grams, as in Example 1, were dissolved in benzene and chromatographed over $Al_2O_3$ as indicated in Table VI. One of the slow moving spots prevailed in fraction C of the chromatogram and was used to crystallize out a compound different than the starting material, compound S. Fraction C, weighing 376.5 milligrams, was dissolved in two milliliters of hot methanol and filtered. Using a stream of nitrogen, the volume was reduced to 1.5 milliliters, whereupon crystals formed. These weighed 152 milligrams and had a melting point of 198 to 210 degrees centigrade. Recrystallization using one milliliter of hot methanol produced 35.6 milligrams, melting point 223 to 226 degrees centigrade. Recrystallization of this latter product produced pure crystals of 6β,17α,21-trihydroxy-4-pregnene-3,20-dione melting at 222 to 225 degrees centigrade (319 DHP III). This compound is oxygenated in the six position of the steroid nucleus.

*Analysis.*—Calculated for $C_{21}H_{30}O_5$: C, 69.58; H, 8.35. Found: C, 69.66; H, 8.20.

*Example 5.—Eleven Oxygenation of 17α-hydroxyprogesterone*

Using a 24-hour growth of culture RH 176 (*Rhizopus arrhizus* strain). One gram of 17α-

TABLE VI $Al_2O_3$ CHROMATOGRAPHY OF BIOLOGICALLY CONVERTED 11-DESOXY-17-HYDROXYCORTICOSTERONE (S) USING ORGANISM RH 176 (*Rhizopus arrhizus* STRAIN)

| Fraction | Solvent | Eluate Solids, Milligrams | Paper Chromatogram |
|---|---|---|---|
| 1 | benzene | 281.5 | |
| 2 | do | 47.9 | |
| 3 | benzene plus 5 percent ethyl ether | 78.4 | |
| 4 | do | 58.5 | |
| 5 | benzene plus 10 percent ethyl ether | 12.0 | |
| 6 | do | 0.8 | |
| 7 | do | 2.3 | |
| 8 | benzene plus 50 percent ethyl ether | 4.2 | |
| 9 | do | 5.6 | |
| 10 | ether | 7.0 | |
| 11 | do | 7.6 | |
| 12 | ether plus 5 percent $CHCl_3$ | 21.6 | A, No spots. (fractions 12–15) |
| 13 | do | 39.9 | |
| 14 | ether plus 10 percent $CHCl_3$ | 32.5 | |
| 15 | do | 15.7 | |
| 16 | ether plus 50 percent $CHCl_3$ | 7.9 | |
| 17 | ether plus 50 percent $CHCl_3$ | 15.2 | B, No spots. (fractions 17–20) |
| 18 | $CHCl_3$ | 76.2 | |
| 19 | do | 53.3 | |
| 20 | $CHCl_3$ plus 5 percent acetone | 20.1 | |
| 21 | $CHCl_3$ plus 5 percent acetone | 6.4 | |
| 22 | $CHCl_3$ plus 10 percent acetone | 3.6 | |
| 23 | do | 2.2 | |
| 24 | $CHCl_3$ plus 50 percent acetone | 7.5 | |
| 25 | do | 9.0 | |
| 26 | acetone | 22.5 | C, Slow moving spot. (fractions 26–33) |
| 27 | do | 19.1 | |
| 28 | acetone plus 5 percent methanol | 62.9 | |
| 29 | do | 43.7 | |
| 30 | acetone plus 10 percent methanol | 46.1 | |
| 31 | do | 27.8 | |
| 32 | acetone plus 50 percent methanol | 44.4 | |
| 33 | do | 14.1 | |

hydroxyprogesterone in fifty milliliters of methanol was incubated for 48 hours at room temperature in the presence of air.

The fermentation media (pH 3.6) was extracted with one two-liter portion of methylene chloride and then successively with three one-liter portions of the same solvent. The extracts were combined and washed twice with 500 milliliters of two percent sodium bicarbonate solution. The methylene chloride extracts were then combined

TABLE VII $Al_2O_3$ CHROMATOGRAPHY OF BIOLOGICALLY CONVERTED 17α-HYDROXYPROGESTERONE USING ORGANISM RH 176 (*Rhizopus arrhizus* STRAIN)

| Fraction | Solvent | Eluate Solids, Milligrams | Paper Chromatogram |
|---|---|---|---|
| 1 | benzene | 357.8 | No spots. |
| 2 | do | 46 | |
| 3 | benzene plus 5 percent ethyl ether | 5 | |
| 4 | do | 14 | A, 17α-hydroxyprogesterone. (fractions 4–17) |
| 5 | benzene plus 10 percent ethyl ether. | 19 | |
| 6 | do | 17.7 | |
| 7 | do | 12.2 | |
| 8 | benzene plus 50 percent ethyl ether. | 41.4 | |
| 9 | do | 58.7 | |
| 10 | ether | 72.3 | |
| 11 | do | 72.2 | |
| 12 | ether plus 5 percent $CHCl_3$ | 47.9 | |
| 13 | do | 28.2 | |
| 14 | ether plus 10 percent $CHCl_3$ | 13.5 | |
| 15 | do | 10.5 | |
| 16 | ether plus 50 percent $CHCl_3$ | 8.6 | |
| 17 | do | 12.9 | |
| 18 | $CHCl_3$ | 54.2 | B, One spot and trace of 17α-hydroxyprogesterone. (fractions 18–21) |
| 19 | do | 144.3 | |
| 20 | $CHCl_3$ plus 5 percent acetone | 87.9 | |
| 21 | do | 20.2 | |
| 22 | $CHCl_3$ plus 10 percent acetone | 32.6 | C, Contained two spots. (fractions 22–33) |
| 23 | do | 16.2 | |
| 24 | $CHCl_3$ plus 50 percent acetone | 54.0 | |
| 25 | do | 45.0 | |
| 26 | acetone | 126.1 | |
| 27 | do | 61.9 | |
| 28 | acetone plus 5 percent methanol | 61.2 | |
| 29 | do | 27.8 | |
| 30 | acetone plus 10 percent methanol | 21.3 | |
| 31 | do | 10.9 | |
| 32 | acetone plus 50 percent methanol | 25.4 | |
| 33 | do | 6.8 | |

and washed twice each time with two 500-milliliter portions of distilled water. The combined and washed methylene chloride extracts were then freed of water with a minimum of sodium sulfate and then freed of methylene chloride by vacuum distillation. Paper strip chromatography showed three spots different from 17α-hydroxyprogesterone (349 SHE 36–38). The total solids, 1.8849 grams, as in Example 1, were dissolved in benzene and chromatographed over $Al_2O_3$ as indicated in Table VII. One of the spots prevailed in fraction B and the solids, 307 milligrams, were crystallized from one milliliter of hot methanol. Upon cooling, 61 milligrams of crystals melting at 178 to 210 degrees centigrade, were obtained. Recrystallization from 0.5 milliliter of methanol produced 25 milligrams of crystals, melting point 219 to 222 degrees centigrade. Recrystallization produced pure crystals of 11,17-dihydroxyprogesterone having a melting point of 220 to 223 degrees centigrade (319 DHP 111).

*Analysis.*—Calculated for 11,17-dihydroxyprogesterone: C, 72.8; H, 8.60. Found: C, 73.01; H, 8.65.

*Example 6.—Oxygenation of 11-desoxycorticosterone*

Using a 64-hour growth of culture RH 176 (*Rhizopus arrhizus* strain) one gram of 11-desoxycorticosterone in four liters of media was incubated at room temperature for 54 hours (266 HCM 186). The fermentation liquor and mycelia were extracted successively with one two-liter portion and three one-liter portions of methylene chloride. The methylene chloride extracts were then combined and washed with two 500-milliliter portions of two percent aqueous sodium bicarbonate solution and finally with two 500-milliliter portions of distilled water. The methylene chloride extract was concentrated to dryness by a stream of air and the solids taken up in fifty milliliters of methylene chloride. The solution was transferred to a 100-milliliter beaker and evaporated by a stream of air. The solids, weighing 1.4218 grams, were dissolved in benzene and chromatographed over alumina ($Al_2O_3$) as shown in Table VII–A. Combined eluate fractions 19 through 30 indicated the formation of three slower-moving components, with one spot predominating. An aliquot of this showed biological activity, indicating approximately five percent conversion in terms of corticosterone by the rat liver glycogen assay of Pabst et al., Endocrinology 41, 55 (1947). The remaining material, 200 milligrams, was crystallized from one milliliter of methanol to give 26 milligrams of crystals melting at 180 to 189 degrees centigrade. Recrystallization of this material two times yielded eight milligrams of 6-hydroxy-11-desoxycorticosterone crystals melting at 190 to 192 degrees centigrade. Infrared studies indicated the addition of a hydroxy group to 11-desoxycorticosterone by the action of organism RH 176 (319 DHP 106, 326 MIU 61 and 78, 365 DAL 2.4).

*Example 7.—Oxygenation of progesterone (266 HCM 199/150 T)*

One hundred and fifty milligrams of progesterone in about three milliliters of acetone was added to 150 milliliters of medium (described above) containing sixty milligrams of Tween 40, polyoxyalkylene ether of hexitol anhydride long-chain fatty acid ester, at the time of spore inoculation with RH 176. In 72 hours, complete conversion was indicated and about thirty per-cent conversion to the 11α-hydroxyprogesterone (compound U-III) had occurred, by paper chromatogram 349 SHE $40P_4$ using a Carbitol-methylcyclohexane solvent system for showing progesterone utilization, and toluene-propylene glycol system for degree and type of conversion.

TABLE VII–A $Al_2O_3$ CHROMATOGRAPHY OF BIOLOGICALLY CONVERTED 11-DESOXYCORTICOSTERONE USING ORGANISM RH 176 (*Rhizopus arrhizus* STRAIN)

| Fraction | Solvent | Eluate Solids, Milligrams |
|---|---|---|
| 1 | ether | 230.3 |
| 2 | do | 155.0 |
| 3 | do | 15.8 |
| 4 | ether plus 10 per cent $CHCl_3$ | 8.0 |
| 5 | do | 2.5 |
| 6 | do | 1.5 |
| 7 | ether plus 50 per cent $CHCl_3$ | 2.1 |
| 8 | do | 2.8 |
| 9 | do | 3.9 |
| 10 | $CHCl_3$ | 5.8 |
| 11 | do | 228.6 |
| 12 | do | 114.2 |
| 13 | $CHCl_3$ plus 5 per cent acetone | 42.7 |
| 14 | do | 17.9 |
| 15 | do | 14.6 |
| 16 | $CHCl_3$ plus 10 percent acetone | 10.8 |
| 17 | do | 7.4 |
| 18 | do | 5.9 |
| 19 | $CHCl_3$ plus 50 percent acetone | 15.8 |
| 20 | do | 8.7 |
| 21 | do | 24.5 |
| 22 | acetone | 32.1 |
| 23 | do | 14.4 |
| 24 | do | 9.9 |
| 25 | acetone plus 5 per cent methanol | 34.0 |
| 26 | do | 22.3 |
| 27 | do | 13.8 |
| 28 | methanol | 73.8 |
| 29 | do | 25.6 |
| 30 | do | 15.6 |

*Example 8.—Oxygenation of progesterone (266 HCM 199 OCI)*

A five-day aerated growth of RH 176 in 150 milliliters of medium was incubated after addition of 150 milligrams of progesterone in three milliliters of acetone, the concentration being one milligram per milliliter. After 32 hours, no progesterone remained and conversion to compounds U-I and U-III was complete, conversion to U-III, 11α-hydroxyprogesterone, being about fifty percent, by paper chromatogram 363 MIU 21, using a Carbitol-methylcyclohexane solvent system for showing progesterone utilization, and propylene glycol-toluene system for degree and type of conversion.

*Example 9.—Oxygenation of progesterone (266 HCM 206 PB, 279 BJM 198, 329 RBO 60)*

Similarly, a 41-hour growth of RH 176 was aerated for thirty hours with one gram of progesterone, added in forty milliliters of acetone, and a 47 percent yield of 11α-hydroxyprogesterone (compound U-III) obtained by extraction of the fermentation liquor and mycelia. The yield of dihydroxy compound (U-I), 7,11-dihydroxyprogesterone, was about 26.5 percent, the yields being determined after separation by chromatography on an alumina column and before recrystallization. These products were recrystallized by the procedure of Example 1 to give high yields of the two compounds.

*Example 10.—Oxygenation of progesterone (266 HCM 212/300 B)*

Three hundred milligrams of progesterone in about three milliliters of acetone was added to 150 milliliters of a 24-hour RH 176 culture and the culture aerated for 24 hours. Conversion of progesterone to 11α-hydroxyprogesterone (compound U-III) was about sixty percent, correcting for unused progesterone, about 37 percent overall yield, by paper chromatogram 349 SHE $44P_1$, using a Carbitol-methylcyclohexane solvent system for detecting progesterone, and toluene propyleneglycol system for differentiating conversion products.

*Example 11.—Oxygenation of progesterone (266 HCM 199/300 T)*

The above example was repeated, using 150 milliliters of medium, inoculating with RH 176, and adding three hundred milligrams of progesterone in three milliliters of acetone. The concentration was two grams per liter of medium. No inhibition of utilization of progesterone was observed after 72 hours by paper chromatogram 349 SHE $44P_2$ and by observing growth of the culture, but yields of U-III and U-I were smaller than usual. Similarly, addition of progesterone to the culture medium (*a*) at the time of original inoculation of the medium with RH 176, (*b*) twenty-four hours after inoculation, and (*c*) five days after inoculation of the medium, produced no significant variation in type of compounds produced; namely, the dihydroxyprogesterone U-I and U-III, 11α-hydroxyprogesterone.

*Example 12.—Oxygenation of 11-desoxycorticosterone (266 HCM 204 DR)*

The procedure of Example 1 was repeated with a 24-hour culture of RH 176 and several new oxygenated steroids and 11-oxygenated steroids produced, as shown by the Zaffaroni paper chromatogram using diethylene glycol monoethyl ether as the stationary phase and methylcyclohexane as the mobile phase (363 MIU 22).

*Example 13.—Eleven oxygenation of 3-hydroxypregnane-20-one*

In the same manner as given above for the oxygenation of 17α-hydroxyprogesterone in the eleven position of the steroid nucleus, 3β-hydroxypregnane-20-one is oxygenated in the eleven position of the nucleus by exposure to the action of the culture of RH 176, a *Rhizopus arrhizus* strain.

*Example 14.—Eleven oxygenation of steroids*

In the same manner as given above in the preceding examples, the following steroids were oxygenated in the eleven position, the exact data being as indicated in Table VII-B.

*Example 15.—Oxygenation of steroids (266 HCM 219)*

Three hundred milliliters of the two percent Edamine, five percent dextrose, and corn steep liquor medium, having a pH of 6.5, was inoculated with spores of organism RH 176 (*Rhizopus arrhizus* strain) and agitated aerobically for 24 hours. From this medium, twenty-milliliters samples were transferred to sterile 100-milliliter flasks, and to each of these samples was added approximately six milligrams of the following steroid substrates, dissolved in a maximum of 0.3 milliliter of acetone, to produce a fine suspension of the steroid. After 24 hours, these flasks were extracted for determination of changes by paper chromatogram. Table VIII indicates the steroids treated, the pH just prior to extraction and the reference to the chromatogram of the accompanying figures.

TABLE VII-B

| Run | Growth Period, Hrs. | Steroid | Steroid, Amt. | Medium, Amt. | Reaction | Results |
|---|---|---|---|---|---|---|
| 1. (266 HCM 214) RH 176 *Rhizopus arrhizus.* | 24 | 17-Hydroxyprogesterone. | 1 gm. in 60 ml. acetone. | 4 liters, pH 5.9 after sterilization, 3.9 after reaction. | 24 hours with aeration. | Three major components, two faster moving than U-I and one possibly coinciding with U-I. All three in about equal amounts. Minor fourth component above U-I. All components similar to those produced from progesterone. No 17-hydroxyprogesterone remained. Solvent system-propylene glycol-toluene (349 SHE 36) using a 300 gamma spot. Paper chromatogram of 160 gamma spot of $Al_2O_3$ fraction checks crude extract in showing 3 major components, one at U-I position, two moving faster than U-I, and a minor component moving slower than U-I. Partial separation of these materials is shown in the $Al_2O_3$ column. |
| 2. (266 HCM 213) RH 176 *Rhizopus arrhizus.* | 24 | 17-Hydroxy-11-desoxy-corticosterone (S). | 1 gm. in 60 ml. acetone. | 4 liters | 28 hours, aeration. | All S used up in 28 hours. At 16 hours, about one-third S remained. About 25 percent conversion to F region and some to compounds closer to origin than F. Solvent system-propylene glycol-toluene. Paper chromatogram of 160 gamma spot from $Al_2O_3$ fraction checks with chromatogram of crude extract in showing main component, other than S, is a material which moves more slowly than compound F. (349 SHE 32). |
| 3. (266 HCM 198) HP2. RH 176 *Rhizopus arrhizus.* | 48 | 17-Hydroxyprogesterone. | 2 mgm. in 0.1 ml. acetone. | 0.01 liter pH 4.05 after reaction. | 44 hours, aeration. | Propylene glycol-toluene solvent system. Five compounds, 3 major and 2 minor. A small amount of material moving even slower than dihydroxyprogesterone (U-I). Moderate amount of what appears to be U-I. Large amounts of two materials moving slightly faster than U-I. This chromatogram corroborates 266 HCM 214 above (349 SHE 22). |
| 4. (266 HCM 187) RH 176 *Rhizopus arrhizus.* | 27 | delta-4-Androstene-3,17-dione. | 1 gm. in 60 ml. acetone. | 4 liters | 64 hours, aeration. | Propylene glycol-toluene solvent system. All androstene-dione converted to three substances (326 MIU 62), all more polar than progesterone. $Al_2O_3$ chromatograph 10 (326 MIU 79) showed presence of three fractions. Fraction D gave crystals, M. P. 205-208° C., having diene and ketone group remaining, as shown by ultraviolet analyses. |

TABLE VII-B—Continued

| Run | Growth Period, Hrs. | Steroid | Steroid, Amt. | Medium, Amt. | Reaction | Results |
|---|---|---|---|---|---|---|
| 5. (266 HCM 209) SA. RH 176 *Rhizopus arrhizus*. | 46 | 11-Desoxy-17-hydroxy-corticosterone acetate (S acetate). | 1 gm. in 60 ml. acetone. | 4 liters final pH 3.85. | 49 hours, aeration. | Propylene glycol-toluene solvent system. One substance moving slightly slower than 17-hydroxycorticosterone. Also some in 11-desoxycorticosterone region (349 SHE 31). |
| 6. (266 HCM 178E) RH 176 *Rhizopus arrhizus*. | 24 | Ergosterol | 210 mgm. in 25ml. acetone. | 1050 ml | 52 hours, aeration. | 300 mg. solid material extracted from fermentation liquor. More soluble in methanol than ergosterol. |
| 7. (266 HCM 198) DA2. RH 176 *Rhizopus arrhizus*. | 48 | 11-Desoxycorticosterone acetate. | 2 mgm | 10 ml | 44 hours, aeration. | Propylene glycol-toluene solvent system. Six components. 12.5 percent above F position (nearer origin), 1.5 percent at F position, 6 percent below F position, 2.5 percent at E position, 37.5 percent below E, 40.5 percent below E but above S. 100 percent conversion. All 11-desoxycorticosterone used up, by carbitolmethylcyclohexane system (349 SHE 21). |
| 8. (266 HCM 198) D2. RH 176 *Rhizopus arrhizus*. | 48 | 11-Desoxycorticosterone. | 2 mgm | 10 ml | 44 hours, aeration. | Propylene glycol-toluene solvent system. About 76 percent conversion. Six components. 10 percent of a compound moving more slowly than F, 1.5 percent at F position, 0.5 percent moving slightly faster than F, 2.5 percent in E position, 30 percent of a compound traveling below E, 31 percent of a compound traveling further below E but above S (266 SHE 21). |
| 9. (266 HCM 198) S-2. RH 176 *Rhizopus arrhizus*. | 48 | 11-Desoxy-17-hydroxy-corticosterone (S). | 2 mgm | 10 ml | 44 hours, aeration. | Propylene glycol-toluene solvent system. Five components, 13 percent conversion. About 13 percent above F, 1.5 percent at F position, 2.5 percent at E position, and trace below E (349 SHE 25). |
| 10. (266 HCM 198) S4. RH 176 *Rhizopus arrhizus*. | 48 | 11-Desoxy-17-hydroxy-corticosterone (S). | 2 mgm | 10 ml. plus 10 mgm. Tween 40 in 0.1 ml. ethanol. | 44 hours, aeration. | Propylene glycol-toluene solvent system. About 13 percent conversion and yield. Ten percent above F. 1.6 percent at F position, about 1.6 percent at E position, and trace below E (349 SHE 26). |
| 11. (266 HCM 198) SA4. RH 176 *Rhizopus arrhizus*. | 48 | 11-Desoxy-17-hydroxy-corticosterone acetate (S acetate). | 2 mgm | 10 ml. plus 10 mgm. Tween 40 in 0.1 ml. ethanol. | 44 hours, aeration. | Propylene glycol-toluene solvent system. Ten percent conversion. About 7 percent above F, 1.3 percent at F position, about 0.4 percent at E position, 0.4 below E (349 SHE 26). |
| 12. (266 HCM 217) MuS. *Mucor mucedo* ATCC 9836. | 24 | 11-Desoxy-17-hydroxy-corticosterone (S). | 50 mgm | 150 ml | 20 hours, aeration. | Propylene glycol-toluene solvent system. Correcting for about 33 percent unreacted S, 23 percent of a compound moving slightly faster than E, about 26 percent of a compound moving more slowly than F, and about 5 percent in F position (349 SHE 48). |

TABLE VIII

| Steroid | Sample | pH Final | Chromatogram |
|---|---|---|---|
| 1. 4-Androstene-3, 17-dione | AR | 3.75 | 349 SHE 70-3 |
| 2. Cholestenone | CR | 4.12 | 349 SHE 70-2 |
| 3. Ergosterone | OR | 3.9 | 349 SHE 70-1 |
| 4. Ergosterol | ER | 3.6 | 349 SHE 70-4 |
| 5. 3β, 21-Diacetoxy-5-pregnane-20-one. | APA | 3.75 | ---------------- |
| 6. 3β-Acetoxy-5-pregnene-20-one | PA | 3.9 | ---------------- |
| 7. Stigmasta-4, 22-diene-3-one | S | 3.4 | ---------------- |
| 8. Dehydroergosteryl dioxido maleic anhydride adduct. | AP | 3.85 | ---------------- |
| 9. 3-Acetoxy-5, 7, 9(11)-pregnatrien-20-one maleic anhydride adduct. | 20L | 3.8 | ---------------- |

These compounds are all oxygenated in the steroid nucleus by the action of RH 176.

*Example 16.—Eleven oxygenation of progesterone (266 HCM 220 V)*

One milliliter of a ten-milliliter saline suspension of spores from a stock culture slant of RH 176 (*Rhizopus arrhizus* strain) were used to inoculate 150 milliliters of the sterile Edamine, glucose, corn steep liquor, tap water medium. After 24 hours of agitation, five milliliters of culture was used to inoculate 150 milliliters of a sterile medium having the following composition: potassium acid phosphate ($KH_2PO_4$) 0.3 gram, ammonium nitrate ($NH_4NO_3$) 1.5 grams, magnesium sulfate heptahydrate ($MgSO_4$—$7H_2O$) 0.25 gram, and tap water q. s. one liter. After sterilization at a temperature of 120 degrees centigrade, the pH of the medium was 4.3.

After a 24-hour aeration period, resulting in heavy growth, sixty milligrams of progesterone was added to the culture, using three milliliters of methanol to dissolve the steroid. After a further 24 hours of aeration, the fermentation beer was extracted with methylene chloride. As shown by paper strip chromatogaphy (349 SHE 53), conversion to 11α-hydroxyprogesterone (U-III) and more highly oxygenated derivatives was high. The extracted material (U-III) was of a crystalline nature and had less color than when a more complex medium was utilized.

*Example 17.—Eleven oxygenation of steroids*

The organisms employed were grown in a medium containing twenty grams of Edamine, five milliliters of corn steep liquor, fifty grams of dextrose, and tap water q. s. one liter, adjusted to pH 6.5 and then sterilized at 120 degrees centigrade for approximately twenty minutes.

The media were inoculated from cultures of the organism, grown on slants containing ten percent dried malt extract and two percent agar, which were heavy with aplanospores (spores). The flasks each contained thirty milliliters of the medium.

The flasks were shaken aerobically for 24 hours at room temperature. A certain amount of the steroid substrate was then added in a two percent weight per volume acetone solution and the flask shaken at room temperature for an additional 24 hours. Six milligrams of steroid was used for each thirty milliliters of medium.

The medium, substrate, and organism fermentation mixture was extracted with methylene chloride three times, using a volume of solvent equal to the volume of aqueous phase. The extract was separated, washed with two percent sodium bicarbonate solution, and distilled water. The solvent layer was evaporated and the residue tested by paper strip chromatography. The steroids employed were all oxygenated by the action of the organisms tested. Table IX shows the organisms tested, the steroids substrate employed, and references to the paper strip chromatograms.

TABLE IX

STEROID SUBSTRATE: PROGESTERONE

| Organism | American Type Culture Collection No. | Sample No. | Chromatogram |
|---|---|---|---|
| 1. *Mucor rouxii* | 4,857 | $M_1/P_6$ | 349 SHE 47 |
| 2. *Mucor griseo cyanus*(+) | 1,207*a* | $M_2/P_6$ | 349 SHE 40 |
| 3. *Mucor griseo cyanus* (−) | 1,207*b* | $M_3/P_6$ | 349 SHE 40 |
| 4. *Mucor hiemalis* var. *albus* | 6,800 | $M_4/P_6$ | 349 SHE 47 |
| 5. *Mucor hiemalis* | 8,690 | $M_5/P_6$ | 349 SHE 47 |
| 6. *Mucor mucedo* | 9,836 | $M_6/P_6$ | 349 SHE 40 |
| 7. *Mucor mucedo* | 9,635 | $M_7/P_6$ | 349 SHE 47 |
| 8. *Mucor mucedo* | 7,941 | $M_8/P_6$ | 349 SHE 47 |
| 9. *Rhizopus nigricans* | 10,404 | $R_1/P_6$ | 349 SHE 47 |
| 10. *Rhizopus nigricans* | 7,577 | $R_2/P_6$ | 349 SHE 47 |
| 11. *Rhizopus nigricans* (+) | 6,227*a* | $R_3/P_6$ | 349 SHE 40 |
| 12. *Rhizopus nigricans* (−) | 6,227*b* | $R_4/P_6$ | 349 SHE 40 |
| 13. *Rhizopus chinensis* (−) | 1,227*b* | $R_5/P_6$ | 349 SHE 50 |
| 14. *Rhizopus japonicus* | 8,446 | $R_6/P_6$ | 349 SHE 47 |
| 15. *Rhizopus oryzae* | 10,260 | $R_7/P_6$ | 349 SHE 50 |
| 16. *Rhizopus oryzae* | 9,363 | $R_8/P_6$ | 349 SHE 50 |

STEROID SUBSTRATE: 11-DESOXYCORTICOSTERONE

| | | | |
|---|---|---|---|
| 17. *Mucor rouxii* | 4,857 | $M_1/DOC_6$ | 349 SHE 50 |
| 18. *Mucor griseo cyanus* (+) | 1,207*a* | $M_2/DOC_6$ | 349 SHE 50 |
| 19. *Mucor griseo cyanus* (−) | 1,207*b* | $M_3/DOC_6$ | 349 SHE 50 |

Tests of the above organisms on 11-desoxycorticosterone, 17-hydroxyprogesterone, and 11-desoxy-17-hydroxycorticosterone indicate similar results, viz., oxygenation of the steroid nucleus.

Likewise, the same result is obtained in tests of the effect of the following named organisms on progesterone, 11-desoxycorticosterone, 11-desoxy-17-hydroxycorticosterone, and 17-hydroxyprogesterone: *Mucor genevensis, plumbeus, parasiticus, dubius, javanicus, adventitius, microsporus, rouxianus, racemosus; Rhizopus reflexus, shanghaiensis, tritici, cohnii, delemar, tonkinensis, kazanensis; Phycomyces blakesleeanus, theobromatus; Absidia glauca; Zygorhynchusmoelleri, heterogamus*; and *Syncephalus nodosa.*

*Example 18.—Oxygenation of progesterone using fermentation filtrate of RH 176 (349 SHE 41)*

A 72-hour culture of RH 176 was filtered to give 160 ml. of beer filtrate of pH 4.1. The mycelium was chopped in a Waring Blendor with 0.9 percent saline for fifteen minutes, and centrifuged to give 100 ml. of supernatant fluid, which was divided into two equal portions. One was left at pH 4.65, the other adjusted to pH 6.76 with half molar $Na_2HPO_4$. The mycelial residue with added saline was placed in a separate flask. Progesterone (30 mgm. in one ml. acetone) was added to each flask as follows:

| Fraction | Progesterone Added |
|---|---|
| | *Mgm.* |
| SI=Supernate pH 6.76 | 30 |
| SII=Supernate pH 4.65 | 30 |
| R=Mycelial Residue | 60 |
| BF=Undiluted beer filtrate pH 4.1 | 30 |

The cotton-stoppered flasks were shaken for 17 hours at room temperature and extracted with methylene chloride as in Example 1. Paper chromatograms of aliquots representing 320 gamma of steroid using the "Carbitol"-methylcyclohexane system showed that SI gave very little conversion to more highly oxygenated compounds, SII gave considerable conversion, and BF gave even better conversion, while the mycelial residue gave complete conversion.

*Example 19.—Oxygenation of 11α-hydroxyprogesterone (266 HCM 229)*

Twenty milligrams of 11α-hydroxyprogesterone (U–III) (190 GBS 244B) was added to 150 milliliters of a 48-hour culture of RH 176 (*Rhizopus arrhizus* strain) in dextrose, Edamine, and corn steep liquor medium, and aeration continued for 22 hours. The materials were extracted with methylene chloride in the manner of Example 1. Paper chromatography (349 SHE 72) showed that conversion takes places to the dihydroxy compound (U–I) and to a second compound, such as is also produced by conversion of progesterone itself, which is apparently a further oxygenated product of 11α-hydroxyprogesterone.

*Example 20.—11α-hydroxyprogesterone*

A medium, identified as 238–IV, was prepared of twenty grams of Edamine enzymatic digest of lactalbumin, three grams of corn steep liquor and fifty grams of technical dextrose diluted to one liter with tap water and adjusted to a pH of 4.3 to 4.5. Twelve liters of this sterilized medium was inoculated with *Rhizopus nigricans* minus strain, American type culture collection number 6227*b*, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of *Rhizopus nigricans* minus strain was added six grams of progesterone in 150 milliliters of acetone to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering, the solvent was removed by distillation. The residue was dissolved in a minimum of methylene chloride, filtered and the solvent then evaporated. The resulting crude crystals were dried and then washed five times with five milliliter portions of ether per gram of crude crystals, yielding 5.072 grams of crystals melting at 165 to 168 degrees centigrade. Recrystallization of 400 milligrams of these crystals from methanol gave 311 milligrams of 11α-hydroxyprogesterone, melting at 166 to 168 degrees centigrade, $[\alpha]_D^{24}$ of plus 180 degrees (1.0127 in chloroform), $k_{242}$ of 46.72.

*Analysis.*—Calculated for $C_{21}H_{30}O_3$: C, 76.40; H, 91.10. Found: C, 76.77; H, 8.92.

*Example 21.—11α,17α,21-trihydroxy-4-pregnene-3,20-dione (compound epi F) from 17α,21-dihydroxy-4-pregnene-3,20-dione (compound S)*

Following the procedure of Example 20, incubation for 96 hours of two grams of 17α,21-dihydroxy-4-pregnene-3,20-dione with *Rhizopus nigricans* ATCC 6227*b*, and extraction yielded 4.988 grams of a semi-crystalline extract. This dried extract was triturated four times each time with six milliliters of ice cold methylene chloride. Remaining insoluble was 630 milligrams of crystals melting at 194 to 199 degrees centigrade. Recrystallization of this with a mixture of three milliliters of methanol and ten milliliters of ether resulted in 404 milligrams of crystals melting at 205 to 210 degrees centigrade. Two recrystallizations from the same solvents above gave 132 milligrams of 11α,17α,21-trihydroxy-4-pregnene-3,20-dione having a constant melting point of 209 to 212 degrees centigrade, and depending upon its crystal form, of 217 to 219 degrees centigrade, $[\alpha]_D^{24}$ of plus 113 degrees (1.568 in methanol).

*Analysis.*—Calculated for $C_{21}H_{30}O_5$: C, 69.58; H, 8.35. Found: C, 69.26; H, 8.34.

In this procedure 17α-hydroxy-21-acetoxy-4-pregnene-3,20-dione serve equally well as a starting material to yield identical results.

Oxidation of 11α,17α,21-trihydroxy-4-pregnene-3,20-dione with $CrO_3$ in glacial acetic acid, followed by ether extraction and washing with water yielded adrenosterone, melting at 217 to 220 degrees centigrade.

*Analysis.*—Calculated for $C_{19}H_{24}O_3$: C, 75.96; H, 8.05. Found: C, 75.61; H, 8.10.

Compound epi F can be diacetylated or monoacetylated and the monoacetate converted by oxidation to cortisone acetate.

MONOACETATE OF COMPOUND EPI F

A 500 milligram sample of compound epi F was dissolved in four milliliters of pyridine. To this solution 155 milligrams of acetic anhydride was added dropwise. The reaction mixture was kept at room temperature 24 hours and then diluted with seventy milliliters of ice cold water, followed by extraction twice with fifty milliliters and twice with 25 milliliters of methylene dichloride. The extract was washed with two 25-milliliter portions of five percent hydrochloric acid, with 25 milliliters of ten percent sodium bicarbonate solution, and with water to neutrality. The extract was dried with anhydrous sodium sulfate and the solvent evaporated. The oily residue was dissolved in 125 milliliters of ethylene dichloride and chromatographed over eighty grams of Florisil synthetic magnesium silicate. Solvents used to develop the column were in 100-milliliter portions in the following order: 1 and 2 ethylene dichloride, 3 to 5 ethylene dichloride with acetone 25:1 ratio respectively by volume, 6 and 7 ethylene dichloride with acetone 15:1 ratio, 8 to 11 ethylene dichloride with acetone 12:1 ratio, 12 to 14 ethylene dichloride with acetone 10:1 ratio, 15 to 18 ethylene dichloride with acetone 8:1 ratio, 19 and 20 ethylene dichloride witih acetone 5:1 ratio, 21 to 23 ethylene dichloride with acetone 2:1 ratio, 24 and 25 acetone.

DIACETATE OF EPI F

Fractional extracts, number eight to eleven inclusive, from the chromatographic development were freed of solvent by evaporation, combined and recrystallized from acetone by dropwise addition of petroleum ether. Three recrystallizations yielded 35 milligrams of the 11,21-diacetate of compound epi F, melting at 198 to 202 degrees centigrade, $[\alpha]_D^{22}$ of plus 115 degrees (1.145 in chloroform), $k_{240}$ equal to 33.33. Infrared spectrum verified the indicated structure.

*Analysis.*—Calculated for $C_{25}H_{24}O_7$: C, 67.24; H, 7.67. Found: C, 67.43; H, 7.94.

CORTISONE ACETATE FROM EPI F MONOACETATE

Chromatographic fractions fifteen through twenty were combined, the solvent evaporated, and 162 milligrams of this residual oil, the monoacetate of compound epi F, was dissolved in ten milliliters of glacial acetic acid and oxidized by adding dropwise a solution of thirty milligrams of chromium trioxide ($CrO_3$) in 0.5 milliliter of water and two milliliters of acetic acid. After six hours at room temperature, the green solution was diluted with twenty milliliters of methanol and evaporated under reduced pressure. The crystalline residue was suspended in 25 milliliters of ten percent sodium bicarbonate solution and extracted with four 25-milliliter portions of a mixture of four parts of ether to one part of chloroform by volume. The extract was washed thrice with water and dried over anhydrous sodium sulfate.

The resultant crystalline oxidation product weighed 166 milligrams. Recrystallization from acetone yielded 138.5 milligrams of compound E acetate, 17α-hydroxy-21-acetoxy-4-pregnene-3,11,20-trione, otherwise known as cortisone acetate, with a melting point of 243 to 245 degrees centigrade, $k_{238}$ equal to 36.33, $[\alpha]_D^{23}$ of plus 169 degrees (0.3657 in chloroform).

*Analysis.*—Calculated for $C_{23}H_{30}O_6$: C, 68.61; H, 7.52. Found: C, 68.52; H, 7.61.

*Example 22.—17-hydroxycorticosterone (compound F) from 11-desoxy-17-hydroxycorticosterone (compound S)*

A medium was prepared from 0.5 percent peptone, two percent dextrose, 0.5 percent soybean meal, 0.5 percent $KH_2PO_4$, 0.5 percent sodium chloride and 0.3 percent yeast extract in tap water. To 200 milliliters of this sterilized medium was added an inoculum of the vegetative mycella of *Cunninghamella blakesleena.* The spores had first been transferred from a sport slant to a broth medium and the broth medium was aerobically incubated at 24 degrees centigrade for 24 to 72 hours in a reciprocating shaker until the development of vegetative growth. The inoculated medium containing added vegative mycella of *Cunninghamella blakesleeana* was incubated for 48 hours at 24 degrees centigrade following which was added 66 milligrams of compound S, 11-desoxy-17-hydroxycorticosterone in solution in a minimum of ethanol, and incubation was maintained for seven hours at 24 degrees centigrade. The beer containing steroid was diluted with 800 milliliters of acetone, shaken one hour on a reciprocating shaker and filtered. The cake was suspended in 500 milliliters of acetone, shaken another hour and again filtered. The filtrates were combined and the acetone was volatilized under reduced pressure at fifty degrees centigrade. Acetone was then added, if necessary, to bring the concentration to twenty percent acetone and this resulting aqueous acetone solution was extracted five times each with one-third volume of Skellysolve B petroleum ether to remove fatty materials. These extracts were back washed two times with one-tenth volume of twenty percent aqueous acetone and the washings were added to the main acetone extract. The combined acetone extracts were extracted six times with one-fourth volumes of ethylene dichloride and the ethylene dichloride extract was evaporated under vacuum to leave the steroid residue. This steroid residue was taken up in a minimum of methylene chloride and applied to the top of a column packed with thirty grams of silica which had been previously triturated with 21 milliliters of ethylene glycol. Then various developing mixtures, saturated with ethylene glycol, were passed over the column. Cuts were made as each steroid was eluated as determined by the lowering of the absorption of light at 240 mμ, in accordance with the Table X on the automatic chromatographic fraction cutter.

TABLE X

AUTOMATIC CHROMATOGRAPHIC FRACTION CUTTER

| Band | Solvent | Tube No. (60 milliliters) | Crude Solids, Milligrams |
|---|---|---|---|
| 1 | cyclohexane | 1–4 | 11. |
| 2 | cyclohexane - methylene chloride 3:1 | 5–13 | 6.4 Compound S. |
| 3 | cyclohexane - methylene chloride 1:1 | 14–16 | 3.0. |
| 4 | cyclohexane - methylene chloride 2:3 | 17–23 | 6.0 Compound E. |
| 5 | cyclohexane - methylene chloride 1:4 | 24–38 | 12.2 Compound F. |
| 6 | methylene chloride | 39–59 | 4.8. |

A 7.7 milligram portion of band 5 was taken up in a minimum of acetone and refrigerated until crystals separated. This cold acetone mixture was centrifuged and the supernatant liquid removed by pipette. To the remaining crystals, a few drops of ice-cold ether-acetone, three to one mixture, were added, shaken, recentrifuged and the supernatant wash liquid removed by pipette. The ether-acetone wash was repeated. The resulting crystals were dried under vacuum yielding 3.3 milligrams of pure compound F, 17-hydroxycorticosterone.

Appreciable amounts of compound E, 11-dehydro - 17 - hydroxy - corticosterone, cortisone, are also produced in the above example.

*Example 23.—17-hydroxycorticosterone (compound F) from 11-desoxy-17-hydroxycorticosterone (compound S)*

The spores of *Cunninghamella blakesleeana* were transferred from an agar slant to a broth medium and aerobically incubated at 24 degrees centigrade for 24 to 72 hours in a reciprocating shaker until the development of vegetative growth.

Six hundred milliliters of this vegetative growth was used to inoculate twelve liters of a sterile medium containing 120 grams of dextrin, 480 grams of corn steep solids, twelve grams of calcium carbonate and sixty grams of sodium chloride which was made to twelve liters with tap water and adjusted to pH 6.5 with sodium hydroxide before sterilization. The inoculated medium was incubated at 26 degrees centigrade in a five gallon bottle with stirring and aeration for 48 hours.

The seed thus prepared was added aseptically to 240 liters of a sterile medium prepared from 0.5 percent soybean meal, two percent dextrose, 0.5 percent dried brewer's yeast, 0.5 percent sodium chloride, 0.5 percent $KH_2PO_4$ made to volume with tap water and adjusted to pH 6.4. Fifty cubic feet of air per hour was passed through the stirred medium for seventeen hours at which time the pH was 6.1. Then twelve grams of compound S in eight liters of redistilled ethanol which had been sterilized by ultrafine sintered glass filtration was added and the incubation continued for 11.5 hours.

Four kilograms of diatomaceous earth was added to the beer, the mixture was passed through a filter press and the cake then washed with forty liters of tap water. The clear filtrate was extracted with three fifty-liter portions of ethylene dichloride. The extract was then concentrated under vacuum in a nitrogen atmosphere at fifty degrees centigrade to a volume of 600 milliliters.

Three hundred grams of magnesium silicate was poured into acetone contained in a chromatographic column 4.5 centimeters in diameter and 36 centimeters long. The acetone was replaced with ethylene dichloride and the column washed with two liters of ethylene dichloride. The ethylene dichloride concentrate was added to the top of the column and developed with ten liters of dry ethylene dichloride. The adsorbed steroids were then eluted from the column with two liters of dry acetone. After removal of the acetone at fifty degrees centigrade under nitrogen, the residue was taken up in 200 milliliters of ethyl acetate and washed twice with fifty milliliters of an equal volume mixture of a two percent aqueous sodium carbonate solution and a three percent aqueous sodium bicarbonate solution. The extract was then washed with fifty-milliliter portions of water until the washes were neutral. The combined water washes were back extracted with thirty milliliters of ethylene dichloride and this together with a further 100 milliliters of the same solvent were added to the ethyl acetate solution of the steroids. Evaporation of the mixed solvents under anaerobic conditions at low temperature left a friable brown mass. The latter material was dissolved in 100 milliliters of chloroform, chilled to four degrees centigrade. The crystals which formed were removed by filtration and dried in vacuum to give 4.03 grams of steroids containing 2.41 grams of 11β,17α,21 - trihydroxy - 4 - pregnene - 3,20-dione and 1.19 grams of cortisone.

The mother liquor, upon concentration, gave an additional 834 milligrams of crystals containing 164 milligrams of 11β,17α,21-trihydroxy-4-pregnene-3,20-dione and 433 milligrams of cortisone.

*Example 24. — 6β,17α,21-trihydroxy - 4 - pregnene-3,20-dione from compound S*

Bioconversion of one gram of 17α,21-dihydroxy-4-pregnene-3,20-dione, under the conditions of fermentation and extraction of Example 20 using, instead of R–4, the organism RH 176, for 42 hours yielded 1.834 grams of semi-crystalline solids. Extraction of the crystals with three portions, five milliliters each, of ice cold methylene chloride yielded 525 milligrams of crystals melting at 198 to 207 degrees centigrade. Recrystallization from a mixture of thirteen milliters of methanol and one milliliter of water produced 305 milligrams of crystals, melting at 224 to 228 degrees centigrade. Re crystallization from methanol of 35 milligrams yielded 26 milligrams of crystals, 6β,17α, 21-trihydroxy-4-pregnene-3,20-dione, melting at 224 to 227 degrees centigrade, having an optical rotation $[\alpha]_D^{25}$ of plus 58.5 degrees (0.894 in 95 percent ethanol). Infrared, microcombustion, and acetylation indicated the addition of one hydroxyl group.

*Analysis.*—Calculated for $C_{21}H_{30}O_5$: C, 69.58; H, 8.35. Found: C, 69.66; H, 8.22.

A solution of 0.031 milliliter of redistilled acetic anhydride in two milliliters of pyridine was added to a solution of 100 milligrams of 6β,17α,21-trihydroxy-4-pregnene-3,20-dione in one milliliter of pyridine. After the mixture remained at room temperature for sixteen hours, forty milliliters of water was added and crystals began to form. The reaction mixture was then refrigerated for three hours, centrifuged, water washed and dried under vacuum to yield 49.5 milligrams of crystals of 6β,17α-dihydroxy-21-acetoxy-4-pregnene-3,20-dione, melting at 246 to 260 degrees centrigrade. Infrared analysis verified this compound as the 21-acetate since there was a 1:1:1 ratio of acetate : normal ketone : conjugated ketone. Recrystallization from 2.8 milliliters of methanol yielded twenty milligrams of the purified compound melting at 256 to 265 degrees centigrade.

6,21-DIACETATE OF 6β,17α,21-TRIOL-4-PREGNENE-3,20-DIONE

A sample of 51.1 milligrams of 6β,17α-dihydroxy-21-acetoxy-4-pregnene - 3,20 - dione was dissolved in four milliliters of acetic anhydride and two milliliters of pyridine. The solution was warmed for a short time on a steam bath to dissolve the crystals completely. After fifteen hours at room temperature the mixture was diluted with thirty milliliters of ice water and extracted twice with thirty-milliliter portions of mixture of five parts of ether to one part of methylene chloride. The combined extracts were washed twice with ten-milliliter portions of 2 N hydrochloric acid, once with a ten-milliliter portion of water, three times with ten-milliliter portions of seven percent sodium bicarbonate, three times with ten-milliliter portions of water and the solvents then dried over anhydrous sodium sulfate. After removal of the solvents in vacuo, 58.5 milligrams of crystalline residue remained. Recrystallization from five milliliters of acetone by the dropwise addition of ether yielded 34 milligrams of crystalline 6,21-diacetate of 6β,17α,21-triol-4-pregnene-3,20-dione melting at 192 to 195 degrees centigrade, $[\alpha]_D^{23}$ of plus 63 degrees (0.9852 in chloroform).

*Analysis.*—Calculated for $C_{25}H_{34}O_7$: C, 67.24; H, 7.67. Found: C, 67.30; H, 7.68.

The position of the new hydroxyl group was established as being at carbon 6 by oxidation, as shown in Example 21, with chromium trioxide in glacial acetic acid, of the unesterified compound to a 6-keto-androstenetrione of melting point 220 to 225 degrees centigrade, $[\alpha]_D^{25}$ of plus 32.3 (1.022 in acetone). As evidenced by mixed melting point and infrared data, this compound is identical to the known 4-androstene-3,6,17-trione.

*Example 25.—11α-hydroxy-6-dehydroprogesterone from 6-dehydroprogesterone*

Fermentation was performed as in Example 20 with a 24 hour growth of culture R-4, to which was added two grams of 6-dehydroprogesterone melting at 143 to 146.5 degrees centigrade, E equals 25, 500, $[\alpha]_D^{25}$ of plus 149.5 degrees (1.020 in ethanol). After a 24-hour transformation period the oxidized steroid was extracted and concentrated as in Example 20. The concentrate in 200 milliliters of benzene was chromatographed over 100 grams of alumina (washed with hydrochloric acid and heated to 120 degrees centigrade for four hours), using 200-milliliter portions of solvents as indicated in Table XI yielding a fraction, eluate solids 9 through 22 inclusive, containing 2.181 grams of crystals. This fraction was dissolved in ten milliliters of acetone, filtered and concentrated on a steam bath to a volume of six milliliters. After remaining at room temperature for one hour, 415 milligrams of crystals melting at 143 to 157 degrees centigrade were recovered by filtration. The mother liquors were refrigerated to yield an additional 281 milligrams of crystals melting at 143 to 155 degrees centigrade. The solids from this latter mother liquor, obtained by evaporation of the solvent on a steam bath, were dissolved in two milliliters of acetone. Upon the addition of two milliliters of Skellysolve B petroleum ether, boiling point range of 60 to 71 degrees centigrade, crystallization ensued and 480 milligrams of crystals melting at 152 to 157 degrees centigrade were recovered. Refrigeration of the mother liquors resulted in an additional lot of crystals, 76 milligrams, melting at 143 to 158 degrees centigrade. All of the recovered crystals, 1.252 grams melting at 143 to 158 degrees centigrade were combined, and dissolved in four milliliters of methylene chloride. This solution was stirred with 0.1 gram of Magnesol magnesium silicate and filtered. The residue was washed three times with one milliliter portions of methylene chloride and the washings were added to the main filtrate. The combined methylene chloride solution was evaporated on a steam bath to two milliliters and then four milliliters of ether was added. Crystallization began and after one hour at room temperature, 1.074 grams of crystals melting at 155 to 158 degrees centigrade were recovered by filtration. Upon recrystallization from five milliliters of boiling methanol and refrigeration at four degrees centigrade for two days, 456 milligrams of crystals, melting at 160 to 162 degrees centigrade, were obtained by filtration. Recrystallization from three milliliters of hot methanol yielded 213 milligrams of 11α-hydroxy-6-dehydroprogesterone crystals, melting at 160 to 162 degrees centigrade, E equals 20, 291, $[\alpha]_D^{24}$ of plus 111 degrees (1.063 in chloroform).

TABLE XI

| Fraction | Solvent | Eluate Solids Milligrams | Papergram |
|---|---|---|---|
| 1, 2 | benzene | 264 | Trace of 6-dehydroprogesterone. |
| 3, 4 | benzene plus 5 percent ether | | |
| 5, 6 | benzene plus 10 percent ether | | |
| 7 | benzene plus 50 percent ether | | |
| 8 | do | | |
| 9, 10 | ether | 2, 251 | 11α-hydroxy-6-dehydroprogesterone. |
| 11, 12 | ether plus 5 percent chloroform | | |
| 13, 14 | ether plus 10 percent chloroform | | |
| 15 | ether plus 50 percent chloroform | | |
| 16–18 | do | | |
| 19–22 | chloroform | | |
| 23 | chloroform plus 5 percent acetone | 186 | |

Infrared studies showed 11α-hydroxy-6-dehydroprogesterone to be a new compound and indicated the presence of one hydroxyl group confirmed by microcombustion data as follows:

*Analysis.*—Calculated for $C_{21}H_{28}O_3$: C, 76.78; H, 8.59. Found: C, 76.78; H, 8.56.

11α-ACETOXY-6-DEHYDROPROGESTERONE

A 47.5 milligram sample of 11α-hydroxy-6-dehydroprogesterone was dissolved in three milliliters of acetic anhydride and two milliliters of pyridine was added. After 48 hours at room temperature, the solution was diluted to 100 milliliters with water and extracted with 100-, thirty-, and thirty-milliliter portions of ether. The combined ether extracts were washed with ten milliliters of water, twice with twenty-milliliter portions of N HCl, ten milliliters of water, three times with thirty-milliliter portions of seven percent sodium bicarbonate ($NaHCO_3$) solution and three times with twenty-milliliter portions of water. The ether solution was then dried over anhydrous $Na_2SO_4$ and evaporated by a stream of air. The oily residue crystallized from 0.2 milliliter of methanol and 57 milligrams were obtained. This material was twice recrystallized from two milliliters of acetone to which ether was added drop by drop until crystals appeared. Crystals of 11α-acetoxy-6-dehydroprogesterone recovered weighed 31.8 milligrams, melting at 142 to 144 degrees centigrade, $[\alpha]_D^{23}$ of plus 108 degrees (1.149 in chloroform); ultraviolet maximum of 284 mμ, *k* of 62.11, E of 23,010.

*Analysis.*—Calculated for $C_{23}H_{30}O_4$: C, 74.56; H, 8.16. Found: C, 74.25; H, 8.17.

CATALYTIC REDUCTION OF 11α-HYDROXY-6-DEHYDROPROGESTERONE

A 100 milligram sample of 11α-hydroxy-6-dehydroprogesterone was dissolved in 100 milliliters of methanol containing 100 milligrams of five percent palladium-charcoal prereduced catalyst. This mixture was then hydrogenated at room temperature by shaking under a pressure of ten pounds of hydrogen in a modified Parr apparatus. The uptake of hydrogen for the two double bonds was exactly the same as that calculated. After removal of the catalyst by filtration, the solids weighed 101 milligrams.

TABLE XII

CHROMATOGRAPHY OVER FLORISIL OF THE REDUCTION PRODUCTS OF 11α-HYDROXY-6-DEHYDROPROGESTERONE

| Fraction number | Solvent | Eluate Solids, Milligrams | Papergram |
|---|---|---|---|
| 1 | ethylene chloride | -A 90.7 | Mixtures of 11α-hydroxypregnane-3,20-dione and 11α-hydroxyallopregnane-3,20-dione. |
| 2–4 | ethylene chloride-acetone 25:1 | | |
| 5–7 | ethylene chloride-acetone 15:1 | | |
| 8–10 | ethylene chloride-acetone 12:1 | | |
| 11–12 | ethylene chloride-acetone 10:1 | | |
| 13 | ethylene chloride-acetone 10:1 | -B 1.4 | |
| 14–16 | ethylene chloride-acetone 8:1 | | ---------- |
| 17–19 | ethylene chloride-acetone 5:1 | C 3.0 | |
| 20–22 | ethylene chloride-acetone 2:1 | -D 0.2 | ---------- |
| 23–25 | acetone | | ---------- |

Chromatography in accordance with Table XII of these solids in twenty milliliters of solvent over eight grams of Florisil synthetic magnesium silicate yielded a main fraction containing 90.7 milligrams of a mixture of 11α-hydroxypregnane-3,20-dione and 11α-hydroxyallopregnane-3,20-dione. This latter fraction dissolved in thirty milliliters of acetone was then chromatographed over a mixture of five grams of a mixture of Darco G–60 activated carbon and Celite 545 diatomaceous earth, in a one to two proportion, using thirty-milliliter portions of solvents in accordance with Table XIII.

TABLE XIII

CHROMATOGRAPHY OVER CARBON OF THE REDUCTION PRODUCTS OF 11α-HYDROXY-6-DEHYDROPROGESTERONE

| Fraction Number | Solvent | Eluate Solids, Milligrams |
|---|---|---|
| 1–6 | acetone | 40.5 |
| 7–9 | do | 9.8 |
| 10–13 | methylenechloride | 40.3 |

Three fractions were obtained: fraction 1–6, 40.5 milligrams containing only 11α-hydroxypregnane-3,20-dione; fraction 7–9, 9.8 milligrams containing a mixture of 11α-hydroxypregnane-3,20-dione and 11α-hydroxyallopregnane-3,20-dione, and fraction 10–13, 40.3 milligrams consisting of mainly 11α-hydroxyallopregnane-3,20-dione. When twice recrystallized from a mixture of 0.15 milliliter of ethyl acetate and 0.5 milliliter of methylcyclohexane, fraction A yielded 22 milligrams of pure crystalline 11α-hydroxypregnane-3,20-dione, melting at 106 to 110 degrees centigrade and having a characteristic infrared spectrum and microanalysis.

*Analysis.*—Calculated for $C_{21}H_{32}O_3$: C, 75.86; H, 9.70. Found: C, 75.60; H, 9.78.

When twice recrystallized from 0.5 milliliter of ethyl acetate, fraction C yielded 23 milligrams of pure crystalline 11α-hydroxyallopregnane-3,20-dione melting at 197 to 200 degrees centigrade and having a characteristic infrared spectrum and microanalysis.

*Analysis.*—Calculated for $C_{21}H_{32}O_3$: C, 75.86; H, 9.70. Found: C, 75.51; H, 9.71.

Proof of the structures of 11α-hydroxypregnane-3,20-dione and 11α-hydroxyallopregnane-3,20-dione was obtained in the following manner.

To 250 milligrams of 11α-hydroxyprogesterone dissolved in 100 milliliters of ethanol (3A denatured) containing three drops of triethylamine, 45 milligrams of thirty percent palladium on charcoal were added. Hydrogen at a pressure of eight pounds was passed through the mixture and in seventeen minutes the theoretical amount of hydrogen was consumed. Evaporation of the solvent left 265 milligrams of crystals melting at 145 to 185 degrees centrigrade. Extraction of the crystals with a mixture of ethyl ether and Skellysolve B petroleum ether in a one to nine proportion respectively yielded 146 milligrams of crystals melting at 165 to 185 degrees centigrade. Recrystallization twice from ethyl acetate gave crystals of 11α-hydroxyallopregnane-3,20-dione, melting at 198 to 201 degrees centigrade, $[\alpha]_D^{24}$ of plus 81 degrees (1.052 in chloroform).

*Analysis.*—Calculated for $C_{21}H_{32}O_3$: C, 75.86; H, 9.70. Found: C, 75.92; H, 9.62.

To 0.5 gram of 11α-hydroxyallopregnane-3,20-dione dissolved in 5.9 milliliters of hot chlorobenzene which was then cooled, 450 milligrams of $Na_2Cr_2O_7.H_2O$ in 3.5 milliliters of water containing 0.6 milliliter of concentrated sulfuric acid was added at zero to five degrees centigrade with stirring for two hours. The phases were separated and the aqueous layer extracted twice with a total of 100 milliliters of benzene. The combined benzene and chlorobenzene solutions were washed with sodium bicarbonate saturated water and then water. The organic solvent extract was dried with anhydrous sodium sulfate, filtered, and concentrated in vacuum to yield 460 milligrams of crystals. Recrystallization from ethyl acetate by the addition of Skellysolve B gave 450 milligrams of allopregnane-3,11,20-trione melting at 211 to 215 degrees with an optical rotation, $[\alpha]_D^{24}$ of plus 135 degrees (0.756 in chloroform); Steiger and Reichstein, Helv. Chim, Acta, 21, 161 (1938).

The crystals remaining after extracting the above reduction products of 11α-hydroxyprogesterone with about ten milliliters of ether-Skellysolve B mixture (one to nine proportion) were recrystallized twice to yield eighty milligrams of a constant melting 11α-hydroxypregnane-3,20-dione melting at sixty to 120 or 85 to ninety degrees centigrade, $[\alpha]_D^{25}$ of plus 82 degrees (0.5383 in chloroform).

*Analysis.*—Calculated for $C_{21}H_{32}O_3$: C, 75.86; H, 9.70. Found: C, 76.13; H, 9.76.

Oxidation of 11α-hydroxypregnanedione with chromic trioxide in glacial acetic acid produced the known pregnane-3,11,20-trione as obtained from the bile acid series by the Kendall procedure, Reichstein et al., Helv. Chim. Acta, 26, 721 (1943).

*Example 26.—11α-hydroxyallopregnane-3,20-dione from allopregnane-3,20-dione*

Fermentation with *Rhizopus nigricans* ATCC 6227*b* upon 0.5 gram of allopregnane-3,20-dione as substrate for 24 hours followed by extraction all in accordance with Example 20 yielded 1.45 grams of extract analyzed by paper chromatography as being about forty percent 11α-hydroxyallopregnane-3,20-dione, about sixty percent unconverted material and a small amount of a more highly polar material.

The extractives were dissolved in fifty milliliters of benzene and chromatographed over an alumina (acid washed, 120 degrees centigrade heated for four hours) column of 25 grams. The developing solutions were fifty milliliters used as indicated in Table XIV.

TABLE XIV

| Fraction | Solvent | Eluate Solids, Milligrams |
|---|---|---|
| 1 | benzene | 151.0 |
| 2 | do | 452.9 |
| 3 | benzene-ether 19:1 | 69.6 |
| 4 | do | 38.5 |
| 5 | benzene-ether 9:1 | 38.1 |
| 6 | do | 52.1 |
| 7 | benzene-ether 1:1 | 105.5 |
| 8 | do | 111.1 |
| 9 | ether | 56.0 |
| 10 | do | 23.0 |
| 11 | ether-chloroform 19:1 | 0 |
| 12 | do | 8.7 |
| 13 | ether-chloroform 9:1 | 5.7 |
| 14 | do | 4.3 |
| 15 | ether-chloroform 1:1 | 4.1 |
| 16 | do | 5.4 |
| 17 | chloroform | 10.4 |
| 18 | do | 76.7 |
| 19 | chloroform-acetone 1:1 | 84.7 |
| 20 | acetone | 24.3 |
| 21 | methanol | 82.6 |
| 22 | do | 19.2 |
| 23 | do | 0 |

Extracted, solvent free, fractions 3 through 20 were combined, dissolved in boiling ethyl acetate, cooled to room temperature and refrigerated at a temperature of four degrees centigrade to cause crystallization. The crystals, weighing 270 milligrams, were decolorized by Magnesol in methylene chloride solution, the solvent evaporated, and crystallization from ethyl acetate repeated. This crystalline material melted broadly at from 140 to 150 degrees centigrade. Analysis by infrared spectrophotometry showed it to be a mixture of about sixty percent 11α-hydroxyallopregnane-3,20-dione and forty percent of 1-leucyl-1-proline-diketopiperazine separated by fractional sublimation.

A 99-milligram sample of crystals as obtained from the above preceding chromatographic separation, was dissolved in eight milliliters of methanol and poured through a column of nine grams of Darco G-60 activated carbon and Celite diatomaceous earth in a one to one proportion and eluted five times each with 72 milliliters of methanol and seven times each with 72 milliliters of methylene chloride. The first four fractions gave an extract of 29 milligrams of 1-leucyl-1-propyl diketopiperazine, analyzed by infrared. The methylene chloride fractions yielded 82.8 milligrams of extract which upon recrystallization from one milliliter of ethyl acetate gave 50.9 milligrams of 11α-hydroxyallopregnane-3,20-dione, melting at 197 to 200 degrees centigrade, and having an optical rotation $[\alpha]_D^{23}$ of plus 82 degrees (1.3164 in chloroform).

*Analysis.*—Calculated for $C_{21}H_{32}O_3$: C, 75.86; H, 9.70. Found: C, 76.00; H, 9.48.

*Example 27.—11α-hydroxypregnane-3,20-dione from pregnane-3,20-dione*

To a 24-hour growth of *Rhizopus nigricans* ATCC 6227*b*, in accordance with Example 20, was added one gram of pregnane-3,20-dione. After a 24-hour transformation period, papergram analysis indicated the formation of 11α-hydroxypregnane-3,20-dione with only traces of pregnane- 3,20-dione remaining. The methylene chloride extract yielded 1.987 grams of semicrystalline solids. Chromatography over fifty grams of acid washed, 120 degree centigrade-heated, alumina using 100 milliliters of solvents separated the products, Table XV.

TABLE XV

| Fraction | Solvent | Eluate Solids, Milligrams |
|---|---|---|
| 1, 2 | ether-chloroform 9:1 | 370 |
| 3, 4 | ether-chloroform 9:1 | } 999 |
| 5–10 | ether-chloroform 1:1 | } |
| 11–14 | chloroform | 266 |
| 15–18 | chloroform-acetone 9:1 | 29 |
| 19 | acetone | |
| 20 | do | 59 |

Combined fractions 3 through 10 were freed of solvent by evaporation and yielded 999 milligrams of eluate. Recrystallization of this from six milliliters of one part of ethyl acetate and ten parts of methyl cyclohexane gave a constant melting compound, 11α-hydroxypregnane-3,20-dione, 423 milligrams, melting at 102 to 105 degrees centigrade, having an optical rotation $[\alpha]_D^{25}$ of plus 83 degrees (1.213 in chloroform).

*Analysis.*—Calculated for $C_{21}H_{32}O_3$: C, 75.86; H, 9.70. Found: C, 75.79; H, 9.90.

*Example 28.—11α-hydroxyandrostene-3,17-dione from androstene-3,17-dione*

One gram of androstene-3,17-dione was incubated with RH 176 (R-4 upon this substrate produces similar results) for 24 hours and then extracted in accordance with Example 1. The extract of 2.09 grams was dissolved in 100 milliliters of benzene and chromatographed over fifty grams of acid washed, 120 degree centigrade heated alumina with 100-milliliter portions of developing solvent, as indicated in Table XVI.

TABLE XVI

| Fraction | Solvent | Eluate Solids, Milli-grams |
|---|---|---|
| 1, 2 | benzene | 322 |
| 3, 4 | benzene plus 5 percent ether | 108 |
| 5, 6 | benzene plus 10 percent ether | 10 |
| 7, 8 | benzene plus 50 percent ether | 12 |
| 9-11 | ether | 15 |
| 12, 13 | ether plus 5 percent $CHCl_3$ | 19 |
| 14, 15 | ether plus 10 percent $CHCl_3$ | 23 |
| 16, 17 | ether plus 50 percent $CHCl_3$ | 80 |
| 18, 19 | chloroform | 716 |
| 20, 21 | $CHCl_3$ plus 5 percent acetone | 177 |
| 22, 23 | $CHCl_3$ plus 10 percent acetone | 71 |
| 24, 25 | $CHCl_3$ plus 50 percent acetone | 26 |
| 26, 27 | acetone | 41 |
| 28, 29 | acetone plus 5 percent methanol | 115 |
| 30, 31 | acetone plus 10 percent methanol | 42 |
| 32, 33 | acetone plus 50 percent methanol | 40 |
| 34 | methanol | 13 |

The crystalline fractions 18 to 21 inclusive were washed with several milliliters of ether. The residue was recrystallized from ten milliliters of ethyl acetate, adding Skellysolve B to effect crystallization. After four crystallizations, 240 milligrams of 11α-hydroxyandrostene-3,17-dione were obtained, melting at 226 to 227 degrees centigrade. The structure was established by infrared, ultraviolet spectrum, and oxidation with chromic acid-glacial acetic acid to adrenosterone. Reichstein, Helv. Chim. Acta, 20, 987 (1937) has prepared a different isomer, the β-hydroxyandrostene-3,17-dione melting at 189 to 190 degrees centigrade. The 11α-hydroxyandrostene-3,17-dione has an optical rotation $[\alpha]_D^{24}$ of plus 162 degrees (1.415 in chloroform) and a $k_{242}$ of 50.54.

*Analysis*.—Calculated for $C_{19}H_{26}O_3$: C, 75.46; H, 8.66. Found: C, 75.68; H, 8.53.

Fractions 16 and 17, combined and recrystallized three times from acetone by the addition of Skellysolve B, yielded a compound melting at 195 to 196 degrees centigrade, analyzing as $C_{19}H_{26}O_3$ and showing no absorption in the ultraviolet spectrum. Infrared spectrum showed the presence of three ketonic groups.

*Analysis*.—Calculated for $C_{19}H_{26}O_3$: C, 75.46; H, 8.66. Found: C, 75.73; H, 8.68.

*Example 29.—11α,17α-dihydroxyprogesterone*

Using the procedure in Example 20, the bioconversion of one gram of 17α-hydroxyprogesterone by *Rhizopus nigricans* ATCC 6227b for 152 hours yielded an extract of 1.685 grams. This was dissolved in 100 milliliters of ethylene dichloride and chromatographed over 150 grams of Florisil. Prior to the addition of the extract, the column was washed with 600 milliliters of acetone followed by 600 milliliters of ethylene dichloride. Solvents in 220-milliliter portions were used. Results are given in Table XVII.

Another run was made as above and the corresponding chromatograph fractions were combined for purposes of isolatin.

Fractions 13 to 17 were recrystallized from methanol by the addition of ether to yield 260 milligrams of 11α,17α-dihydroxyprogesterone which melted at 220 to 222 degrees centigrade, had an optical rotation $[\alpha]_D^{24}$ of plus 76 degrees (1.1323 in chloroform), and an ultraviolet extinction $k_{243}$ of 46.67.

*Analysis*.—Calculated for $C_{21}H_{30}O_4$: C, 72.82; H, 8.73. Found: C, 73.18; H, 8.76. C. 72.85; H, 8.47.

The mother liquors of fractions 13 to 17 and fractions 11, 12 and 18 to 20 were combined and rechromatographed in the same manner over 150 grams of Florisil, thus yielding another 102 milligrams of 11α,17α-dihydroxyprogesterone.

Fraction 10 yielded a second compound, 6,17α-dihydroxyprogesterone melting at 256 to 258 degrees centigrade, analyzing as $C_{21}H_{30}O_4$ and having an $[\alpha]_D^{23}$ of plus four degrees (0.775 in chloroform).

Oxidation of the 11α,17α-dihydroxyprogesterone in glacial acetic acid with chromium trioxide produced 17α-hydroxy-4-pregnene-3,11,20-trione. Treatment of this compound with ethyl oxalate, iodine, and potassium acetate in accordance with the procedure of Hogg and Nathan, S. N. 262,193, filed December 17, 1951, is productive of cortisone (17α,21-dihydroxy-4-pregnene-3,11,20-trione).

TABLE XVII

| Fraction | Solvent | Eluate Solids, Milli-grams |
|---|---|---|
| 1 | ethylene dichloride | 105.5 |
| 2, 3 | ethylene dichloride-acetone 25:1 | 177.0 |
| 4 | ethylene dichloride-acetone 15:1 | 39.0 |
| 5 | do | 88.5 |
| 6-9 | ethylene dichloride-acetone 12:1 | 225.5 |
| 10 | ethylene dichloride-acetone 10:1 | 23.5 |
| 11, 12 | do | 73.0 |
| 13-16 | ethylene dichloride-acetone 8:1 | 316.5 |
| 17 | ethylene dichloride-acetone 5:1 | 129.5 |
| 18-20 | do | 167.0 |
| 21-23 | ethylene dichloride-acetone 2:1 | 134.5 |
| 24-26 | acetone | 57.0 |

*Example 30.—11α-hydroxycorticosterone from 11-desoxycorticosterone acetate*

Under the conditions of Example 20, using four liters of medium containing a 24 hour growth of organism R-4 (spore inoculation), 1.15 grams of 11-desoxycorticosterone acetone (DOCA), the equivalent of one gram of 11-desoxycorticosterone (DOC), was added and fermentation progressed for 72 hours. Extraction of the beer as above gave 1.8 grams of an oily semi-solid extractive. This oily extractive was triturated three times with fifteen-milliliter portions of Skellysolve B and the fractions separated. The non-solvent phase was again triturated five times with fifteen-milliliter portions of ether and the soluble and insoluble fractions thus separated. The ether insoluble fraction (identification number 115) was recrystallized from a mixture of two milliliters of methanol and twenty milliliters of ether yielding crystals (115.1) and mother liquor (115.1 M. L.). The mother liquor (115 M. L.) was combined with mother liquor 115 A. M. L. from the ether soluble fraction as derived below. Crystals 115.1 were taken up in methanol with Darco G 60 activated carbon, filtered and evaporated. The resulting crystals were dissolved in three milliliters of ethyl acetate, and recrystallized therefrom yielding crystals (115.2) and mother liquor (115.2 M. L.). The crystals were taken up in methylene chloride, Magnesol magnesium silicate was added and the mixture was filtered and evaporated. The residue from the evaporation was dissolved in three milliliters of ethyl acetate and recrystallized yielding 99.4 milligrams of crystals (115.3) melting at 150 to 153 degrees centigrade. Evaporation of the 115.3 M. L. solvent left a residue which upon recrystallization from one milliliter of ethyl acetate yielded crystals (115.4) melting at 148 to 150 degrees centigrade and mother liquor (115.4 M. L.).

Following the above separation of the Skellysolve B-washed fraction by means of ether, the ether-soluble fraction, as distinguished from the ether-insoluble fraction as processed in the preceding paragraph, was freed of solvent and recrystallized from a mixture of two milliliters of methylene chloride with twenty milliliters of ether yielding crystalline fraction (115 A) and mother liquor fraction (115 A M. L.). The crystals were taken up and recrystallized from a mixture of two milliliters of methanol and twenty milliliters of ether yielding crystalline fractions (115 A.1) and mother liquor fraction (115 A.1 M. L.). These crystals were recrystallized from five milliliters of ethyl acetate yielding crystals (115 A.2) and mother liquor (115 A.2 M. L.). The crystals (115 A.2) were taken up in methylene chloride with a small quantity of Magnesol, filtered, evaporated, redissolved in five milliliters of ethyl acetate and recrystallized yielding mother liquor (115 A.3 M. L.) and crystals (115 A.3) melting at 156 to 157 degrees centigrade and having an infrared absorption spectrum identical to fraction 115.3.

All of the mother liquors were combined, treated with Magnesol, filtered, evaporated free of solvent, taken up in ethyl acetate and recrystallized to yield fraction 115.4 A melting at 148 to 150 degrees centigrade. This fraction was then combined with fraction 115.4, dissolved and recrystallized from three milliliters of ethyl acetate yielding crystalline fraction 116.1 melting at 151 to 153 degrees and mother liquor 116.1 M. L. The crystals were dissolved in methylene chloride with Magnesol suspended therein, filtered, the solvent evaporated, redissolved in and crystallized from two milliliters of ethyl acetate yielding crystal fraction 116.2 melting at 151 to 153 degrees centigrade and mother liquor fraction 116.2 M. L. This crystal fraction 116.2 was combined with subsequently obtained mother liquor fraction 116 A M. L. for processing, the solvent being evaporated, the residue redissolved in and recrystallized from two milliliters of ethyl acetate to yield crystals 116 B melting at 150 to 153 degrees centigrade and mother liquor 116 B M. L.

Fractions 115.3 and 115 A.3 as obtained above were recrystallized from five milliliters of ethyl acetate to yield crystalline fraction 116 melting at 153 to 155 degrees centigrade and mother liquor fraction 116 M. L. The crystals were recrystallized from three milliliters of ethyl acetate yielding crystalline fraction 116 A melting at 153 to 155 degrees centigrade and mother liquor fraction 116 A M. L. This mother liquor fraction was volatilized free of solvent and combined with crystalline fraction 116.2, the mixture, upon recrystallization from two milliliters of ethyl acetate, yielded crystalline fraction 116 B melting at 150 to 153 degrees centigrade and mother liquor fraction 116 B M. L.

The final crystalline product, 11$\alpha$,21-dihydroxy-4-pregnene-3,20-dione or 11-epicorticosterone (116 B) melted at 150 to 153 degrees centigrade and had an optical rotation $[\alpha]_D^{24}$ of plus 166 degrees (0.764 in chloroform) and plus 165 degrees (0.711 in ethanol).

*Analysis.*—Calculated for $C_{21}H_{30}O_4$: C, 72.80; H, 8.73. Found: C, 72.88; H, 8.69.

The infrared absorption spectrum differed from those of desoxycorticosterone, desoxycorticosterone acetate, 11$\beta$,17$\alpha$,21-trihydroxy-4-pregnene-3,20-dione, corticosterone, cortisone and 17$\alpha$,21-dihydroxy-4-pregnene-3,20-dione.

The 11-epicorticosterone 21-acetate was made from 101.2 milligrams of 11-epicorticosterone dissolved in two milliliters of dry benzene, to which solution was added 0.0304 milliliter of redistilled acetic anhydride (one milliliter of a solution of 0.304 milliliter of acetic anhydride diluted to ten milliliters with pyridine). After standing at room temperature for 16 hours the reaction mixture was diluted to fifty milliliters with water. The aqueous solution was extracted with five 25 milliliter portions of ether, the other layer washed with two percent hydrochloric acid until the wash fluid remained distinctly acid, then twice with two percent sodium bicarbonate solution and once with water. The extract was dried with anhydrous sodium sulfate and the solvent removed by evaporation at room temperature, leaving 106.5 milligrams of a colorless oil. This oil dissolved in ten milliliters of ether-chloroform mixture (one to one ratio by volume) was fractionated over an alumina chromatographic absorption column using five grams of alumina (hydrochloric acid washed, and dried at 120 degrees centigrade) and developed with ten milliliter portions of solvent in accordance with Table XVIII.

TABLE XVIII

| Fraction | Solvent | Eluate Solids, Milligrams |
|---|---|---|
| 1 | ether-chloroform 1:1 | 3.1 |
| 2 | do | 9.1 |
| 3 | do | 3.5 |
| 4 | chloroform | 3.6 |
| 5 | do | 70.5 |
| 6 | do | 6.4 |
| 7–9 | chloroform-acetone 19:1 | 1.0 |
| 10–12 | chloroform-acetone 9:1 | 0.4 |
| 13–15 | chloroform-acetone 1:1 | 0.5 |
| 16–18 | acetone | 0.7 |
| 19, 20 | acetone-methanol 19:1 | 0.5 |
| 21, 22 | acetone-methanol 9:1 | 0.5 |
| 23, 24 | acetone-methanol 1:1 | 0.9 |
| 25, 26 | methanol | 0.6 |
| Total recovery | | 101.3 |

A very sharp peak was obtained in fraction 5 weighing 70.5 milligrams.

This 70.5 milligram sample was dissolved in 1.4 milliliters of chlorobenzene, cooled in an ice-bath and mixed with vigorous agitation at zero degrees centigrade for two hours with a solution of 53 milligrams of $Na_2Cr_2O_7$, 0.8 milliliter of water and 0.135 milliliter of sulfuric acid. Then ten milliliters of cold water was added and sufficient cold benzene to bring the organic phase to the top. This was separated, washed twice with cold water until colorless, twice with five milliliters of cold five percent sodium bicarbonate and again with water. The benzene solution was dried with anhydrous sodium sulfate, filtered, and the solvent evaporated at room temperature to yield a white crystalline residue weighing 50.2 milligrams, melting at 177 to 180 degrees centigrade. This material was recrystallized from one milliliter of methanol, washed twice with cold methanol and air dried to yield 11-dehydrocorticosterone having a melting point of 179 to 181 degrees centigrade, $[\alpha]_D^{23}$ of plus 239 degrees (1.5 in dioxane). The literature indicates an optical rotation of plus 233.7 plus or minus two degrees [Reichstein and Shoppee, Vitamins and Hormones, vol. 1, page 363 (1945)].

*Analysis.*—Calculated for $C_{23}H_{30}O_5$: C, 71.47; H, 7.83. Found: C, 71.60; H, 7.90. C, 71.47; H, 7.94.

The material in fraction 6, weighing 6.4 milligrams, spontaneously crystallized over the course of six months. These crystals were recrystallized from 0.2 milliliter of methanol chilled to minus five degrees centigrade, and washed three times with 0.3 milliliter of cold methanol at minus five degrees centigrade to give three milligrams of cubical crystals of the 21-acetate of 11-epicorticosterone, melting point 159 to 163 degrees centigrade. Infrared spectrum vertifying the structure showed the 21-acetoxy absorption peak, the 11α-hydroxy peak, and the 3-keto-delta-4 group.

DIACETATE OF 4-PREGNENE-11α,21-DIACETOXY-3,20-DIONE

To fifty milligrams of 11-epicorticosterone dissolved in one milliliter of pyridine, dried over barium oxide, was added four milliliters of a solution of 0.304 milliliter of redistilled acetic anhydride diluted to ten milliliters with dry pyridine. After seventeen hours at room temperature, the reaction mixture was diluted to fifty milliliters with water. The diluted mixture was extracted five times with 25-milliliter portions of diethyl ether. The combined ether extract was washed twice with ten-milliliter portions of two percent hydrochloric acid, then once with ten milliliters of water, once with ten milliliters of two percent sodium bicarbonate and once again with ten milliliters of water. The washed extract was dried with anhydrous sodium sulfate, filtered, and the ether was evaporated at room temperature. The residue was 66.7 milligrams.

This residue was dissolved in seven milliliters of ether and chromatographed over a column of 3.5 grams of alumina (hydrochloric acid washed, dried at 120 degrees centigrade) with seven milliliter portions of solvent (Table XIX). The eluate peak occurred sharply in fractions seven and eight, totaling 39.7 milligrams. The residue crystallized spontaneously during a six-month period. The crystals were recrystallized from about 0.3 milliliter of methanol chilled to minus five degrees centigrade and washed twice with 0.5 milliliter of methanol at minus five degrees centigrade. The long needles of recrystallized diacetate of 11-epicorticosterone or 4-pregnene-11α,21-diacetoxy-3,20-dione weighed 21.3 milligrams. Melting point was 145 to 149 degrees centigrade; $[\alpha]_D^{23}$ was plus 152 degrees (0.9785 in chloroform). Infrared spectra confirmed the structure.

*Analysis.*—Calculated for $C_{25}H_{35}O_6$: C, 69.58; H, 8.18. Found: C, 69.46; H, 8.32.

TABLE XIX

| Fraction | Solvent | Eluate Solids, Milligrams |
|---|---|---|
| 1 | ether | 6 |
| 2 | do | 4.9 |
| 3 | ether-chloroform 19:1 | 0.8 |
| 4 | do | 0.5 |
| 5 | ether-chloroform 9:1 | 1.0 |
| 6 | do | 0.7 |
| 7 | ether-chloroform 1:1 | 19.9 |
| 8 | do | 19.9 |
| 9 | chloroform | 3.0 |
| 10 | do | 6.0 |
| 11 | chloroform-acetone 19:1 | 2.1 |
| 12 | do | 0.5 |
| 13 | chloroform-acetone 9:1 | 0.0 |
| 14 | do | 0.0 |
| 15 | methanol | 1.4 |
| 16 | do | 0.0 |
| Total | | 66.6 |

Fermentation in accordance with Example 30 using 11-desoxycorticosterone as the substrate instead of 11-desoxycorticosterone acetate also produced 11-epicorticosterone.

*Example 31.—11α-hydroxytestosterone from testosterone*

Three liters of medium 238-IV was sterilized by autoclaving at 121 degrees centigrade in a five gallon bottle. The pH after sterilization was 4.5. The bottle, at room temperature, was inoculated with R-4 spores and shaken at room temperature for 24 hours. Testosterone, 1.5 grams, dissolved in thirty milliliters of absolute ethanol was then added and a period of 24 hours, with aeration as in Example 20 allowed for bioconversion. The resulting beer was extracted as in Example 20. The extractives obtained upon evaporation of the methylene chloride solvent weighed 2.5492 grams.

Partial decolorization of the crude extractives was effected by taking them up with 35 milliliters of methylene chloride, adding three grams of Magnesol, and filtering. Upon evaporation of the solvent, the residue was taken up in an excess of acetone, mixed with 0.2 gram of Celite No. 545 diatomaceous earth, filtered, and evaporated to dryness. This residue was dissolved in 150 milliliters of benzene and fractionated over 75 grams of alumina (washed with hydrochloric acid and dried at 120 degrees centigrade) with 150-milliliter portions of solvent fractions as in Table XX. Paper chromatography utilized the propylene glycol-toluene system.

TABLE XX

| Fraction | Solvent | Eluate Solids, Milligrams | Papergram |
|---|---|---|---|
| 1, 2 | benzene plus 10 percent ether | 55.9 | |
| 3, 4 | benzene plus 50 percent ether | 74.5 | |
| 5-7 | ether | 904.5 | 2 components. |
| 8-10 | ether plus 5 percent chloroform | 191.6 | |
| 11, 12 | ether plus 10 percent chloroform | 21.5 | 2 components reversed quantity. |
| 13 | do | 2.4 | |
| 14-16 | ether plus 50 percent chloroform | 15.0 | |
| 17-19 | chloroform | 66.2 | |
| 20 | chloroform plus 5 percent acetone | 34.7 | |
| 21 | do | 27.5 | |
| 22 | chloroform plus 5 percent acetone | 30.8 | new spot. |
| 23-25 | chloroform plus 10 percent acetone | 113.3 | |
| 26-28 | chloroform plus 50 percent acetone | 139.7 | |
| 29 | acetone | 62.1 | |
| 30 | do | 32.4 | 2 new spots. |
| 31 | do | 16.9 | |
| 32 | acetone plus 5 percent methanol | 30.1 | |
| 33-41 | acetone-methanol, increased to 100 percent methanol. | 35.3 | |
| | Total | 1,854.4 | |

Fractions 23 to 30, weighing 378 milligrams, freed of solvent, were dissolved in acetone, concentrated to ten milliliters, filtered to separate a small amount of flocculent precipitate, and evaporated to dryness. The residue was dissolved in fifteen milliliters of ethyl acetate, concentrated over a steam-bath to five milliliters, and cooled to crystallize the product. The crystals (409-SHE-41B-1) were separated by filtration and washed three times with one-milliliter portions of ethyl acetate.

The mother liquor fraction identified as 409-SHE-41B-1 M. L. was combined with subsequently obtained fraction 41B-2 M. L., as described below, and evaporated to crystallization. The crystals were washed with cold ethyl acetate yielding sample 41B-3 weighing 40.5 milligrams and melting at 177 to 178 degrees centigrade.

Crystals 409-SHE-41B-1, obtained concomitantly with the above mother liquor fraction, weighing 319.9 milligrams, were taken up in methylene chloride, Magnesol was added to decolorize, the suspension was filtered and the filtrate was evaporated. The residue was redissolved in two milliliters of ethyl acetate and crystallized therefrom yielding 198.7 milligrams of crystals (409-SHE-41B-2) melting at 179 to 182 degrees centigrade and mother liquor fraction 41B-2 M. L. which mother liquor fraction was utilized as indicated in the preceding paragraph. These crystals were taken up in seven milliliters of ethyl acetate, concentrated to four milliliters and recrystallized, yielding 169.7 milligrams of 11α-hydroxytestosterone, softening at 178 degrees centigrade, melting at 181 to 181.5 degrees centigrade and having an optical rotation $[\alpha]_D^{23}$ of plus 93 degrees (chloroform). Infrared spectrum shows the presence of an additional hydroxyl on testosterone.

*Analysis.*—Calculated for $C_{19}H_{28}O_3$: C, 74.97; H, 9.27. Found: C, 74.69; H, 9.26.

To a ten percent solution of sodium dichromate in acetic acid was added 0.5 volume of benzene to give a concentration of 66.7 milligrams per milliliter. This was cooled to two degrees centigrade. Then a fifty-milligram sample of 11α-hydroxytestosterone was dissolved in two milliliters of benzene plus one milliliter of acetic acid and cooled to zero degrees centigrade with mechanical stirring. To this mixture, one milliliter of the dichromate solution was slowly added and the reaction mixture allowed to stir for three hours. It was then diluted with twenty milliliters of cold water and extracted four times with ten milliliter portions of ether. The extract was washed once with five milliliters of five percent hydrochloric acid, once with five milliliters of water, once with ten milliliters of two percent sodium hydroxide solution and twice with five-milliliter portions of water. The sodium hydroxide solution and last two aqueous extracts were backwashed with five milliliters of ethyl ether. The combined ether fractions were dried with anhydrous sodium sulfate, filtered, and concentrated to dryness yielding 64 milligrams of residue. The residue was dissolved in methylene chloride, filtered and evaporated to dryness. The solids were then recrystallized from 0.5 milliliter of ethyl acetate in the cold, filtered, and washed three times with cold ethyl acetate to give twenty milligrams of adrenosterone, melting at 203 to 215 degrees centigrade.

*Example 32.—11α-hydroxy-17α-progesterone from 16-dehydroprogresterone*

Following the procedure of Example 20, organism R-4, *Rhizopus nigricans* ATCC 6227*b*, was grown on two liters of medium 238-IV for 24 hours and then incubated with one gram of 16-dehydroprogesterone. The fermentation beer was extracted twice with one-liter portions of methylene dichloride and twice with 500-milliliter portions of methylene dichloride. The extract was washed twice with 250 milliliters of five percent sodium bicarbonate and twice with 250 milliliters of water. After drying over anhydrous sodium sulfate, filtering, and evaporating the solvent, a semi-crystalline residue of 2.045 grams was obtained. This residue was dissolved in fifty milliliters of benzene and chromatographed over 100 grams of alumina (hydrochloric acid washed and activated by heating at 120 degrees centigrade for four hours). Developing solvents were added to the column in 180-milliliter portions as given in Table XXI.

TABLE XXI

| Fraction | Solvent | Eluate Solids, Milligrams |
|---|---|---|
| 1, 2 | benzene | 166.0 |
| 3, 4 | benzene plus 20 percent ether | 140.5 |
| 5, 6 | benzene plus 50 percent ether | 9.0 |
| 7, 8 | ether | 10.0 |
| 9, 10 | ether plus 5 percent chloroform | 23.0 |
| 11, 12 | ether plus 10 percent chloroform | 33.5 |
| 13, 14 | ether plus 50 percent chloroform | 85.0 |
| 15-17 | chloroform | 658.0 |
| 18, 19 | chloroform plus 10 percent acetone | 113.0 |
| 20, 21 | chloroform plus 50 percent acetone | 72.5 |
| 22, 23 | acetone | 61.0 |
| 24 | methanol | 106.0 |

Fractions 5 through 13 inclusive were combined and recrystallized from two milliliters of acetone to give fifty milligrams of starting material, melting point 184 to 189 degrees centigrade. Fractions 14 through 17 inclusive were combined and dissolved in 0.5 milliliter of methylene dichloride. To this solution, five milliliters of ether was added to cause crystallization at room temperature. Crystallization was completed by cooling the solution to zero degrees centigrade for two hours. The yellow supernatant liquid was decanted from the crystals which were then washed with five milliliters of ether to which a few drops of acetone was added. The product was recrystallized from one milliliter of methylene dichloride to which ether was added until crystallization was effected. After two recrystallizations from methylene dichloride with the addition of ether, 255 milligrams were obtained of colorless crystals of 11α-hydroxy-17α-progesterone, melting point 209 to 211.5 degrees centigrade, $[\alpha]_D^{23}$ of minus twelve degrees (0.995 in chloroform). Structure was confirmed by infrared and ultraviolet spectra.

*Analysis.*—Calculated for $C_{21}H_{30}O_3$: C, 76.32; H, 9.15. Found: C, 76.07; H, 9.07.

*Example 33.—3β,11α-dihydroxyallopregnane-20-one from allopregnane-3β-ol-20-one*

To a 24-hour growth of *Rhizopus nigricans* ATCC 6227*b* on three liters of medium 283-IV was added one gram of allopregnane-3β-ol-20-one dissolved in 100 milliliters of absolute ethanol. After an incubation period of 68 hours, with aeration, as in Example 20, the pH was 4.75. Methylene dichloride extraction, as in Example 20, yielded 2.455 grams of semi-solid extractives. The extract was dissolved in fifty milliliters of benzene and chromatographed over 120 grams of alumina, which had been washed with hydrochloric acid and dried at 120 degrees centigrade, for four hours. Developing solvent fractions were used in the proportions of 200 milliliters, Table XXII.

Fractions 17 to 21 inclusive were freed of solvent and recrystallized from acetone by the addition of ether to give 239.5 milligrams (22.8 percent yield) of crystalline 3β,11α-dihydroxyallopregnane-20-one, of constant melting point 178 to 181 degrees centigrade, optical rotation $[\alpha]_D^{22}$ of plus seventy degrees (0.797 in chloroform). Infrared spectra verified the structure.

Fractions 23 through 26 inclusive, freed of solvent, were combined and recrystallized from acetone by the addition of methanol to give 104.5 milligrams (9.5 percent yield) of a compound melting at 268 to 270 degrees centigrade. Infrared spectrum and microcombustion indicate that the keto group is retained at carbon 20 and that two additional hydroxyl groups have been introduced into the original molecule. This product has an optical rotation $[\alpha]_D^{22}$ of plus 103 degrees (0.934 in methanol).

*Analysis.*—Calculated for $C_{21}H_{34}O_4$: C, 71.96; H, 9.78. Found: C, 72.08; H, 9.54.

Oxidation of 3β,11α-dihydroxyallopregnane-20-one with chromic acid produces allopregnane-3,11,20-trione; oxidation of 3α or 3β,11α-dihydroxypregnane-20-one, Example 13, with chromic acid produces pregnane-3,11,20-trione.

TABLE XXII

| Fraction | Solvent | Eluate Solids, Mill-grams |
|---|---|---|
| 1, 2 | benzene | 162.0 |
| 3, 4 | benzene plus 20 percent ether | 75.5 |
| 5, 6 | benzene plus 50 percent ether | |
| 7, 8 | benzene plus 50 percent ether | |
| 9, 10 | ether plus 5 percent chloroform | 10.0 |
| 11, 12 | ether plus 10 percent chloroform | |
| 13, 14 | ether plus 50 percent chloroform | 106.5 |
| 15, 16 | chloroform | 367.0 |
| 17, 18 | chloroform plus 10 percent acetone | 200.5 |
| 19, 20 | chloroform plus 20 percent acetone | 118.0 |
| 21, 22 | chloroform plus 50 percent acetone | 95.5 |
| 23, 24 | acetone | 104.0 |
| 25, 26 | acetone plus 5 percent methanol | 96.5 |
| 27, 28 | acetone plus 20 percent methanol | 137.0 |
| 29, 30 | acetone plus 50 percent methanol | 63.0 |
| 31, 32 | methanol | 70.0 |

*Example 34.—3-keto-bisnor-4-cholen-11α,22-diol from 3-keto-bisnor-4-cholen-22-al*

Following the procedure of Example 20, organism R–4, *Rhizopus nigricans* minus strain, ATCC 6227*b*, was grown on twelve liters of medium 238–IV for 24 hours. To this growth was added three grams of 3-keto-bisnor-4-cholen-22-al dissolved in 200 milliliters of ethanol and incubation proceeded for 48 hours. The conversion products were extracted three times with three-liter portions of methylene dichloride. The extract was washed twice with 750 milliliters of two percent sodium bicarbonate solution and twice with 750 milliliters of water. Drying over anhydrous sodium sulfate, filtering, and evaporating the solvent produced 4.03 grams of semicrystalline residue. The extract was dissolved in 400 milliliters of ethylene dichloride and chromatographed over 320 grams of Florisil synthetic magnesium silicate using 500-milliliter portions of developing solvents in accordance with Table XXIII.

Eluate solids fractions 11 to 16 inclusive were combined and recrystallized from ten milliliters of acetone. Ether was added dropwise until crystallization was initiated. These crystals were separated and recrystallized a second time from ten milliliters of acetone to give 550.5 milligrams of 3-keto-bisnor-4-cholen-11α,22-diol having a melting point of 130 to 133 degrees centigrade, $[\alpha]_D^{23}$ plus 78 degrees (1.0175 in chloroform), ultraviolet extinction $k_{243}$ was 38.39. Oxidation produced 3-keto-4-cholenic acid. The infrared spectrum indicated the presence of two hydroxy groups and the disappearance of the aldehyde group.

*Analysis.*—Calculated for $C_{22}H_{34}O_3$: C, 76.26; H, 9.89. Found: C, 75.86; H, 9.77.

Eluate solids fractions 17 to 21, inclusive, were recrystallized from fifteen milliliters of a mixture of one part of methanol with one part of acetone. The crystals obtained in this manner were recrystallized once more from ten milliliters of a mixture of one part of methanol with one part of acetone to give 401.0 milligrams of a 3-keto-bisnor-4-cholen-22-triol, melting point 238 to 240 degrees centigrade, $[\alpha]_D^{23}$ plus 22 degrees (0.387 in methanol), ultraviolet extinction $k_{238}$ of 35.51. The structure was confirmed by infrared and ultraviolet spectra.

*Analysis.*—Calculated for $C_{22}H_{34}O_4$: C, 72.89; H, 9.45. Found: C, 73.04; H, 9.59.

TABLE XXIII

| Fraction | Solvent | Eluate Solids Mill-grams |
|---|---|---|
| 1 | ethylene dichloride | 194.0 |
| 2 | do | 60.5 |
| 3 | ethylene dichloride-acetone 25:1 | 335.0 |
| 4 | do | 154.0 |
| 5 | ethylene dichloride-acetone 15:1 | 199.5 |
| 6 | do | 116.0 |
| 7 | do | 51.0 |
| 8 | ethylene dichloride-acetone 12:1 | 31.0 |
| 9 | do | 28.0 |
| 10 | ethylene dichloride-acetone 10:1 | 54.0 |
| 11 | do | 87.5 |
| 12 | do | 132.5 |
| 13 | ethylene dichloride-acetone 8:1 | 234.5 |
| 14 | do | 249.0 |
| 15 | do | 264.0 |
| 16 | ethylene dichloride-acetone 5:1 | 375.0 |
| 17 | do | 266.5 |
| 18 | do | 192.0 |
| 19 | ethylene dichloride-acetone 2:1 | 440.5 |
| 20 | do | 179.5 |
| 21 | do | 81.0 |
| 22 | acetone | 91.5 |

*Example 35.—11α,17α,21-trihydroxyallopregnane-3,20-dione from 17α,21-dihydroxy-4-pregnene-3,20-dione*

A medium was prepared of twenty grams of Cerelose dextrose, forty grams of corn steep liquor, four grams of sodium nitrate, and tap water to one liter, adjusted to a pH of 5.5. Four liters of this medium was sterilized at fifteen pounds of steam pressure in a five gallon Pyrex glass bottle. It was then inoculated with R–4, *Rhizopus nigricans* minus strain, ATCC 6227*b*, and shaken mechanically at room temperature for thirty hours. One gram of 17α,21-dihydroxy-4-pregnene-3,20-dione dissolved in a small quantity of absolute ethanol was then added and the fermentation continued for an additional 112 hours. The pH of the fermentation was then 7.9. In accordance with Example 20, the entire beer was extracted with methylene chloride, the extract was washed, filtered, and evaporated.

The methylene chloride extract weighing 1.908 grams was dissolved in 230 milliliters of ethylene dichloride and chromatographed over 150 grams of Florisil synthetic magnesium silicate using 230 milliliter portions of solvents as indicated in Table XXIV.

Eluate solids, fractions 20 through 26 were combined, dissolved in 25 milliliters of methylene chloride and decolorized with 0.5 of Magnesol. The filtrate and methylene chloride washing of the Magnesol treatment were evaporated to dryness. The residue was washed with five milliliters of hot ethyl acetate, and then five milliliters of methylene chloride. The undissolved material was dissolved in fifteen milliliters of acetone, filtered, concentrated to dryness, and washed with five milliliters of ether to yield 86 milligrams of crystalline 11α,17α,21-trihydroxyallopregnane-3,20-dione, confirmed by infrared spectroscopy, melting point 190 to 196 degrees centigrade.

TABLE XXIV

| Fraction | Solvent | Eluate Solids Milligrams |
|---|---|---|
| 1 | Ethylene dichloride | 16.4 |
| 2 | Ethylene dichloride-acetone 25:1 | 114.9 |
| 3 | do | 187.4 |
| 4 | Ethylene dichloride-acetone 15:1 | 51.7 |
| 5 | do | 17.8 |
| 6 | Ethylene dichloride-acetone 12:1 | 6.7 |
| 7 | do | 12.1 |
| 8 | Ethylene dichloride-acetone 10:1 | 8.2 |
| 9 | do | 4.6 |
| 10 | do | 9.6 |
| 11 | Ethylene dichloride-acetone 8:1 | 9.4 |
| 12 | do | 20.6 |
| 13 | do | 26.7 |
| 14 | do | 31.4 |
| 15 | do | 25.8 |
| 16 | Ethylene dichloride-acetone 5:1 | 25.2 |
| 17 | do | 50.1 |
| 18 | do | 52.2 |
| 19 | do | 50.6 |
| 20 | Ethylene dichloride-acetone 2:1 | 42.2 |
| 21 | do | 155.9 |
| 22 | do | 114.5 |
| 23 | Acetone | 81.1 |
| 24 | do | 185.2 |
| 25 | do | 50.0 |
| 26 | do | 17.0 |
| Total | | 1367.3 |

*Example 36.—Allopregnane-3,7-diol-20-one from allopregnane-3-ol-20-one*

Following the procedure of Example 20, to four liters of a 24 hour culture of *Rhizopus arrhizus* RH 176 there was added one gram of allopregnane-3-ol-20-one. Incubation for 72 hours followed by extraction as described produced a crude residue which was dissolved in 200 milliliters of benzene and chromatographed over fifty grams of alumina using 200-milliliter portions of developing solvent in accordance with Table XXV.

TABLE XXV

| Fraction | Solvent | Eluate Solids Milligrams |
|---|---|---|
| 1 | benzene | ---------- |
| 2 | do | 28 |
| 3 | do | 4 |
| 4 | do | ---------- |
| 5 | do | 1 |
| 6 | ether | 55 |
| 7 | do | 21 |
| 8 | do | 7 |
| 9 | do | 2 |
| 10 | do | 0 |
| 11 | do | 0 |
| 12 | chloroform | 107 |
| 13 | do | 424 |
| 14 | do | 252 |
| 15 | do | 88 |
| 16 | chloroform plus 5 percent methanol | 132 |
| 17 | methanol | 432 |
| 18 | do | 8 |

Eluate fractions 12 through 15 inclusive, freed of solvent, were redissolved in a minimum of acetone and crystallized therefrom by the dropwise addition of Skellysolve B petroleum ether to give 296 milligrams of crystals melting at 130 degrees centigrade. A similar run yielded 302 milligrams of crystals melting at 135 degrees centigrade. These two batches of crystals were combined, dissolved in 200 milliliters of benzene and rechromatographed over thirty grams of alumina using 200-milliliter portions of developing solvent in accordance with Table XXVI.

Eluate solids fractions 17 through 21 inclusive, weighing 188 milligrams, were crystallized from five milliliters of ethyl acetate to give 110 milligrams of crystals, melting point 190 to 193 degrees centigrade. Recrystallization from three milliliters of ethyl acetate followed by recrystallization from two milliliters of acetone yielded allopregnane-3,7-diol-20-one, melting point 194 to 195 degrees centigrade, $[\alpha]_D^{25}$ of plus 77.6 degrees (0.628 in chloroform), analysis $C_{21}H_{34}O_3$.

TABLE XXVI

| Fraction | Solvent | Eluate Solids Milligrams |
|---|---|---|
| 1 | benzene | ---------- |
| 2 | ether | ---------- |
| 3 | do | ---------- |
| 4 | do | ---------- |
| 5 | ether plus 5 percent chloroform | ---------- |
| 6 | do | ---------- |
| 7 | do | ---------- |
| 8 | ether plus 10 percent chloroform | ---------- |
| 9 | do | ---------- |
| 10 | do | ---------- |
| 11 | ether plus 50 percent chloroform | ---------- |
| 12 | do | ---------- |
| 13 | do | 13 |
| 14 | chloroform | 77 |
| 15 | do | 140 |
| 16 | do | 74 |
| 17 | chloroform plus 5 percent acetone | 60 |
| 18 | do | 34 |
| 19 | do | 36 |
| 20 | chloroform plus 10 percent acetone | 34 |
| 21 | do | 24 |
| 22 | do | 35 |
| 23 | chloroform plus 50 percent acetone | 40 |
| 24 | do | 18 |
| 25 | do | 20 |
| 26 | acetone | 22 |
| 27 | do | 9 |
| 28 | do | 3 |
| 29 | methanol (300 milliliters) | 12 |

*Example 37.—Pregnenolone bioconversion*

Following the procedure of Example 20, to eight liters of a nineteen hour culture of *Rhizopus arrhizus* RH 176 there was added two grams of 5-pregnene-3β-ol-20-one in twenty milliliters of acetone. After 75 hours of incubation, the products were extracted once with a four-liter portion and three times with two-liter portions of methylene chloride. The extracts were washed twice with one-liter portions of two percent sodium bicarbonate solution and twice with one-liter portions of water. The washed extracts were then dried over anhydrous sodium sulfate, filtered, and evaporated to give 3.3162 grams of crystalline residue. This residue was dissolved in 200 milliliters of benzene and chromatographed over 100 grams of alumina (acid washed, dried at 120 degrees centigrade for four hours). The column was developed with 200-milliliter portions of solvents as indicated in Table XXVII. Papergram isolation of eluate solids fractions was performed with a propylene glycol-toluene system.

Eluate solids fractions 24 through 27 were dissolved in ten milliliters of methanol and concentrated until crystallization occurred. A few drops of water were added to facilitate completion of the crystallization, the mixture was cooled and the crystals were filtered free of supernatant liquid yielding 382 milligrams of crystalline 4-pregnene-8,11α-diol-3,20-dione having a melting point of 228 to 230 degrees centigrade.

Eluate solids fractions 28 through 31 were combined, dissolved in ten milliliters of methanol, and concentrated until crystallization ensued. A few drops of water were added, the mixture was cooled, and the crystals were separated. Three recrystallizations from methanol, adding water to facilitate crystallization, or methanol-carbon tetrachloride, yielded 375 milligrams of 5-pregnene-3β,8,11α-triol-20-one, melting point 247 to 248 and 250 to 255 degrees centigrade, $[\alpha]_D^{27}$ of minus 41 degrees (1.086 in methanol). Structure was verified by infrared spectra.

*Analysis.*—Calculated for $C_{21}H_{32}O_4$: C, 72.38; H, 9.25. Found: C, 72.34; H, 9.13.

TABLE XXVII

| Fraction | Solvent | Eluate Solids Milligrams | Papergram |
|---|---|---|---|
| 1, 2 | benzene | 195 | |
| 3, 4 | benzene plus 5 percent ether | 70 | |
| 5–7 | benzene plus 10 percent ether | 56 | |
| 8, 9 | benzene plus 50 percent ether | 11 | |
| 10, 11 | ether | 7 | |
| 12, 13 | ether plus 5 percent $CHCl_3$ | 8 | |
| 14, 15 | ether plus 10 percent $CHCl_3$ | 32 | |
| 16, 17 | ether plus 50 percent $CHCl_3$ | 108 | |
| 18, 19 | chloroform | 590 | 1-leucyl-1-proline-anhydride. |
| 20 | $CHCl_3$ plus 5 percent acetone | 37 | 3 percent component A, 6 percent component B. |
| 21 | do | 24 | 3 percent component A, 35 percent component B. |
| 22 | $CHCl_3$ plus 10 percent acetone | 43 | 43 percent component B. |
| 23 | do | 37 | 50 percent component B. |
| 24 | $CHCl_3$ plus 50 percent acetone | 171 | 45 percent component B. |
| 25 | do | 155 | |
| 26 | acetone | 399 | |
| 27 | do | 110 | |
| 28 | acetone plus 5 percent methanol. | 244 | 5 percent component C, 6 percent component D, 15 percent component B. |
| 29 | do | 125 | |
| 30, 31 | acetone plus 10 percent methanol. | 118 | |
| 32, 33 | acetone plus 50 percent methanol. | 73 | 10 percent component C, 6 percent component D, 3 percent component B. |
| 34, 35 | methanol | 27 | |

*Example 38. — Delta-16-pregnenolone bioconversion*

In accordance with Example 20, twelve liters of medium 238–IV was seeded with R–4 and incubated seventeen and one-half hours. Then three grams of delta-16-pregnenolone, 5,17-pregnadiene-3β-ol-20-one, dissolved in a minimum of acetone, was added and the fermentation continued for an additional twenty-nine and one-half hours. The oxygenated steroid was then extracted, as in Example 20, to give 6.496 grams of crude crystalline material. Papergram separation demonstrated the presence of three newly-produced products. The crude crystalline mass was triturated four times with five-milliliter portions of cold methylene chloride. The washed crystal residue, weighing 859 milligrams, was dissolved in forty milliliters of hot methylene chloride, 0.5 gram of Magnesol was added, and the suspension was filtered. The filtrate was concentrated to a volume of five milliliters by evaporation of the methylene chloride, and five milliliters of diethyl ether was added. After being maintained at room temperature for two hours, the mixture was filtered to separate 475 milligrams of crystals, melting point 184 to 187 degrees centigrade. These crystals were dissolved in thirty milliliters of hot acetone, the acetone solution was then concentrated by evaporation to four milliliters, whereupon cooling and filtering separated 355 milligrams of crystals, melting point 194 to 196 degrees centigrade. This material was dissolved in ten milliliters of hot acetone, filtered, concentrated to a volume of 3.5 milliliters, cooled, and crystals precipitated by the addition of three milliliters of Skellysolve B. Filtration separated 281 milligrams of crystalline compound having a melting point of 195 to 197 degrees centigrade.

*Example 39. — Bioconversion of compound S by* Helicostylum piriforme

To twelve liters of medium 238–IV, inoculated with spores of *Helicostylum piriforme*, ATCC 8992, there was added a solution of two grams of compound S, 17α,21-dihydroxy-4-pregnene-3,20-dione, in a minimum of ethanol, and fermentation with aeration proceeded for 68 hours. Extraction as in Example 20 gave 5.354 grams of semicrystalline residue. Papergram analysis with propylene glycoltoluene system upon each eluate demonstrated that besides compound epi F, 11α,17α,21 - trihydroxy - 4 - pregnene-3,20-dione, and compound H, 4-pregnene-6,17α,21-triol-3,20-dione, two new compounds were predominantly formed. The extract was dissolved in ten milliliters of ethylene dichloride and chromatographed over 350 grams of Florisil synthetic magnesium silicate using 550-milliliter portions of developing solvent fractions as indicated in Table XXVIII.

TABLE XXVIII

*Helicostylum piriforme*

| Fraction | Solvent | Eluate Solids Milligrams |
|---|---|---|
| 1 | ethylene dichloride | 479.5 |
| 2 | do | 403.0 |
| 3 | ethylene dichloride-acetone 15:1 | 815.5 |
| 4 | do | 36.5 |
| 5 | ethylene dichloride-acetone 12:1 | 36.0 |
| 6 | do | 50.0 |
| 7 | do | 109.5 |
| 8 | ethylene dichloride-acetone 10:1 | 159.0 |
| 9 | do | 148.0 |
| 10 | ethylene dichloride-acetone 8:1 | 145.0 |
| 11 | do | 104.5 |
| 12 | do | 98.0 |
| 13 | ethylene dichloride-acetone 5:1 | 170.0 |
| 14 | do | 123.0 |
| 15 | do | 123.5 |
| 16 | ethylene dichloride-acetone 3:1 | 127.5 |
| 17 | do | 200.0 |
| 18 | ethylene dichloride-acetone 1:1 | 456.0 |
| 19 | do | 356.0 |
| 20 | acetone | 226.5 |

4-PREGNENE-14,17α,21-TRIOL-3,20-DIONE

Eluate fractions 13 through 16, inclusive, freed of solvent, were recrystallized from ten milliliters of ether by slowly evaporating the ether at room temperature. This crystallization produced 228.6 milligrams of crystals, melting point 218 to 226 degrees centigrade. Two more recrystallizations, each time from ten milliliters of ether-acetone, one to one proportion, gave crystals of melting point 232 to 235 degrees centigrade. Recrystallization of a sample of this, 57 milligrams, from five milliliters of methanol produced 4-pregnene-14,17α,21-triol-3,20-dione, melting point 234 to 237 degrees centigrade, $[\alpha]_D^{23}$ of plus 155 degrees (1.13 in methanol) having a unique infrared spectrum.

*Analysis.*—Calculated for $C_{21}H_{30}O_5$: C, 69.58; H, 8.34. Found: C, 69.42; H, 8.40.

4-PREGNENE-14,17α,21-TRIOL-3,20-DIONE-21-MONOACETATE

A suspension of 44.2 milligrams of 4-pregnene-14,17α,21-triol-3,20-dione in 2.5 milliliters of acetic anhydride and two milliliters of absolute pyridine, was heated on a steam bath to cause complete solution. After eighteen hours at room temperature, the mixture was quenched with thirty milliliters of ice water. The mixture was extracted three times with twenty milliliters of ether-chloroform, five to one ratio. The extracts were washed twice with ten milliliters of five percent hydrochloric acid, once with water, three times with five percent sodium bicarbonate and three times with water. Upon drying over anhydrous sodium sulfate, filtering and evaporating the solvents, a crystalline residue weighing 61.5 milligrams was obtained. Recrystallization twice, each time from five milliliters of acetone, produced 36 milligrams of 4-pregnene-14,17α,21-triol-3,20-dione-21-monoacetate, melting point 232 to 235 degrees centigrade, $[\alpha]_D^{22}$ of plus 167 degrees (0.591 in chloroform). Structure was verified by infrared spectrum.

*Analysis.*—Calculated for $C_{23}H_{32}O_6$: C, 68.29; H, 7.98. Found: C, 68.19; H, 8.07.

14-HYDROXY-4-ANDROSTENE-3,17-DIONE

To 129.5 milligrams of 4-pregnene-14,17α,21-triol-3,20-dione dissolved in ten milliliters of glacial acetic acid there was added dropwise a solution of 103.5 milligrams of chromic trioxide in one milliliter of water and five milliliters of acetic acid. After twenty hours at room temperature, the reaction mixture was diluted with 25 milliliters of methanol, concentrated in vacuo to remove the excess methanol, diluted with seventy milliliters of water and extracted with three portions, fifty milliliters each, of five parts of ether and one part of methylene dichloride. The combined extract was washed with fifteen-milliliter portions: once with water, twice with five percent sodium hydroxide, and four times more with water. The washed extract was dried over anhydrous sodium sulfate, filtered, and evaporated to give 71.7 milligrams of crystals which were recrystallized from two milliliters of acetone by adding hexane to the boiling solution to induce crystallization of the thus-produced 14-hydroxy-4-androstene - 3,17 - dione, melting point 259 to 265 degrees centigrade, $[\alpha]_D^{23}$ of plus 171 degrees (0.660 in chloroform). Structure was confirmed by infrared spectrum.

*Analysis.*—Calculated for $C_{19}H_{26}O_3$: C, 75.46; H, 8.66. Found: C, 75.21; H, 8.64.

4-PREGNENE-8,17α,21-TRIOL-3,20-DIONE

Eluate fractions 18 and 19, freed of solvent, were washed twice with five milliliters of equal parts of methanol and acetone leaving a residue of 63 milligrams. Recrystallization twice from three-milliliter portions of methanol produced crystals of 4-pregnene-8,17α,21-triol-3,20-dione, melting point 248 to 252 degrees centigrade, $[\alpha]_D^{23}$ of plus 107 degrees (0.946 in dioxane). The mother liquors of fractions 18 and 19 were combined with fractions 17 and 20 and rechromatographed over Florisil synthetic magnesium silicate to give an additional 114.3 milligrams of this compound.

*Analysis.*—Calculated for $C_{21}H_{30}O_5$: C, 69.58; H, 8.34. Found: C, 69.46; H, 8.46.

4-PREGNENE-8,17α,21-TRIOL-3,20-DIONE-21-ACETATE

In a mixture of two milliliters of acetic anhydride and one milliliter of absolute pyridine, there was dissolved 30.6 milligrams of 4-pregnene-8,17α,21-triol-3,20-dione. After 36 hours at room temperature, the solution was diluted with fifty milliliters of ice water and extracted three times with thirty milliliter portions of ether. The ether extract was washed with ten-milliliter portions, twice with five percent sodium hydroxide and four times with water, dried over anhydrous sodium sulfate, filtered, and evaporated to product 34.5 milligrams of crystals. Two recrystallizations from one-milliliter portions of acetone produced 10.2 milligrams of 4-pregnene-8,17α,21-triol-3,20-dione-21-acetate. Infrared spectrum and microanalysis corroborated the structure.

*Analysis.*—Calculated for $C_{23}H_{32}O_6$: C, 68.29; H, 7.98. Found: C, 68.18; H, 8.24.

8-HYDROXY-4-ANDROSTENE-3,17-DIONE

To sixty milligrams of 4-pregnene-8,17α,21-triol-3,20-dione dissolved in five milliliters of glacial acetic acid there was added dropwise a solution of 50.7 milligrams of chromic trioxide in three milliliters of 95 percent acetic acid. After twenty hours at room temperature, the solution was diluted with twenty milliliters of methanol and the methanol was evaporated at a temperature of fifty degrees centigrade in vacuo. The residue was taken up in thirty milliliters of water and extracted with three portions, thirty milliliters each, of a mixture of ten parts of ether with one part of chloroform. The extract was washed with five-milliliter portions: once with water, once with five percent sodium hydroxide, and four times with water. The washed extract was dried over anhydrous sodium sulfate, filtered, and evaporated to produce 38.7 milligrams of crystals, which upon recrystallization from two milliliters of acetone, yielded 8 - hydroxy - 4-androstene-3,17-dione having a melting point of 214 to 217 degrees centigrade. Infrared, ultraviolet and microanalysis confirmed the structure.

*Analysis.*—Calculated for $C_{21}H_{26}O_3$: C, 75.46; H, 8.66. Found: C, 75.49; H, 9.21.

*Example 40.—Media variation*

A medium was prepared of five grams of dextrose, one gram of $KH_2PO_4$, 0.05 gram of $ZnSO_4$, three grams of $NH_4NO_3$ diluted to 100 milliliters with distilled water and adjusted to a pH of 4.55. This medium, in 150 milliliter quantities, was inoculated with a 72-hour vegetative growth of *Rhizopus arrhizus* on medium 238–IV. To a 24-hour culture, there was added 39.8 milligrams of progesterone. Fermentation proceeded for 41 hours, with agitation, and then the steroids were extracted. Separation of the steroids by paper chromatography indicated forty percent 11α-hydroxyprogesterone, fifteen percent dihydroxyprogesterone and no unconverted progesterone.

A similar run with 17α,21-dihydroxy-4-pregnene-3,20-dione revealed that twenty percent of the original steroid was converted into 6,17α,21-trihydroxy-4-pregnene-3,20-dione.

*Example 41.—Media variation*

A medium was prepared of 250 grams of Cerelose commercial dextrose, 1.25 grams of $MgSO_4 \cdot 7H_2O$, three grams of $KH_2PO_4$, 0.5 gram of $NH_4NO_3$ and five liters of tap water.

This medium was inoculated with 300 milliliters of vegetative inoculum of *Rhizopus arrhizus*, from an Edamine lactalbumin and dextrose medium, and agitated by gentle rocking at 100 cycles per minute in five-gallon bottles. After 24 hours, five grams of progesterone in 100 milliliters of acetone was added. Fermentation proceeded for 24 hours following which the beer was extracted with methylene chloride. At least twelve percent conversion to 11α-hydroxyprogesterone and eight percent conversion to dihydroxyprogesterone were obtained.

*Example 42.—Media variation*

A medium was prepared of 25 grams of dextrose, 0.5 gram of $KH_2PO_4$, 0.5 gram of $MgSO_4 \cdot 7H_2O$, 0.25 gram of $K_2SO_4$ and three grams of urea, added aseptically after sterilization, diluted to one liter with water.

Four liters of this medium inoculated with *Rhizopus nigricans* spores was agitated by rocking at 100 cycles per minute. After 48 hours, four grams of progesterone in acetone was added. After an additional 39-hour fermentation, extraction demonstrated 25 percent conversion to 11α-hydroxyprogesterone and thirty percent of unconverted progesterone.

*Example 43.—Media variation*

Additional media found to support the growth of Mucorales, Mucors, Phycomyces, Rhizopus and the disclosed preferred organisms, permitting oxygenation of steroids include:

1. Two percent whole yeast and five percent dextrose in tap water.
2. Two percent to eight percent corn steep solutions at pH 4.5 to 6.5.
3. Two percent lactalbumin digest medium at pH 5.9.
4. 2.5 percent glycerol, 1.25 percent corn steep liquor, 0.05 percent $KH_2PO_4$, 0.05 percent $MgSO_4 \cdot 7H_2O$, 0.025 percent $K_2SO_4$.
5. 2.5 percent dextrose, 0.05 percent $KH_2PO_4$ 0.05 epsom salt, 0.025 $K_2SO_4$, 0.2 percent urea added after sterilization.
6. 2.5 percent dextrose, 0.5 percent ammonium chloride, 0.05 percent $KH_2PO_4$, 0.05 percent $MgSO_4 \cdot 7H_2O$, 0.002 percent zinc sulfate, trace of ferric chloride.
7. 1.25 percent corn steep liquor, 0.002 percent zinc sulfate, 0.025 percent $K_2SO_4$.

*Example 44.—Menstruum variation*

*Rhizopus nigricans*, ATCC 6227b, spores from a two-weeks growth on malt agar were suspended in sterile sodium chloride solution, 0.9 gram per 100 milliliters, and used to inoculate four 100-milliliter quantities of sterile medium consisting of five grams of commercial dextrose, two grams of commercial lactalbumin hydrolyzate and 0.5 gram liquid corn steep in 100 milliliters of tap water adjusted to pH 5.35 after sterilization.

After 24 hours of shaking in 250-milliliter Pyrex Erlenmeyer flasks on a rotating shaker at 250 shakes per minute, the mycelium from each flask was removed by centrifugation and washed three times with 100-milliliter portions of sterile sodium chloride solution, 0.9 gram of sodium chloride in 100 milliliters of distilled water. Each mycelium was separately resuspended in 100 milliliters of one of the following menstrua:

A. 0.9 gram per 100 milliliters of sodium chloride in distilled water.

B. Sterile tap water.

C. Five grams of commercial Cerelose dextrose per 100 milliliters of solution in 0.02 molar $KH_2PO_4$.

D. 0.5 gram of urea per 100 milliliters of solution in 0.02 molar $KH_2PO_4$.

To each flask, 25 milligrams of progesterone in 0.5 milliliter of acetone was added. The flasks were then shaken, as above, for an additional 24 hours.

Each flask was then extracted three times with methylene chloride. The extract was washed with two percent sodium bicarbonate solution and distilled water. The methylene chloride extracts were each evaporated to dryness and the residues were subjected to paper strip chromatography with the results in Table XXIX.

TABLE XXIX

PERCENT STEROID RECOVERED

| Menstruum | 11-Hydroxy-progesterone | Progesterone | Dihydroxy-progesterone |
|---|---|---|---|
| Saline | 50 | 1.2 | 2.5 |
| Tap water | 40 | 0.625 | 2.5 |
| Dextrose | 43.7 | 1.80 | 1.25 |
| Urea | 35 | 1.30 | 1.25 |

The 11α-hydroxyprogesterone (U-III) and the dihydroxyprogesterone (U-I) can be converted into the corresponding mono and di acyloxy derivatives as indicated in Example 1, according to various acylation procedures, as by reaction with ketene, ketenes of selected acids, selected acids, acid anhydrides, or acid chlorides, in an organic solvent such as pyridine or the like. In the same manner, mono-esters, mono- and di-esters where two esterifyable hydroxy groups are present, and mono- and di- and tri-esters where three esterifyable hydroxy groups are present of 11α,21-dihydroxy-4-pregnene-3,20-dione, 11α,17α,21-trihydroxy-4-pregnene-3,20-dione, 6β,21-dihydroxy-4-pregnene-3,20-dione, 6β,17α,21-trihydroxy-4-pregnene-3,20-dione, 11α-hydroxy-4,6-pregnadiene-3,20-dione, allo and normal 11α-hydroxypregnane-3,20-dione, 11α-hydroxy-4-androstene-3,17-dione, and 11α-hydroxytestosterone are prepared. Representative esters thus-prepared include one to eight carbon atom carboxylic acid acyloxy esters of saturated or unsaturated aliphatic or cycloaliphatic, aryl, arylalkyl, alkaryl, mono, di or polycarboxylic acids which form ester groups such as, for example, formyloxy, acetoxy, propionyloxy, butyryloxy, valeryloxy, hexanoyloxy, heptanoyloxy, octanoyloxy, benzoxy, phenylacetoxy, toluoyloxy, napthoyloxy, cyclopentylformyloxy, α- or β-cyclopentylpropionyloxy, acrylyloxy, cyclohexylformyloxy, the half and diesters of malonic, maleic, succinic, glutaric and adipic acids, and the like. The acids may also contain non-interfering substituents, such as mono or poly halo, chloro, bromo, hydroxy, methoxy, and the like, if desired. These esters are useful as protecting groups to prevent oxidation of the esterified hydroxy groups under oxidative conditions. The duration, intensity and type of activity of the hydroxy steroids may be controlled by the selection of the appropriate ester radical. The esters provide a readily purifiable form of starting steroids which are otherwise difficult to purify.

Other microorganisms which have been found useful in the oxygenation of steroids, including eleven desoxy steroids, although not necessarily producing the same result as the fungi of the Mucorales order, include various strains of Penicillium, e. g., P-100, Aspergilli, e. g., *Aspergillus niger*, *Neurospora sitophila*, *Neurospora crassa*, *Oospora lactis*, *Polyoporus abietinus*, Entomophthorales (*Entomophthora coronata*) and like species of the mentioned genera. The Penicillium fermentation process as illustratively disclosed in United States Patent 2,458,495 using *Penicillium chrysogenum thom* or other Penicillium such as *P. cyclopium*, *P. nigricans*, *P. notatum* and *P. roqueforti*, with the addition of steroids as above described, is useful in the simultaneous oxygenation of steroids and the production of Penicillium fermentation products.

It is to be understood that the invention is not to be limited to the exact details of operation or exact organisms and compounds shown and described, as obvious modifications and equivalents will be apparent to one skilled in the art, and the invention is therefore to be limited only by the scope of the appended claims.

We claim:

1. A process for the production of an eleven oxygenated steroid comprising the step of aerobically subjecting a steroid containing an eleven methylene group to the action of oxygenating enzymes produced by a growth of an oxygenating species of fungus of the order Mucorales.

2. The process of claim 1 wherein the fungus is of the family Mucoraceae.

3. The process of claim 1 wherein the fungus is of the genus Rhizopus.

4. The process of claim 1 wherein the fungus is of the family Choanephoraceae.

5. The process of claim 1 wherein the eleven oxygenated steroid having the same number of carbon atoms in the carbon to carbon skeleton as the number of carbon atoms in the carbon to carbon skeleton of the starting steroid is recovered by solvent extraction.

6. The process of claim 1 wherein the starting steroid, containing an eleven methylene group, has a two carbon atom side chain at the seventeen position.

7. A process for the introduction of oxygen into a steroid which comprises: aerobically subjecting a steroid having a methylene group to the oxygenating activity of a species of fungus of the order Mucorales.

8. A process for the introduction of oxygen into a steroid which comprises: subjecting, under aerobic submerged fermentation conditions, a steroid having an eleven methylene group to the oxygenating activity of a species of fungus of the order Mucorales.

9. The process of claim 8 wherein the starting steroid has up to and including 22 carbon atoms in the carbon to carbon skeleton.

10. The process of claim 9 wherein the resulting oxygenated steroid is recovered by extraction.

11. A process for the introduction of oxygen into a steroid which comprises: contacting a steroid substrate, consisting essentially of steroid, under submerged aerobic fermentation conditions, with the oxygenating activity of a species of fungus of the order Mucorales to produce an oxygenated steroid in which the number of carbon atoms in the carbon to carbon skeleton of the resulting oxygenated steroid is the same as the number of carbon atoms in the carbon to carbon skeleton of the starting steroid.

12. A process for the introduction of oxygen into a steroid which comprises; aerobically contacting a steroid with viable fungi of a species of the order Mucorales, separating and isolating the resulting oxygenated steroid.

13. A process for the introduction of oxygen into a steroid which comprises: aerobically contacting a steroid, having an eleven methylene group and up to and including 22 carbon atoms in the carbon to carbon skeleton, with viable fungi of a species of the order Mucorales and isolating the resulting oxygenated steroid.

14. A process for the introduction of oxygen into a steroid which comprises: oxygenating a steroid having an eleven methylene group with growing fungus of a species of the order Mucorales under aerobic conditions at a pH of about 3.5 to 5.9 in the presence of a fermentation medium containing assimilable non-steroidal carbon.

15. The process of claim 14 wherein the starting steroid is present as a steroid substrate consisting essentially of steroid.

16. A process of claim 15 wherein the oxygenation takes place under submerged fermentation.

17. The process of claim 16 wherein the aerobic conditions are provided by aeration.

18. The process of claim 17 wherein the fermentation medium contains assimilable nitrogen.

19. The process of claim 18 wherein the fermentation medium contains available phosphate.

20. A process for the introduction of oxygen into a steroid which comprises aerobically contacting a steroid substrate, consisting essentially of a single steroid having a methylene group, with growing fungus of a species of the order Mucorales in the presence of aqueous nutrient medium comprised of assimilable nitrogen, phosphate, and carbohydrate.

21. A process for the introduction of oxygen into a steroid which comprises aerobically contacting a steroid substrate, consisting essentially of a single steroid having a methylene group, with growing fungus of a species of the order of Mucorales in the presence of aqueous nutrient medium comprised of assimilable nitrogen, phosphate, and carbohydrate, and separating the resulting oxygenated steroid.

22. The process of claim 21 wherein the starting steroid is selected from the group consisting of progesterone and pregnane-3,20-dione.

23. The process of claim 21 wherein the starting steroid is 17α-hydroxyprogesterone.

24. The process of claim 21 wherein the starting steroid is 17α,21-dihydroxyprogesterone.

25. The process of claim 21 wherein the starting steroid is 21-hydroxy-4-pregnene-3,20-dione.

26. The process of claim 21 wherein the starting steroid is 3β-hydroxy-5,16-pregnadiene-20-one.

27. The process of claim 21 wherein the fungus is of the family Mucoraceae.

28. The process of claim 21 wherein the fungus is of the species *Rhizopus nigricans*.

29. The process of claim 21 wherein the fungus is of the family Choanephoraceae.

30. The process of claim 21 wherein the fungus is of the genus Cunninghamella.

31. The process of claim 21 wherein the fungus is of the genus Phycomyces.

32. The process of claim 21 wherein the fungus is of the genus Rhizopus.

33. The process of claim 21 wherein the fungus is of the genus Rhizopus and the starting steroid is selected from the group consisting of progesterone and pregnane-3,20-dione.

34. The process of claim 21 wherein the fungus is of the genus Rhizopus and the starting steroid is 17α-hydroxyprogesterone.

35. The process of claim 21 wherein the fungus is of the genus Rhizopus and the starting steroid is 17α,21-dihydroxyprogesterone.

36. A process for the introduction of oxygen into a steroid which comprises: aerobically contacting a steroid substrate, consisting essentially of steroid having an eleven methylene group, with viable fungi of a species of the order Mucorales in the presence of a nutrient medium comprised of assimilable nitrogen and assimilable non-steroidal carbon thereby producing an oxygenated steroid in which the number of carbon atoms in the carbon to carbon skeleton of the resulting oxygenated steroid is the same as the number of carbon atoms in the carbon to carbon skeleton of the starting steroid and recovering the thus-produced oxygenated steroid.

37. A process for the introduction of oxygen into a steroid which comprises: aerobically subjecting a material consisting essentially of steroid, having a methylene group and up to and including 22 carbon atoms in the carbon to carbon skeleton, to the oxygenating activity of a species of fungus of the order Mucorales.

38. A process for the introduction of oxygen into a steroid which comprises: aerobically contacting a steroid substrate, consisting essentially of an eleven methylene group steroid having up to and including 22 carbon atoms in the carbon to carbon skeleton, with growing fungi of a species of the order Mucorales.

39. A process for the introduction of oxygen into a steroid which comprises: contacting a steroid substrate having an eleven methylene group with growing fungus of a species of the order of Mucorales under agitated aerobic fermentation conditions in the presence of aqueous nutrient medium comprised of assimilable nitrogen and assimilable carbon in addition to the steroidal carbon.

40. The process of claim 39 wherein the steroid substrate consists essentially of eleven methylene group steroid having up to and including 22 carbon atoms in the carbon to carbon skeleton, and the nutrient medium contains carbohydrate.

41. The process of claim 40 wherein the nutrient medium contains available phosphate.

42. A process comprising contacting a steroid, having an eleven methylene group and up to and including 22 carbon atoms in the carbon to carbon skeleton, under aerobic, agitated conditions, with growing fungus of a species of the order Mucorales.

43. The process of claim 42 wherein the starting steroid is selected from the group consisting of progesterone and pregnane-3,20-dione.

44. The process of claim 42 wherein the starting steroid is 17α-hydroxyprogesterone.

45. The process of claim 42 wherein the starting steroid is 17α,21-dihydroxyprogesterone.

46. The process of claim 42 wherein the starting steroid is 21-hydroxy-4-pregnene-3,20-dione.

47. The process of claim 42 wherein the starting steroid is 3β-hydroxy-5,16-pregnadiene-20-one.

48. The process of claim 42 wherein the fungus is of the family Mucoraceae.

49. The process of claim 42 wherein the fungus is of the family Choanephoraceae.

50. The process of claim 42 wherein the fungus is of the genus Cunninghamella.

51. The process of claim 42 wherein the fungus is of the genus Phycomyces.

52. The process of claim 42 wherein the fungus is of the genus Rhizopus.

53. The process of claim 42 wherein the fungus is *Rhizopus nigricans*.

54. The process of claim 42 wherein the fungus is of the genus Rhizopus and the starting steroid is selected from the group consisting of progesterone and pregnane-3,20-dione.

55. The process of claim 42 wherein the fungus is of the genus Rhizopus and the starting steroid is 17α-hydroxyprogesterone.

56. The process of claim 42 wherein the fungus is of the genus Rhizopus and the starting steroid is 17α,21-dihydroxyprogesterone.

57. A process for the introduction of oxygen into a steroid which comprises: subjecting a steroid, having an eleven methylene group and up to and including 22 carbon atoms in the carbon to carbon skeleton, to the oxygenating activity of a species of fungus of the order Mucorales under aerobic fermentation conditions and recovering the resulting oxygenated steroid by extraction and isolation.

58. The process of claim 57 wherein the starting steroid is selected from the group consisting of progesterone and pregnane-3,20-dione.

59. The process of claim 57 wherein the starting steroid is 17α-hydroxyprogesterone.

60. The process of claim 57 wherein the starting steroid is 17α,21-dihydroxyprogesterone.

61. The process of claim 57 wherein the starting steroid is 21-hydroxy-4-pregnene-3,20-dione.

62. The process of claim 57 wherein the starting steroid is 3β-hydroxy-5,16-pregnadiene-20-one.

63. The process of claim 57 wherein the fungus is of the family Mucoraceae.

64. The process of claim 57 wherein the fungus is of the family Choanephoraceae.

65. The process of claim 57 wherein the fungus is of the genus Cunninghamella.

66. The process of claim 57 wherein the fungus is of the genus Phycomyces.

67. The process of claim 57 wherein the fungus is of the genus Rhizopus.

68. The process of claim 57 wherein the fungus is *Rhizopus nigricans*.

69. The process of claim 57 wherein the fungus is of the genus Rhizopus and the starting steroid is selected from the group consisting of progesterone and pregnane-3,20-dione.

70. The process of claim 57 wherein the fungus is of the genus Rhizopus and the starting steroid is 17α-hydroxyprogesterone.

71. The process of claim 57 wherein the fungus is of the genus Rhizopus and the starting steroid is 17α,21-dihydroxyprogesterone.

72. A process comprising: dispersing a steroid, having an eleven methylene group, in an aqueous nutrient medium containing available nitrogen, phosphate, and carbohydrate; growing a species of fungus of the order of Mucorales in said medium, under agitated, submerged, aerobic fermentation conditions; and isolating the thus-produced eleven oxygenated steroid.

73. The process of claim 72 wherein the starting steroid is selected from the group consisting of progesterone and pregnane-3,20-dione.

74. The process of claim 72 wherein the starting steroid is 17α-hydroxyprogesterone.

75. The process of claim 72 wherein the starting steroid is 17α,21-dihydroxyprogesterone.

76. The process of claim 72 wherein the starting steroid is 21-hydroxy-4-pregnene-3,20-dione.

77. The process of claim 72 wherein the starting steroid is 3β-hydroxy-5,16-pregnadiene-20-one.

78. The process of claim 72 wherein the fungus is of the family Mucoraceae.

79. The process of claim 72 wherein the fungus is of the family Choanephoraceae.

80. The process of claim 72 wherein the fungus is of the genus Cunninghamella.

81. The process of claim 72 wherein the fungus is of the genus Phycomyces.

82. The process of claim 72 wherein the fungus is of the genus Rhizopus.

83. The process of claim 72 wherein the fungus is *Rhizopus nigricans*.

84. The process of claim 72 wherein the fungus is of the genus Rhizopus and the starting steroid is 17α-hydroxyprogesterone.

85. The process of claim 72 wherein the fungus is of the genus Rhizopus and the starting steroid is 17α,21-dihydroxyprogesterone.

86. A process comprising: dispersing a steroid, having a two carbon atom side chain at the seventeen position and an eleven methylene group, in an aqueous nutrient medium containing available nitrogen, phosphate, and carbohydrate, growing a species of fungus, selected from the group consisting of *Phycomyces blakesleeanus*, *Rhizopus arrhizus*, *Rhizopus delemar*, *Rhizopus nigricans* and *Rhizopus reflexus*, in said medium, under agitated, submerged, aerobic fermentation conditions; and isolating the thus-produced 11α-hydroxy-steroid.

87. The process of claim 86 wherein the starting steroid is 17α-hydroxyprogesterone.

88. The process of claim 86 wherein the starting steroid is 17α,21-dihydroxyprogesterone.

89. A process comprising: dispersing a steroid selected from the group consisting of progesterone and pregnane-3,20-dione in an aqueous nutrient medium containing available nitrogen, phosphate, and carbohydrate; growing a species of fungus of the family Mucoraceae in said medium, under agitated, submerged, aerobic fermentation conditions; and isolating the thus-produced 11α-hydroxysteroid.

90. A process comprising: dispersing progesterone in an aqueous nutrient medium containing available nitrogen, phosphate, and carbohydrate; growing a species of fungus selected from the group consisting of *Phycomyces blakesleeanus*, *Rhizopus arrhizus*, *Rhizopus delemar*, *Rhizopus nigricans* and *Rhizopus reflexus*, in said medium, under agitated, submerged, aerobic fermentation conditions; and isolating the thus-produced 11α-hydroxyprogesterone.

91. The process of claim 89 wherein the fungus is of the genus Rhizopus.

92. The process of claim 90 wherein the fungus is of the species *Rhizopus nigricans*.

HERBERT C. MURRAY.
DUREY H. PETERSON.

REFERENCES CITED

The following references are of record in the file of this patent:

UNITED STATES PATENTS

| Number | Name | Date |
|---|---|---|
| 2,360,447 | Schmidt et al. ----- | Oct. 17, 1944 |
| 2,447,325 | Gallagher -------- | Aug. 17, 1948 |

OTHER REFERENCES

Seneca et al.: Science, vol. 112, of November 3, 1950, pages 524–525.